US012630305B2

(12) United States Patent

Mukae

(10) Patent No.: US 12,630,305 B2
(45) Date of Patent: May 19, 2026

(54) MONITORING SYSTEM, MONITORING SATELLITE, AND COMMUNICATION SATELLITE

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 594 days.

(21) Appl. No.: 18/024,280

(22) PCT Filed: Sep. 28, 2020

(86) PCT No.: PCT/JP2020/036730
§ 371 (c)(1),
(2) Date: Mar. 2, 2023

(87) PCT Pub. No.: WO2022/064721
PCT Pub. Date: Mar. 31, 2022

(65) Prior Publication Data
US 2024/0025564 A1 Jan. 25, 2024

(51) Int. Cl.
B64G 1/10 (2006.01)
H04B 7/185 (2006.01)
(52) U.S. Cl.
CPC ....... B64G 1/1007 (2013.01); H04B 7/18513 (2013.01); H04B 7/18515 (2013.01)
(58) Field of Classification Search
CPC .............. B64G 1/1007; H04B 7/18513; H04B 7/18515
See application file for complete search history.

(56) References Cited

U.S. PATENT DOCUMENTS 5,906,337 A 5/1999 Williams et al.
5,971,324 A 10/1999 Williams et al.
(Continued)

FOREIGN PATENT DOCUMENTS

EP 0 767 547 A2 4/1997
EP 0 845 876 A2 6/1998
(Continued)

OTHER PUBLICATIONS

Japanese Office Action issued Feb. 25, 2025, in corresponding Japanese Patent Application No. 2024-016989, 6pp.
(Continued)

*Primary Examiner* — Raymond S Dean
(74) *Attorney, Agent, or Firm* — XSENSUS LLP

(57) ABSTRACT

A second monitoring device includes a +X+Y sensor (11S) directed at +45 degrees, a +X−Y sensor (12S) directed at −45 degrees, a −X+Y sensor (13S) directed at +135 degrees, and a −X−Y sensor (14S) directed at −135 degrees. When flying northeastward, the second monitoring device monitors airspace above high latitudes in the Northern Hemisphere with the +X−Y sensor (12S), and monitors airspace above high latitudes in the Southern Hemisphere with the −X+Y sensor (13S). When flying southeastward, the second monitoring device monitors airspace above high latitudes in the Northern Hemisphere with the −X−Y sensor (14S), and monitors airspace above high latitudes in the Southern Hemisphere with +X+Y sensor.

8 Claims, 45 Drawing Sheets

(56)        References Cited

U.S. PATENT DOCUMENTS

| | | | |
|---|---|---|---|
| 9,250,043 B1 | 2/2016 | Block et al. | |
| 2014/0240497 A1 | 8/2014 | Shefer | |
| 2017/0026121 A1 | 1/2017 | Everett et al. | |
| 2017/0240271 A1* | 8/2017 | Fasel | B64C 23/06 |
| 2018/0172823 A1* | 6/2018 | Tyc | B64G 1/2423 |
| 2018/0305042 A1* | 10/2018 | Vaughan | H04B 7/19 |
| 2018/0372548 A1 | 12/2018 | Gosian et al. | |
| 2019/0181946 A1* | 6/2019 | Wendling | H04H 20/74 |
| 2020/0024008 A1* | 1/2020 | Mena | B64G 1/503 |
| 2020/0036437 A1* | 1/2020 | Heiman | B64G 1/10 |
| 2022/0185505 A1* | 6/2022 | Mukae | B64G 1/242 |

FOREIGN PATENT DOCUMENTS

| | | | |
|---|---|---|---|
| JP | 2-128996 A | 5/1990 | |
| JP | 5-108159 A | 4/1993 | |
| JP | 9-130317 A | 5/1997 | |
| JP | 4946398 B2 | 6/2012 | |
| JP | 2012129610 A | 7/2012 | |
| WO | 2017/175696 A1 | 10/2017 | |

OTHER PUBLICATIONS

Office Action issued for JP application No. 2024-016987 with its English translation, 6pp.

Office Action issued for JP application No. 2024-016988 with its English translation, 5pp.

International Search Report and Written Opinion mailed on Dec. 15, 2020, received for PCT Application PCT/JP2020/036730, filed on Sep. 28, 2020, 15 pages including English Translation.

\* cited by examiner

Fig. 1

↓EARTH DIRECTION

↑TRAVELING DIRECTION
FRONT RIM MONITORING FIELD OF VIEW

±60deg

←EARTH DIRECTION

±60deg

DIRECTLY-BELOW
MONITORING FIELD OF VIEW

↑EARTH DIRECTION
DIRECTLY-BELOW
MONITORING FIELD OF VIEW

ABOVE EQUATOR

EARLY ALERT SATELLITE

RELATIONSHIP BETWEEN CHANGE OF
COMMUNICATION DIRECTION FROM
EQUATORIAL SATELLITE TO
POLAR ORBIT SATELLITE AND
AZIMUTH/ELEVATION ANGLES 212 (POLAR ORBIT
SATELLITE)

400

TRAVELING DIRECTION
(+X)

EARTH DIRECTION (+Z)

SOUTH
DIRECTION
(+Y)

225

ELEVATION
ROTATION ANGLE

AZIMUTH
ROTATION ANGLE 211 (220C)
(EQUATORIAL SATELLITE)

ORBITAL ALTITUDE 20000km 212 (230C)
(POLAR ORBIT SATELLITE)

±20deg

400

234

233

±20deg 211 (230C)
(EQUATORIAL SATELLITE)

EQUATORIAL ORBIT

EQUATORIAL ORBIT
AS VIEWED FROM
NORTH POLE
ALTITUDE 20000km

±20deg

400

HEXAGONAL
COMMUNICATION-DISABLED
AREA (HEXAGON)

SAT

SAT

SAT

SAT

SAT

SAT

NORTH POLE

EQUATOR

SOUTH POLE
INCLINED ORBIT SATELLITES

60deg

45deg

1000km

NORTH POLE

SOUTH POLE
INCLINED ORBIT SATELLITES

1000km

60deg

45deg

INSTANT
FIELD-OF-VIEW RANGE
ABOVE NORTH POLE

EQUATOR

FIELD OF VIEW DUE TO
SATELLITE FLIGHT

Fig. 45

+10deg

GEOSTATIONARY ORBIT

-10deg

20deg

30deg

40deg

50deg

60deg

MONITORING SYSTEM, MONITORING SATELLITE, AND COMMUNICATION SATELLITE

CROSS-REFERENCE TO RELATED APPLICATION

The present application is based on PCT filing PCT/JP2020/036730, filed Sep. 28, 2020, the entire contents of which are incorporated herein by reference.

TECHNICAL FIELD

The present disclosure relates to a monitoring system that monitors the Earth, a satellite information transmission system that transmits satellite information, a flying object response system that deals with a flying object, and a data relay device.

BACKGROUND ART

There have conventionally been monitoring systems using satellite constellations (for example, Patent Literature 1). An advantage of an inclined orbit constellation is that a system capable of constantly monitoring a mid-latitude zone can be built with a small number of satellites. With monitoring satellites that are directed to the periphery of the Earth and detect a temperature of a flying object after being launched so as to track the flying object, it is possible to monitor the entire globe with a small number of satellites if there are monitoring devices that circularly monitor the periphery of the Earth over the entire circumference with respect to the geocentric direction.

For a new type of flying object called a hypersonic guided vehicle (HGV), effective means for tracking after completion of jetting in launch is to detect the vehicle whose temperature has risen by infrared rays. In this case, in order to prevent a background signal from becoming noise, it is effective to monitor the periphery of the Earth against the background of space. In principle, fisheye cameras can be used to circularly monitor the entire circumference, but a problem is that fisheye cameras have constraints such as spatial resolution and monitoring performance.

CITATION LIST

Patent Literature

Patent Literature 1: WO 2017/175696 A1

SUMMARY OF INVENTION

Technical Problem

An object of the present disclosure is to provide a monitoring system that can constantly monitor the entire globe with a small number of satellites and has high monitoring performance and high spatial resolution and monitoring performance.

Solution to Problem

A monitoring system according to the present disclosure includes a plurality of monitoring satellites, each including a first monitoring device directed to a surface of the Earth and a second monitoring device directed to a periphery of the Earth; and a ground facility, wherein 12 or more of the monitoring satellites form a satellite constellation as an inclined orbit satellite group flying in an inclined orbit with an orbital inclination of 10 degrees to 80 degrees, wherein when a direction of a +X axis in a positive direction in right-handed orthogonal coordinates is defined as a satellite traveling direction +X of the monitoring satellite and a direction of a +Z axis in a positive direction in the right-handed orthogonal coordinates is defined as a geocentric direction +Z of the monitoring satellite, the second monitoring device includes a +X+Y sensor directed at +45 degrees, a +X−Y sensor directed at −45 degrees, a −X+Y sensor directed at +135 degrees, and a −X−Y sensor directed at −135 degrees, each being directed around the +Z axis with respect to the +X axis, and wherein when flying northeastward, the second monitoring device monitors airspace above high latitudes in the Northern Hemisphere with the +X−Y sensor, and monitors airspace above high latitudes in the Southern Hemisphere with the −X+Y sensor, and when flying southeastward, monitors airspace above high latitudes in the Northern Hemisphere with the −X−Y sensor, and monitors airspace above high latitudes in the Southern Hemisphere with the +X+Y sensor.

Advantageous Effects of Invention

According to the present disclosure, it is possible to provide a monitoring system that can constantly monitor the entire globe with a small number of satellites and has high monitoring performance and high spatial resolution.

BRIEF DESCRIPTION OF DRAWINGS

FIG. 1 is a diagram of Embodiment 1, and is a diagram of three sides of a monitoring satellite 101 included in a monitoring system 501;

FIG. 9 is a diagram of Embodiment 1, and is a diagram of four sides of a monitoring satellite 103 included in a monitoring system 503;

FIG. 13 is a diagram of Embodiment 1, and is a diagram of four sides of a communication satellite 201 included in a satellite information transmission system 600;

FIG. 14 is a diagram of Embodiment 1, and is a diagram of four sides of a communication satellite 202 included in the satellite information transmission system 600;

FIG. 15 is a diagram of Embodiment 1, and is a diagram illustrating transmission of satellite information of the monitoring system 501 by the satellite information transmission system 600;

FIG. 16 is a diagram of Embodiment 1, and is a diagram illustrating transmission of satellite information of the monitoring system 502 by the satellite information transmission system 600;

FIG. 45 is a diagram of Embodiment 3, and is another diagram illustrating a relationship between orbital latitudes and tangents to the Earth.

DESCRIPTION OF EMBODIMENTS

Embodiments will be described hereinafter with reference to the drawings. Throughout the drawings, the same or corresponding parts are denoted by the same reference sign. In the description of the embodiments, description of the same or corresponding parts will be suitably omitted or simplified.

Embodiment 1

Description of Configurations

In the following embodiments, a traveling direction and a geocentric direction of a satellite are defined as follows.

A direction of a +X axis in a positive direction in right-handed orthogonal coordinates is defined as a satellite traveling direction +X of the satellite, and a direction of a +Z axis in a positive direction in the right-handed orthogonal coordinates is defined as a geocentric direction +Z of the satellite.

In the following embodiments, a sensor means an infrared sensor.

<Monitoring System 501: Inclined Orbit>

Referring to FIGS. 1 to 7, a monitoring system 501 will be described.

In the monitoring system 501, a monitoring satellite 101 flies in an inclined orbit.

Figure 1:
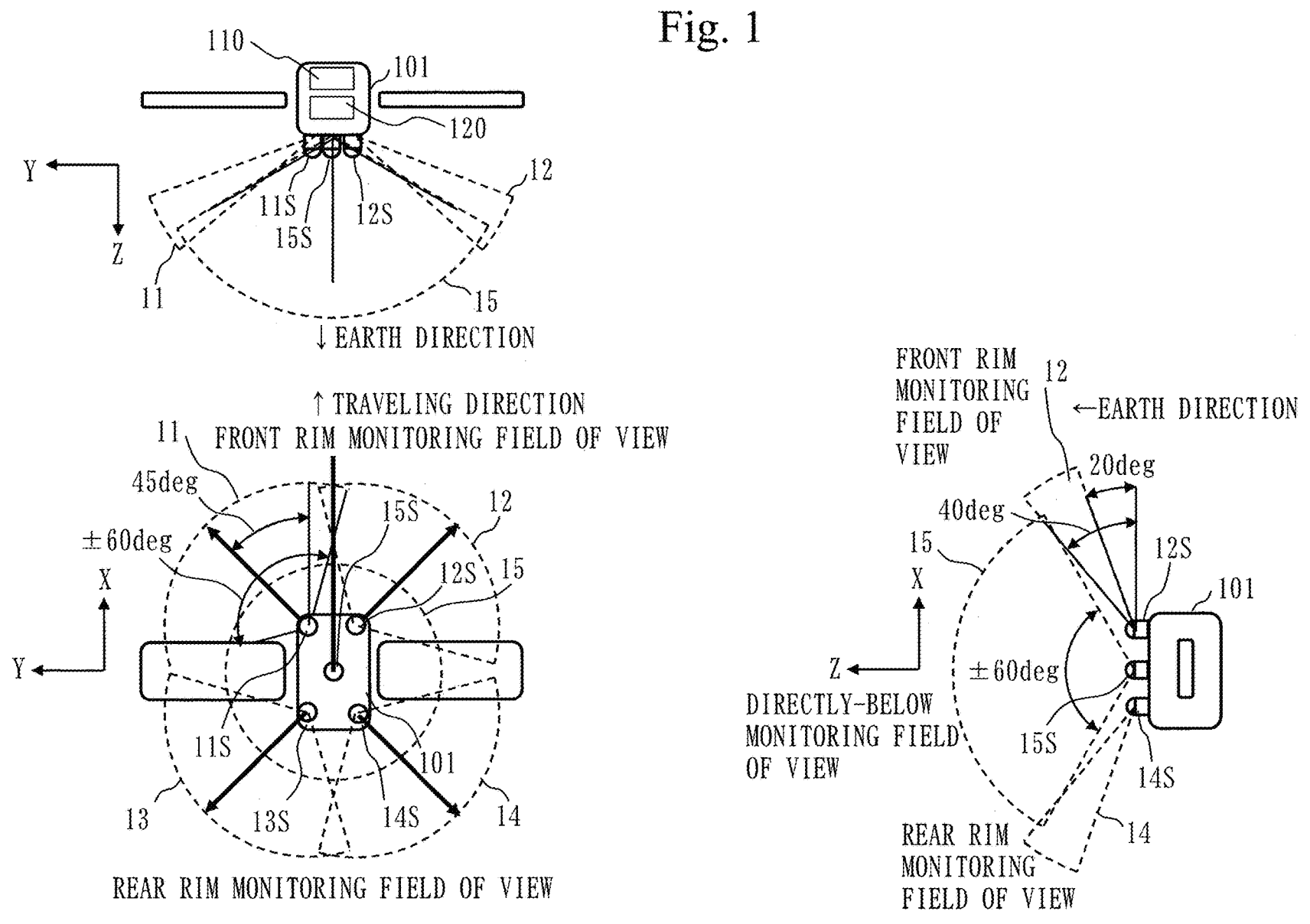

FIG. 1 is a diagram of three sides of the monitoring satellite 101 included in the monitoring system 501.

Figure 2:
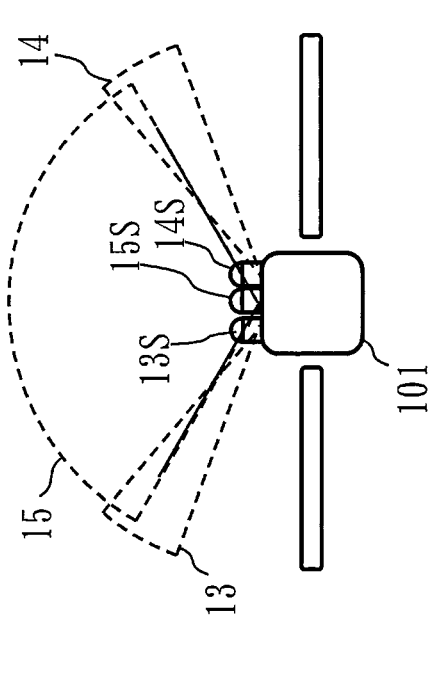
FIG. 2 is a diagram of Embodiment 1, and is a diagram of the monitoring satellite 101 as seen on a YZ plane.

FIG. 2 is a diagram of the monitoring satellite 101 as seen on a YZ plane.

Figure 3:
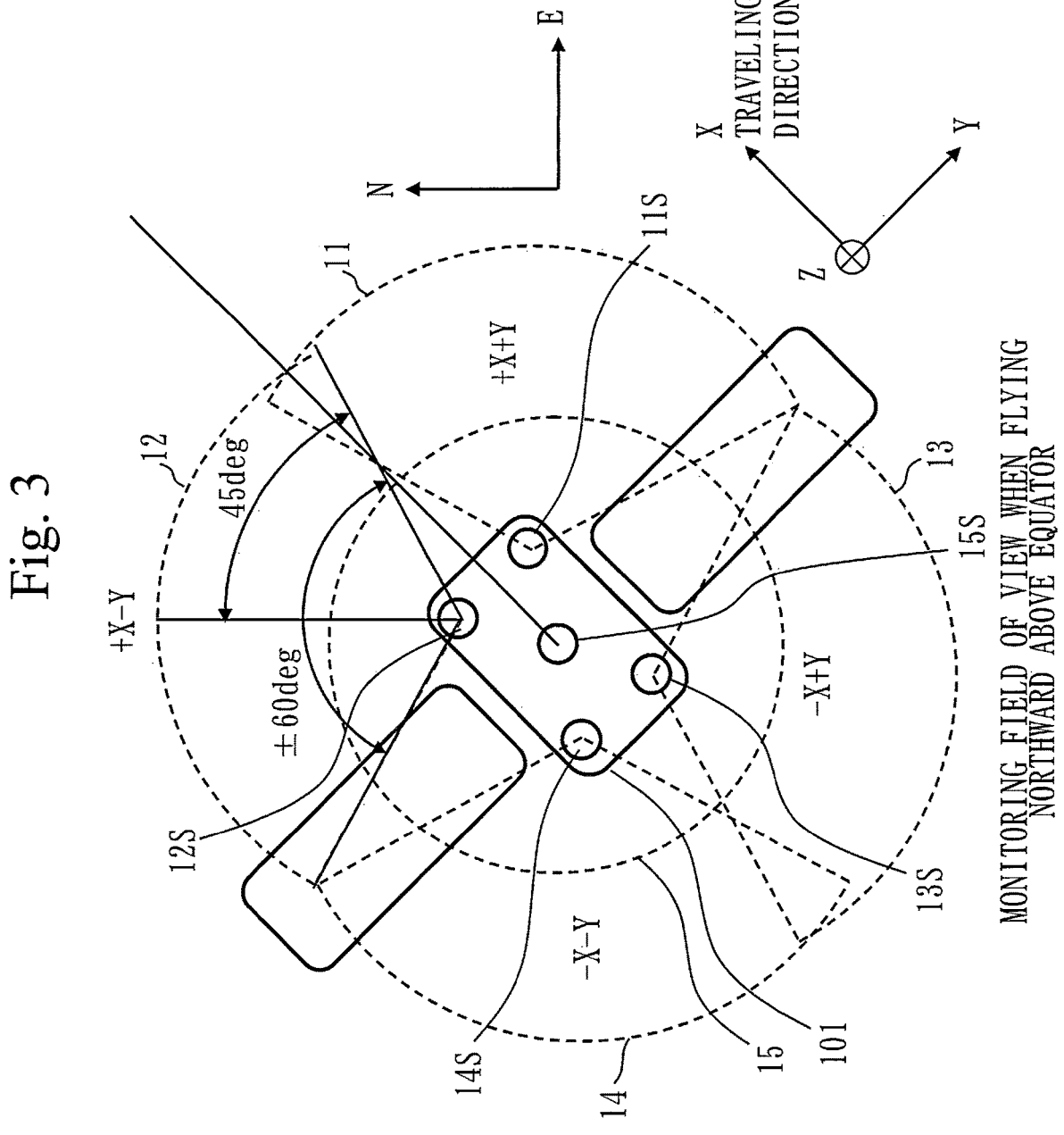
FIG. 3 is a diagram of Embodiment 1, and is a diagram illustrating a monitoring field of view when the monitoring satellite 101 flies northward above the equator.

FIG. 3 illustrates a monitoring field of view when the monitoring satellite 101 flies northward above the equator.

Figure 4:
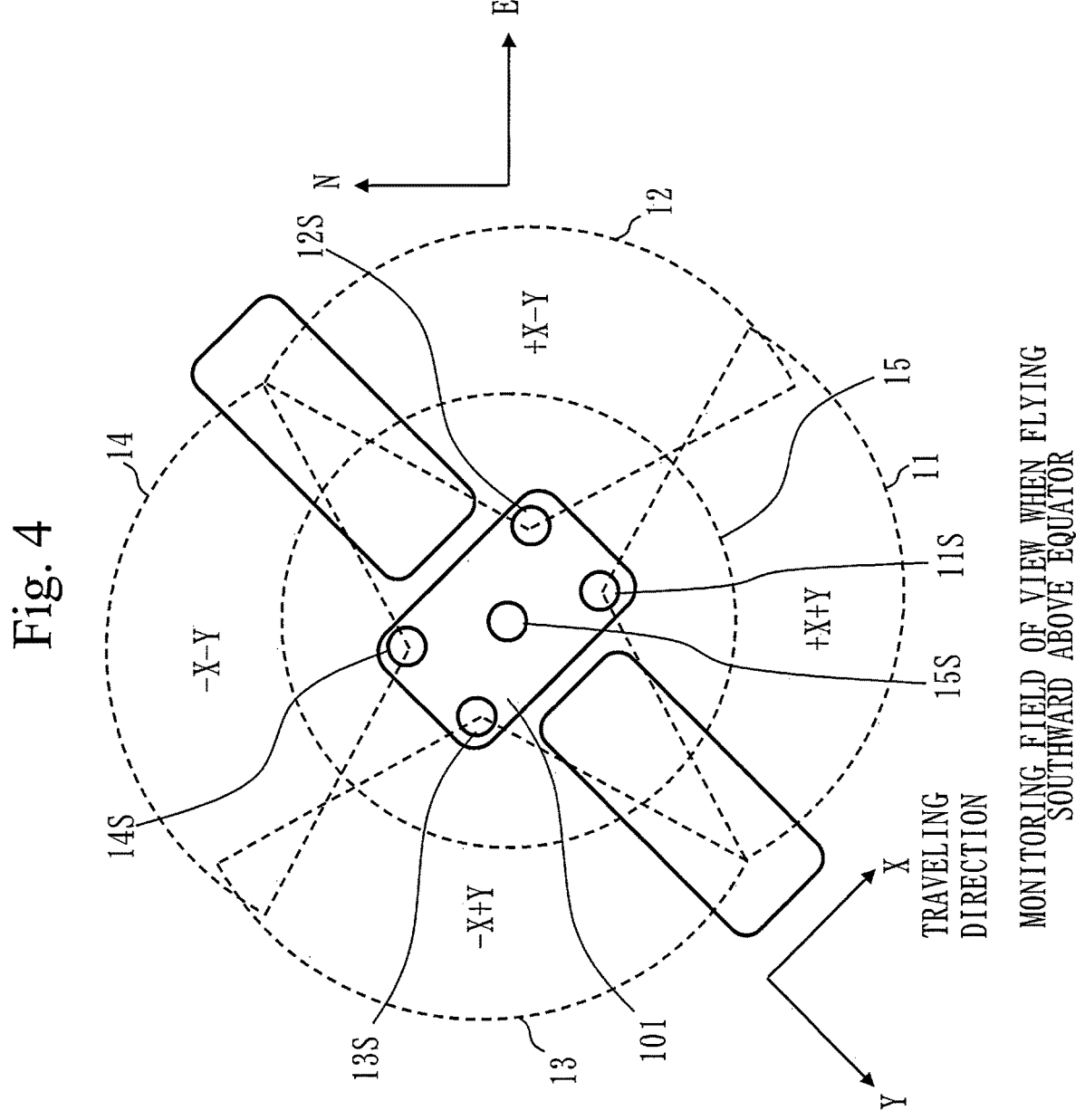
FIG. 4 is a diagram of Embodiment 1, and is a diagram illustrating a monitoring field of view when the monitoring satellite 101 flies southward above the equator.

FIG. 4 illustrates a monitoring field of view when the monitoring satellite 101 flies southward above the equator.

Figure 5:
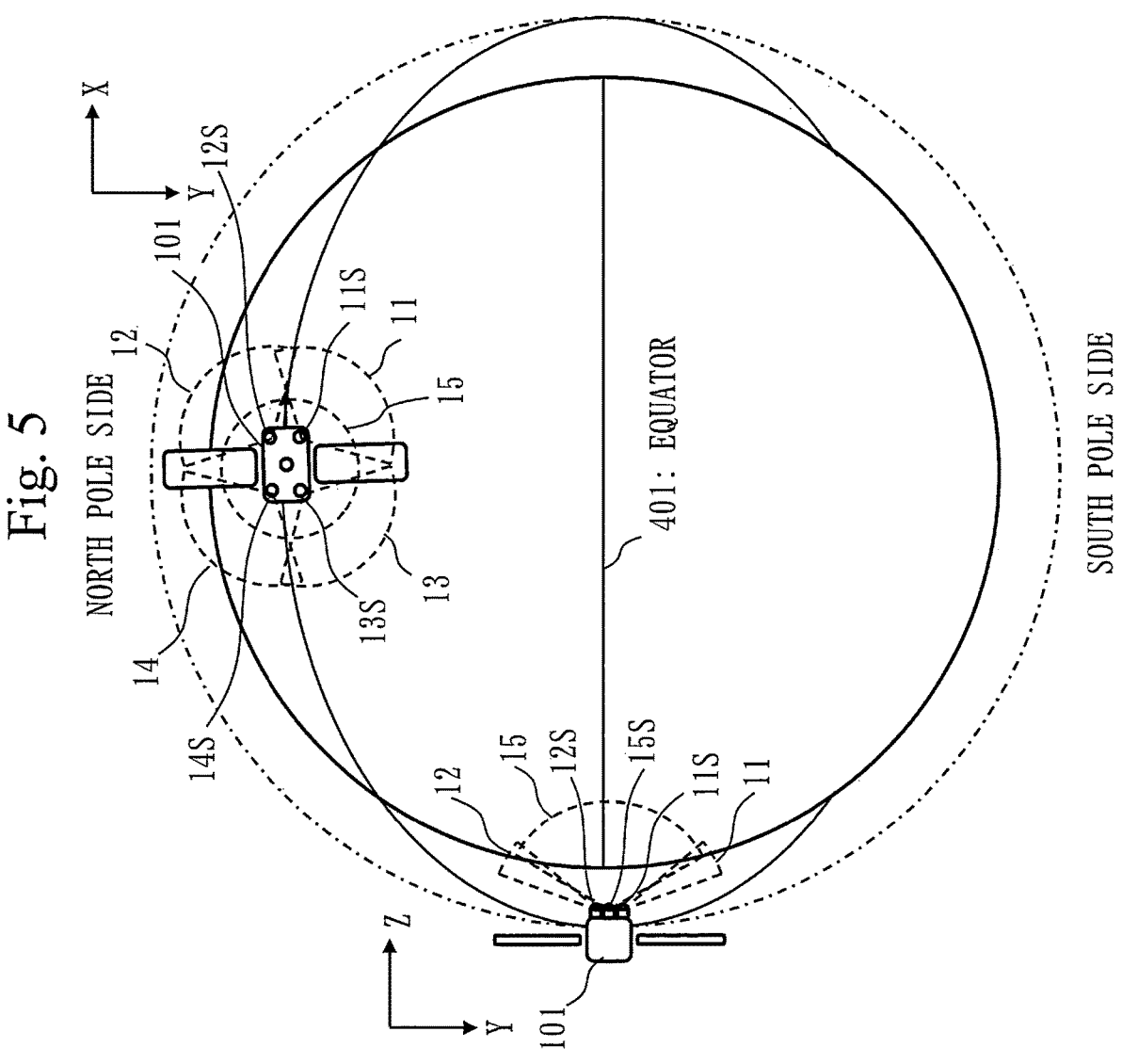
FIG. 5 is a diagram of Embodiment 1, and is a diagram illustrating a state in which the monitoring satellites 101 are located above the equator and at the northernmost point of an orbital plane.

FIG. 5 illustrates a state in which the monitoring satellites 101 are located above the equator and at the northernmost point of an orbital plane.

Figure 6:
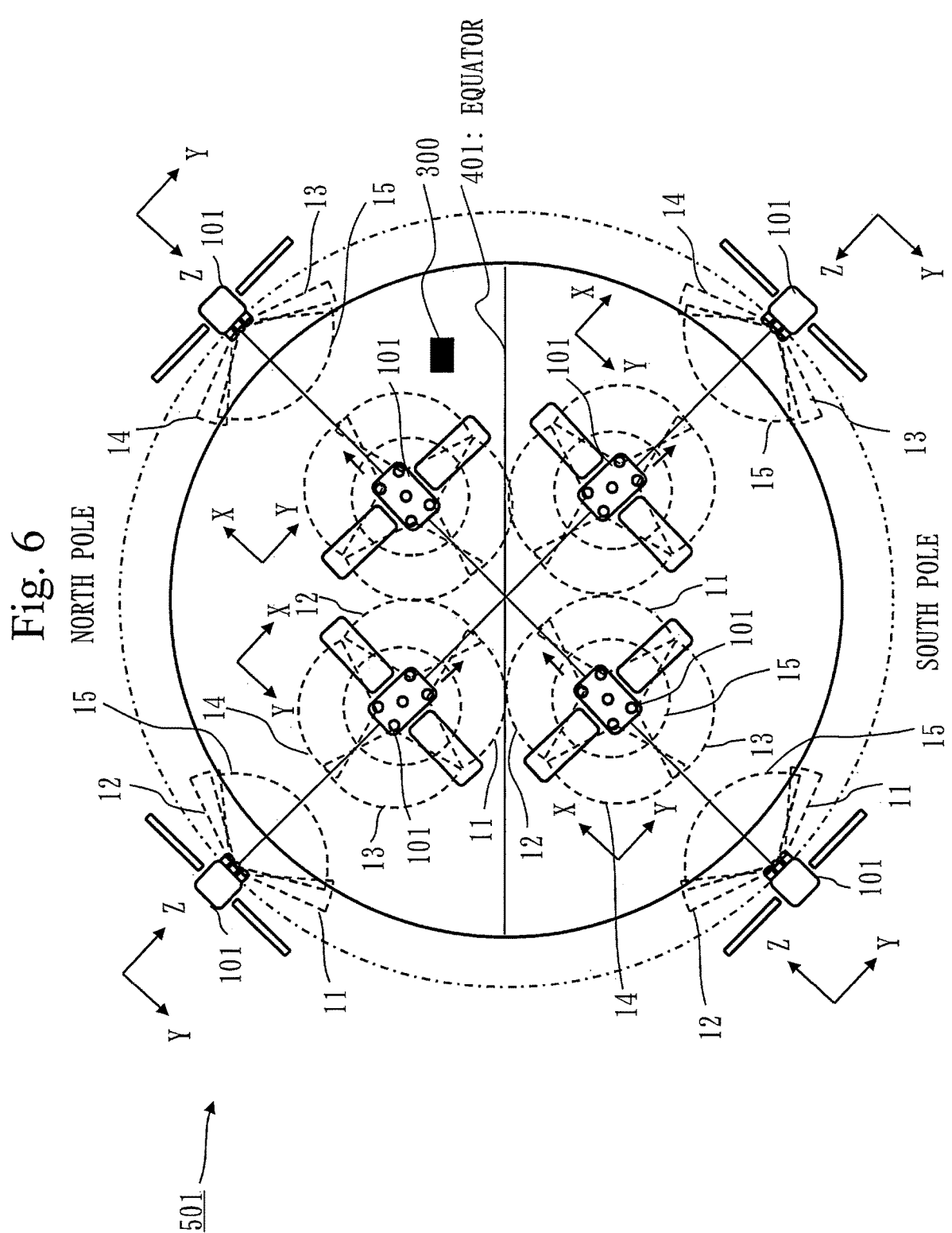
FIG. 6 is a diagram of Embodiment 1, and is a diagram illustrating a state in which a plurality of the monitoring satellites 101 fly in each of two inclined orbits.

FIG. 6 illustrates a state in which a plurality of monitoring satellites 101 fly in each of two inclined orbits.

Figure 7:
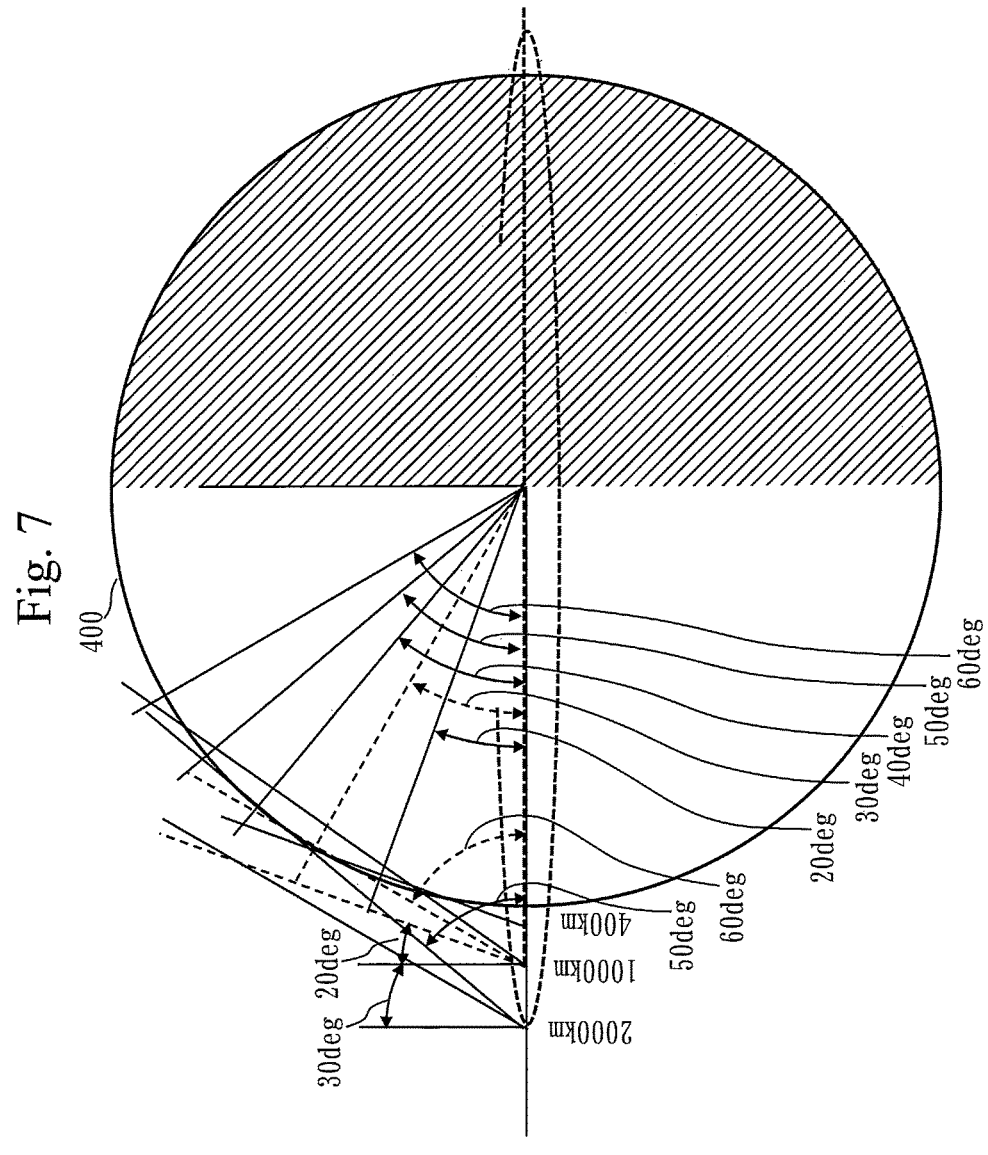
FIG. 7 is a diagram of Embodiment 1, and is a diagram illustrating a relationship between orbital altitudes and latitudes of monitoring fields of view directed to the periphery of the Earth.

FIG. 7 illustrates a relationship between orbital altitudes and latitudes of a monitoring field of view directed to the periphery of the Earth.

As illustrated in FIG. 6, the monitoring system 501 includes a plurality of monitoring satellites 101 and a ground facility 300. The ground facility 300 to be described below receives monitoring information acquired by a monitoring satellite from the monitoring satellite via a relay satellite. As illustrated in FIG. 1, the monitoring satellite 101 includes a first monitoring device 110 directed to the surface of the Earth and a second monitoring device 120 directed to the periphery of the Earth. In the monitoring system 501, 12 or more of the monitoring satellites 101 form a satellite constellation as an inclined orbit satellite group flying in an inclined orbit with an orbital inclination of 10 degrees to 80 degrees.

As illustrated in FIG. 1, in the monitoring system 501, when the direction of the +X axis in the positive direction in the right-handed orthogonal coordinates is defined as the satellite traveling direction +X of the monitoring satellite 101, and the direction of the +Z axis in the positive direction in the right-handed orthogonal coordinates is defined as the geocentric direction +Z of the monitoring satellite 101, the second monitoring device 120 includes a +X+Y sensor 11S directed at +45 degrees, a +X−Y sensor 12S directed at −45 degrees, a −X+Y sensor 13S directed at +135 degrees, and a −X−Y sensor 14S directed at −135 degrees, where each of the sensors is directed around the +Z axis with respect to the +X axis.

The second monitoring device 120, when flying northeastward, monitors airspace above high latitudes in the Northern Hemisphere with the +X−Y sensor 12S, and monitors airspace above high latitudes in the Southern Hemisphere with the −X+Y sensor 13S, and when flying southeastward, monitors airspace above high latitudes in the Northern Hemisphere with the −X−Y sensor 14S, and monitors airspace above high latitudes in the Southern Hemisphere with the +X+Y sensor 11S.

This will be described specifically below.

An advantage of the inclined orbit constellation is that a system that can constantly monitor a mid-latitude zone can be built with a small number of satellites. With monitoring satellites that are directed to the periphery of the Earth and detect the temperature of a flying object after being launched so as to track the flying object, it is possible to monitor the entire globe with a small number of satellites if there are monitoring devices that circularly monitor the periphery of the Earth around the entire circumference with respect to the geocentric direction.

For a new type of flying object called a hypersonic guided vehicle (HGV), effective means for tracking after completion of jetting in launch is infrared detection of the vehicle whose temperature has risen. In monitoring the HGV, in order to prevent a background signal from becoming noise, it is effective to monitor the periphery of the Earth against the background of space, and the second monitoring device 120 is rational means for monitoring. In principle, the entire circumference of the Earth can be monitored circularly by fisheye cameras. However, a problem is that the fisheye cameras have restrictions such as spatial resolution and monitoring performance.

Therefore, by securing a monitoring field of view over the entire circumference with respect to the geocentric direction using a plurality of wide fields of view, the feasibility of spatial resolution and monitoring performance increases.

However, it is characteristic of an inclined orbit that the direction of the field of view of a monitoring device varies greatly when flying above the equator and at the northernmost point or southernmost point of the orbital plane. In terms of effective utilization of electricity generated by satellites, it is rational to appropriately manage overlapping areas in the field-of-view ranges of a satellite group forming a satellite constellation.

Therefore, in the monitoring system 501 of Embodiment 1, the second monitoring device 120 that monitors the periphery of the Earth has a total of four sensors that are the +X+Y sensor 11S directed at +45 degrees, the +X−Y sensor 12S directed at +45 degrees, the −X+Y sensor 13S directed at +135 degrees, and the −X−Y sensor 14S directed at −135 degrees, where each of the sensors is directed around the +Z axis in the geocentric direction with respect to the satellite traveling direction +X.

The second monitoring device 120, when flying northeastward, monitors airspace above high latitudes in the Northern Hemisphere with the +X−Y sensor 12S, and monitors airspace above high latitudes in the Southern Hemisphere with the −X+Y sensor 13S, and when flying southeastward, monitors airspace above high latitudes in the Northern Hemisphere with the −X−Y sensor 14S, and monitors airspace above high latitudes in the Southern Hemisphere with the +X+Y sensor 11S.

In FIG. 1, a monitoring field of view 11 of the +X+Y sensor 11S, a monitoring field of view 12 of the +X−Y sensor 12S, a monitoring field of view 13 of the −X+Y sensor 13S, and a monitoring field of view 14 of the −X−Y sensor 14S (brown) are indicated by dashed lines.

The first monitoring device 110 includes a directly-below monitoring sensor 15S with a monitoring field of view 15 directly below in the geocentric direction +Z. The monitoring field of view 15 of the directly-below monitoring sensor 15S is indicated by dashed lines.

In order to monitor airspace above high-latitude regions or airspace above the equator against the background of space, a satellite constellation using an inclined orbit satellite group is advantageous because a polar orbit satellite group and an equatorial orbit satellite group have limitations in the monitoring range. In satellites flying in line in the same orbital plane, there are many overlaps in the field-of-view ranges between front fields of view and rear fields of view.

Therefore, in the monitoring system 501, four monitoring fields of view of the second monitoring device 120 are inclined about 45 degrees from the satellite traveling direction +X, as illustrated on XY coordinates in FIG. 1. This makes it possible to rationally realize monitoring of airspace above high latitudes, such as the polar regions, and airspace above the equator and save satellite resources in latitude zones with many overlaps.

In an inclined orbit, a satellite flying northeastward above the equator will fly eastward at the northernmost point of the orbital plane and then change its flight direction to southeastward. Similarly, a satellite flying southeastward above the equator will fly eastward at the southernmost point of the orbital plane and then change its flight direction to northeastward. Therefore, the directions of the four fields of view of the second monitoring device 120 vary greatly in the north, south, east, and west directions.

As illustrated in FIG. 3, when the monitoring satellite 101 passes above the equator northeastward, the +X−Y sensor 12S directed at −45 degrees monitors airspace above middle to high latitudes in the Northern Hemisphere. As illustrated in FIG. 4, when the monitoring satellite 101 passes above the equator southeastward, the −X−Y sensor 14S (brown) directed at −135 degrees monitors airspace above middle to high latitudes in the Northern Hemisphere. Similarly, as illustrated in FIG. 3, when the monitoring satellite 101 passes above the equator northeastward, the −X+Y sensor 13S (yellow) directed at +135 degrees monitors airspace above middle to high latitudes in the Southern Hemisphere. As illustrated in FIG. 4, when the monitoring satellite 101 passes above the equator southeastward, the +X+Y sensor 11S directed at +45 degrees monitors airspace above middle to high latitudes in the Southern Hemisphere.

It is obvious from FIGS. 3 and 4 that if only the Northern Hemisphere is to be monitored, only the +X−Y sensor 12S directed at −45 degrees and the −X−Y sensor 14S directed at −135 degrees may be installed. By simultaneously monitoring a flying object from a plurality of monitoring satellites, there is an effect that an orbital location can be measured using the principle of spatial triangulation and measurement accuracy improves as the number of monitoring satellites increases. Therefore, by simultaneously operating the second monitoring device 120 with the four sensors in each of the monitoring satellites 101, there is an effect that monitoring can be performed with high measurement accuracy in a wide monitoring area. In addition, by operating only sensors with high monitoring effects when the monitoring area is limited, there is an effect that satellite resources such as electricity can be saved.

<Periphery Monitoring>

Figure 20:
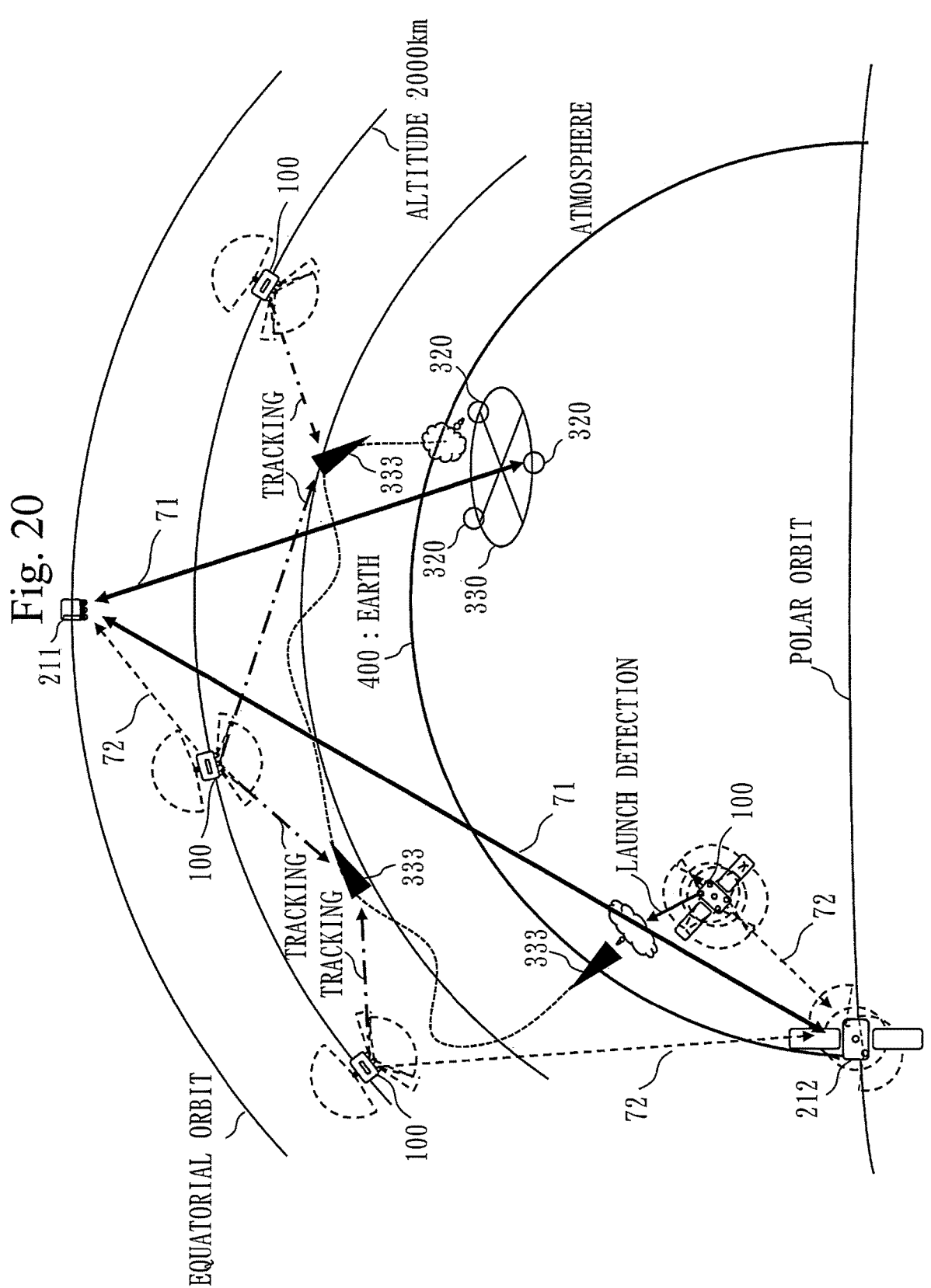
FIG. 20 is a diagram of Embodiment 2, and is a diagram illustrating transmission using optical communication 71, radio communication 72, and a communication line 330.

This will be described with reference to FIG. 7. When the periphery of the Earth is monitored from an orbital altitude of 1000 km, if a line-of-sight vector is inclined 30 degrees in the elevation direction with respect to the north direction of the north-south axis, the satellite points to the vicinity of 30 degrees north latitude in the tangent direction. When the periphery of the Earth is monitored from an orbital altitude of 2000 km, if the line-of-sight vector is inclined 40 degrees in the elevation direction with respect to the north direction of the north-south axis, the satellite points to the vicinity of 40 degrees north latitude in the tangent direction. Therefore, with a field-of-view range of 20 degrees to 40 degrees in elevation with respect to the XY plane, the line-of-sight vector of the second monitoring device 120 can monitor the periphery of the Earth from the monitoring satellite at an orbital altitude of 1000 km to 2000 km. In FIGS. 1, 20 deg and 40 deg indicated in the view on the XZ plane indicate this field-of-view range.

<Monitoring System 502: Equatorial Orbit>

Figure 8:
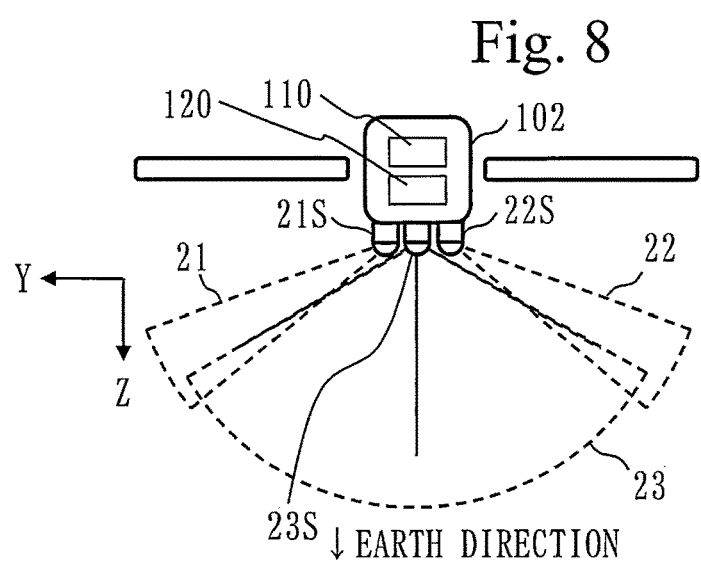
FIG. 8 is a diagram of Embodiment 1, and is a diagram of four sides of a monitoring satellite 102 included in a monitoring system 502.
Figure 8:
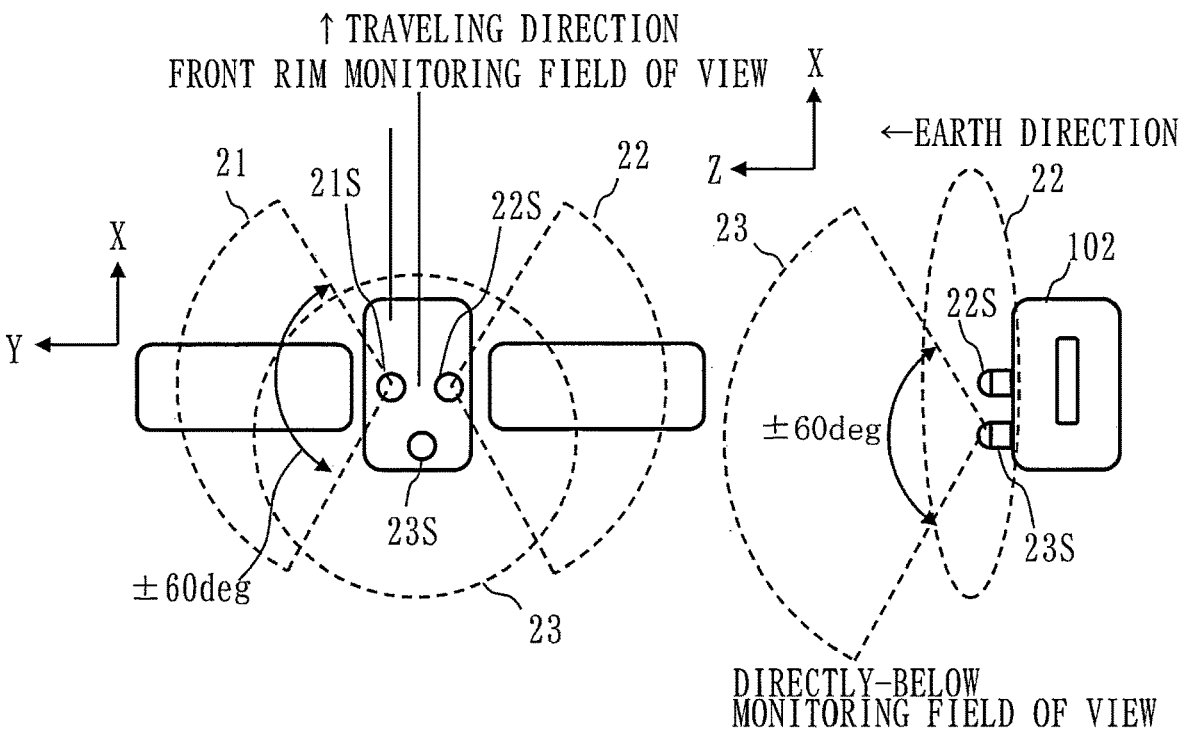
Figure 8:
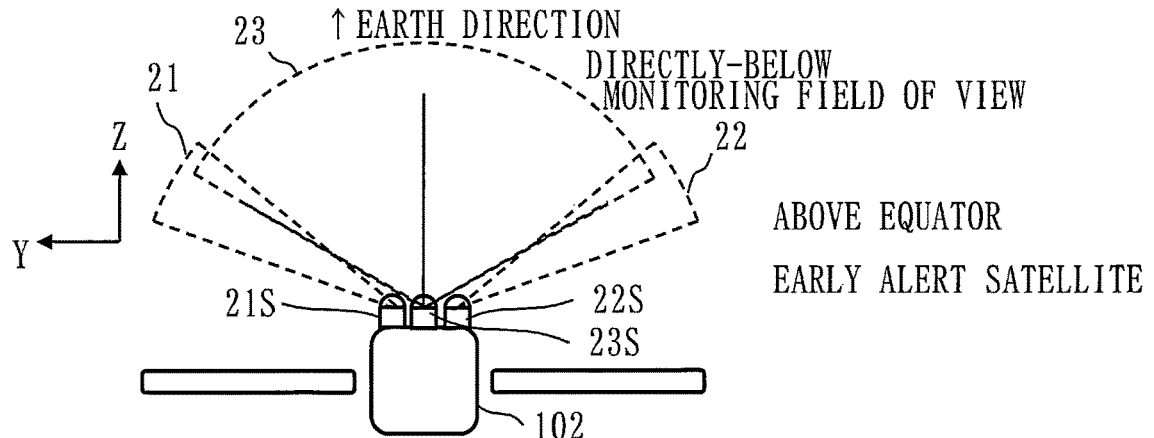

FIG. 8 is a diagram of four sides of a monitoring satellite 102 included in a monitoring system 502. Referring to FIG. 8, the monitoring system 502 will be described.

The monitoring system 502 includes a plurality of monitoring satellites 102, each including a first monitoring device 110 directed to the surface of the Earth and a second monitoring device 120 directed to the periphery of the Earth, and a ground facility 300. Six or more of the monitoring satellites 102 form a satellite constellation as an equatorial orbit satellite group flying in an equatorial orbit with an orbital inclination of 10 degrees or less. The monitoring system 502 includes the ground facility 300 as in FIG. 6.

As illustrated in FIG. 8, in the monitoring system 502, when the direction of the +X axis in the positive direction in the right-handed orthogonal coordinates is defined as the satellite traveling direction +X of the monitoring satellite 102 and the direction of the +Z axis in the positive direction in the right-handed orthogonal coordinates is defined as the geocentric direction +Z of the monitoring satellite 102, the second monitoring device 120 includes a +Y sensor 21S directed at +90 degrees, and a −Y sensor 22S directed at −90 degrees, where each of the sensors is directed around the +Z axis with respect to the +X axis.

The second monitoring device monitors airspace above middle latitudes in the Northern Southern Hemisphere with the +Y sensor 21S, and monitors airspace above middle latitudes in the Southern Northern Hemisphere with the −Y sensor 22S.

In FIG. 8, a monitoring field of view 21 of the +Y sensor 21S and a monitoring field of view 22 of the −Y sensor 22S are indicated by dashed lines.

The first monitoring device 110 includes a directly-below monitoring sensor 23S with a monitoring field of view 23 directly below in the geocentric direction +Z. The monitoring field of view 23 of the directly-below monitoring sensor 23S is indicated by dashed lines.

It is obvious that if only the Northern Southern Hemisphere or the Southern Northern Hemisphere is to be monitored, only one of the +Y sensor 21S directed at +90 degrees and the −Y sensor 22S directed at −90 degrees may be installed.

<Monitoring System 503: Polar Orbit>

Figure 9:
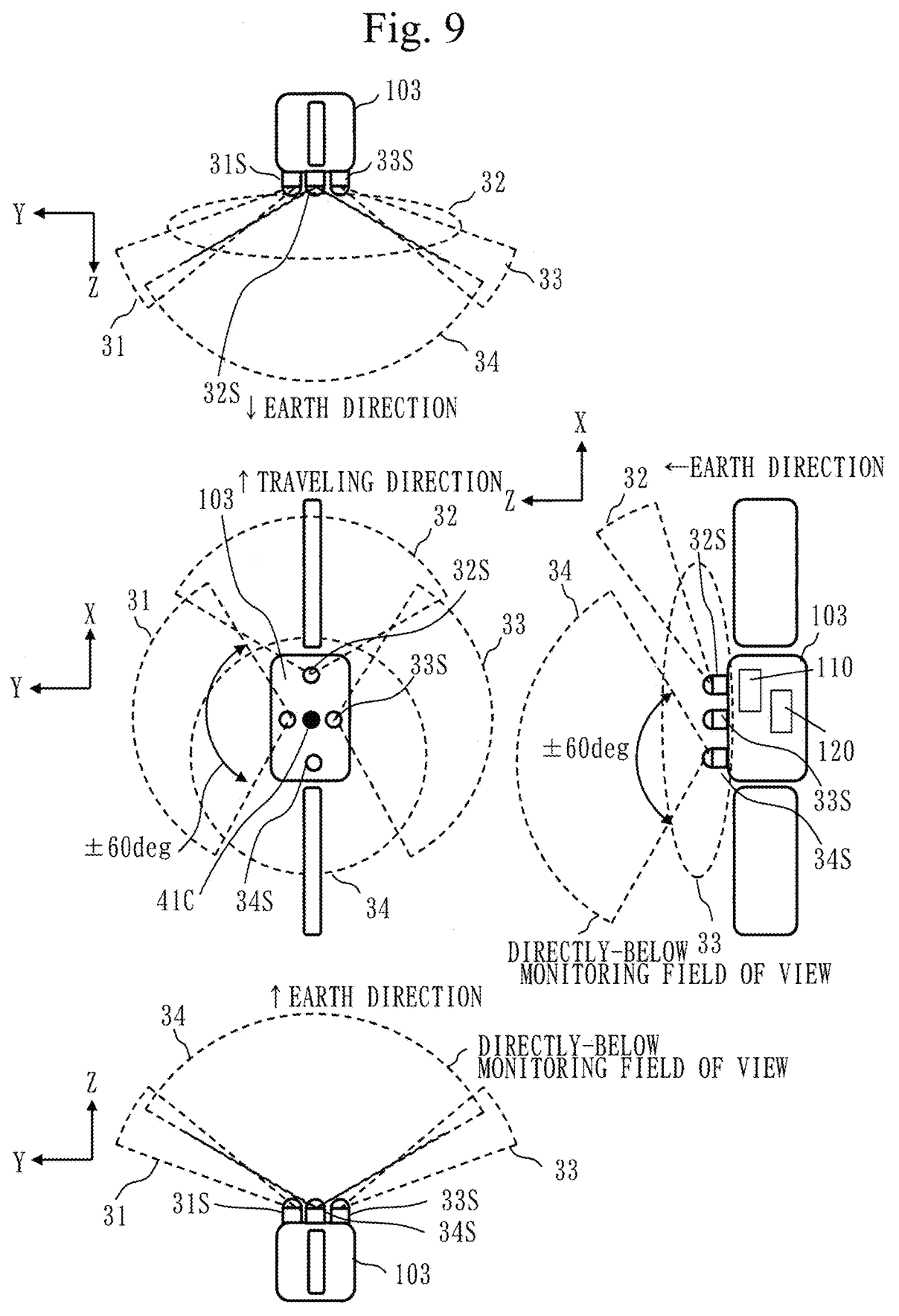

FIG. 9 is a diagram of four sides of a monitoring satellite 103 included in a monitoring system 503. Referring to FIG. 9, the monitoring system 503 will be described.

The monitoring system 503 includes a plurality of monitoring satellites 103, each including a first monitoring device 110 directed to the surface of the Earth and a second monitoring device 120 directed to the periphery of the Earth, and a ground facility 300. Six or more of the monitoring satellites 103 form a satellite constellation as a polar orbit satellite group flying in a polar orbit with an orbital inclination of 80 degrees or more. The monitoring system 503 includes the ground facility 300 as in FIG. 6. The monitoring satellites 103 fly in a dawn-dusk orbit, which is a sun-synchronous orbit.

When the direction of the +X axis in the positive direction in the right-handed orthogonal coordinates is defined as the satellite traveling direction +X of the monitoring satellite 103 and the direction of the +Z axis in the positive direction in the right-handed orthogonal coordinates is defined as the geocentric direction +Z of the monitoring satellite, the second monitoring device 120 includes a +X sensor 31S directed in the direction of +X axis, a +Y sensor 32S directed at +90 degrees around the +Z axis with respect to the +X axis, and a −Y sensor 33S directed at −90 degrees around the +Z axis with respect to the +X axis.

The second monitoring device 120 monitors the +X direction with the +X sensor 31S, monitors airspace above the east side of the Earth with the +Y sensor 32S, and monitors airspace above the west side of the Earth with the −Y sensor 33S.

In FIG. 9, a monitoring field of view 31 of the +X sensor 31S, a monitoring field of view 32 of the +Y sensor 32S, and a monitoring field of view 33 of the −Y sensor 33S are indicated by dashed lines.

The first monitoring device 110 includes a directly-below monitoring sensor 34S with a monitoring field of view 34 directly below in the geocentric direction +Z. The monitoring field of view 34 of the directly-below monitoring sensor 34S is indicated by dashed lines. The monitoring satellite 103 illustrated in FIG. 9 includes a communication device 41C. The communication device 41C will be described later.

In the polar orbit, the monitoring satellites 103 pass the polar regions during every orbit, so that the monitoring system 503 can secure monitoring coverage of high-latitude regions even with one orbital plane. In the monitoring system 503, the monitoring satellites powered by solar cells can fly with fixed solar array wings always directed to the sun by flying in a polar orbit called a dawn-dusk orbit.

<Communication Device 41C>

Each of the monitoring satellite 101, the monitoring satellite 102, and the monitoring satellite 103 includes communication device 41C.

Figure 10:
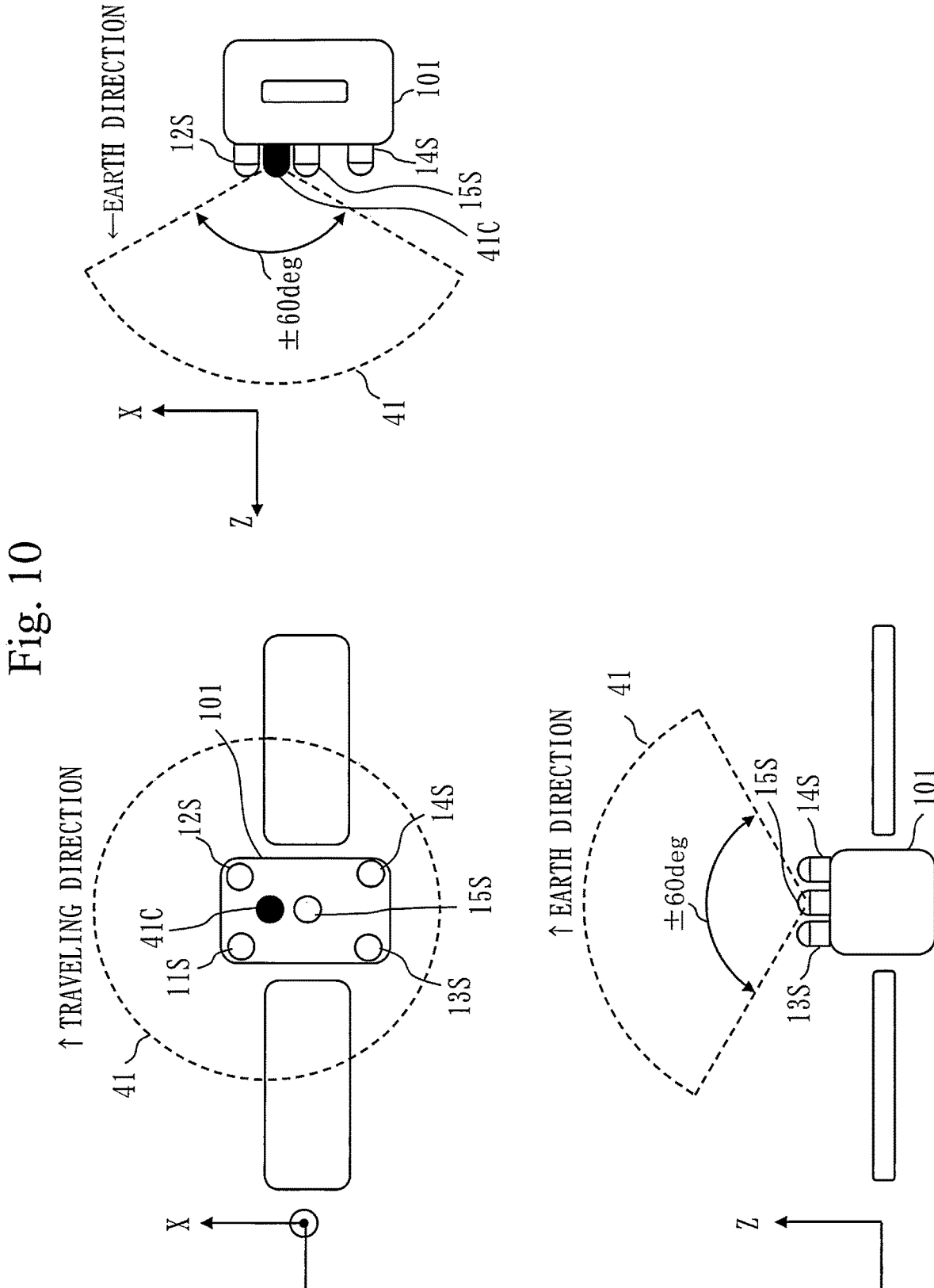
FIG. 10 is a diagram of Embodiment 1, and is a diagram illustrating the monitoring satellite 101 including a communication device 41C.

FIG. 10 illustrates the monitoring satellite 101 including the communication device 41C.

Figure 11:
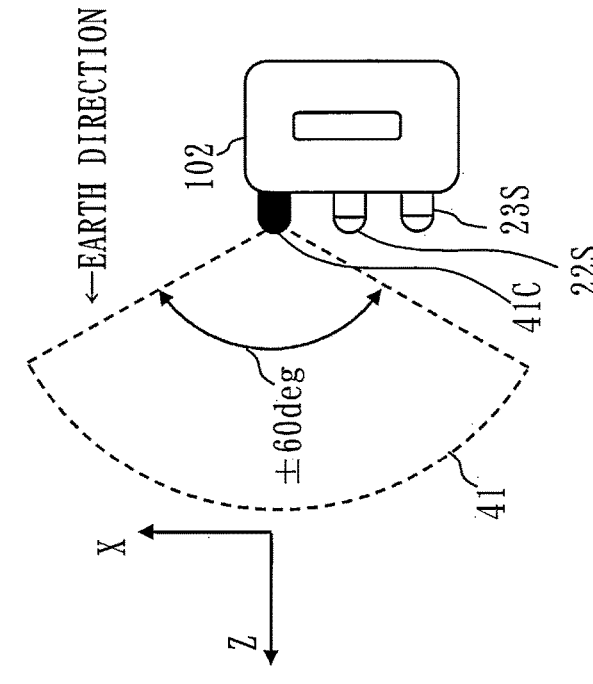
FIG. 11 is a diagram of Embodiment 1, and is a diagram illustrating the monitoring satellite 102 including the communication device 41C.
Figure 11:
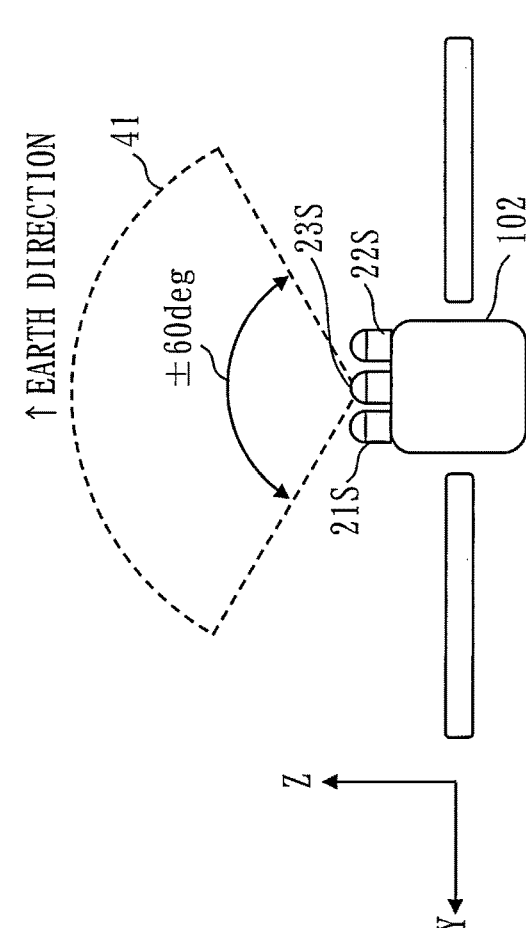

FIG. 11 illustrates the monitoring satellite 102 including the communication device 41C.

Figure 12:
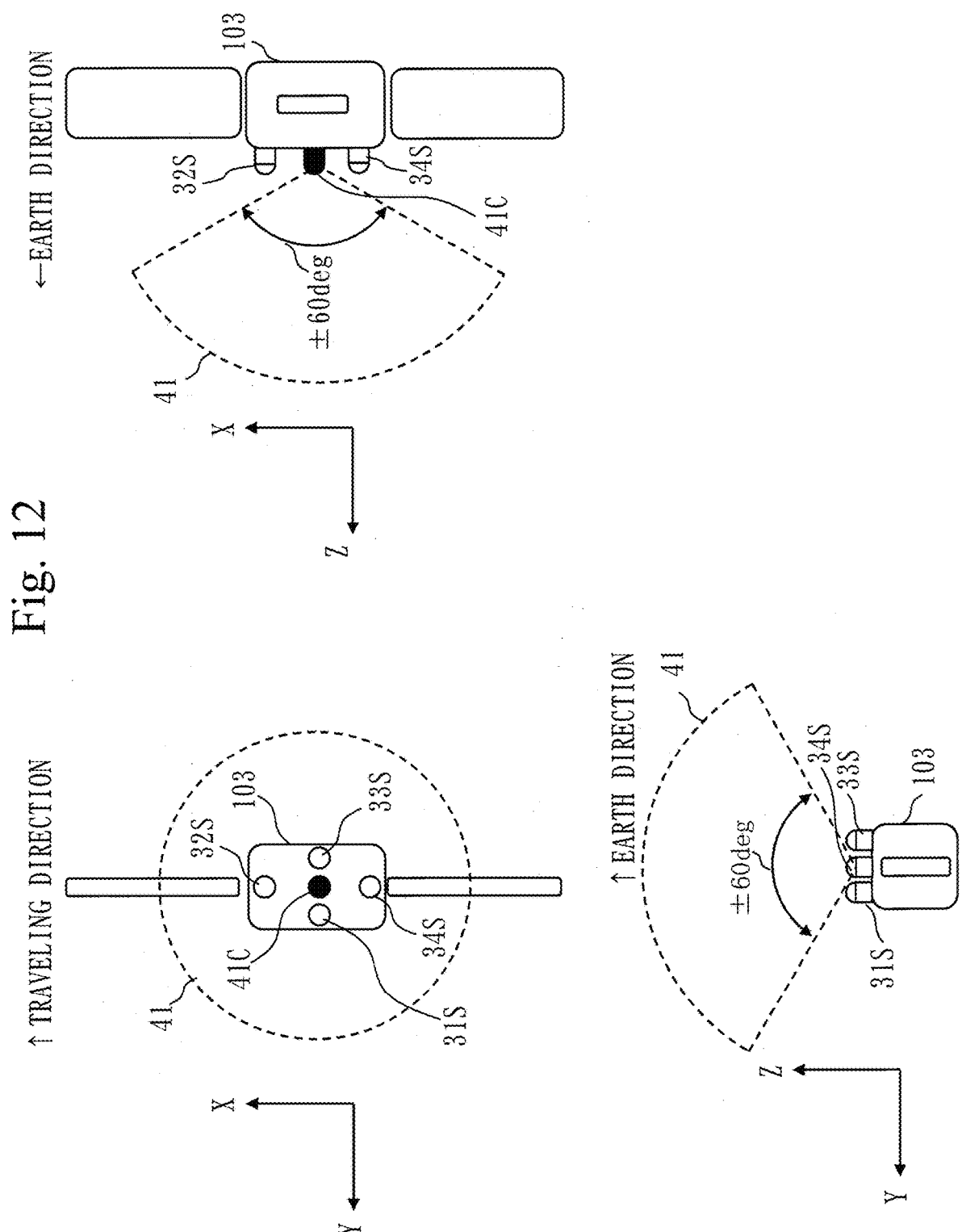
FIG. 12 is a diagram of Embodiment 1, and is a diagram illustrating the monitoring satellite 103 including the communication device 41C.

FIG. 12 illustrates the monitoring satellite 103 including the communication device 41C. In FIGS. 10 to 12, a communication field of view 41 of the communication device 41C is indicated. In the following, when the monitoring satellites 101, 102, and 103 are not to be distinguished, they will be denoted as a monitoring satellite 100.

As illustrated in FIGS. 10 to 12, the monitoring satellite 100 includes the communication device 41C.

The communication device 41C has the communication field of view 41 of ±60 degrees or more around the +X axis with respect to the +Z axis and ±60 degrees or more around the +Y axis with respect to the +Z axis.

The communication device 41C transmits monitoring information acquired by the monitoring satellite 100 directly to the ground facility 300, or transmits it to the ground facility 300 via a communication satellite that relays satellite information.

The communication satellite will be described later.

A satellite constellation formed by a plurality of monitoring satellites 100 included in the monitoring system 501, the monitoring system 502, or the monitoring system 503 is formed at an orbital altitude of 1000 km or higher.

The monitoring satellites 100 forming the satellite constellation transmit acquired monitoring information to the ground facility 300 via a satellite information transmission system that is a transmission system formed at orbital altitudes of 800 km or lower to relay and transmit satellite information between the monitoring satellites 100 and the ground facility 300. The satellite information transmission system will be described later.

The satellite constellation has an advantage in that the lower the altitude, the shorter a transmission delay.

A plan to build a satellite information transmission system at an orbital altitude of 300 km to 700 km is known. Even if a monitoring system in which a communication field of view is provided on the side facing the Earth of a monitoring satellite is at an orbital altitude of about 1000 km, monitoring information can be transmitted via a satellite information transmission system at an orbital altitude of 800 km or lower.

The following may be arranged.

A satellite constellation formed by a plurality of monitoring satellites 100 included in the monitoring system 501, the monitoring system 502, or the monitoring system 503 is formed at an orbital altitude of 1200 km or higher.

The monitoring satellites 100 forming the satellite constellation transmit acquired monitoring information to the ground facility 300 via a satellite information transmission system that is a transmission system formed at an orbital altitude of 1000 km or lower to relay and transmit satellite information between the monitoring satellites 100 and the ground facility 300.

The satellite constellation has an advantage in that the higher the altitude, the smaller the number of satellites that can secure a wide field-of-view range. A plan to build a satellite information transmission system at an orbital altitude of about 1000 km is known, and if a monitoring system in which a communication field of view is provided on the side facing the Earth of a monitoring satellite is at an orbital altitude of 1200 km or higher, monitoring information can be transmitted via the satellite information transmission system at an orbital altitude of about 1000 km.

<Satellite Information Transmission System 600>

Referring to FIGS. 13 to 17, a satellite information transmission system 600 will be described.

Figure 13:
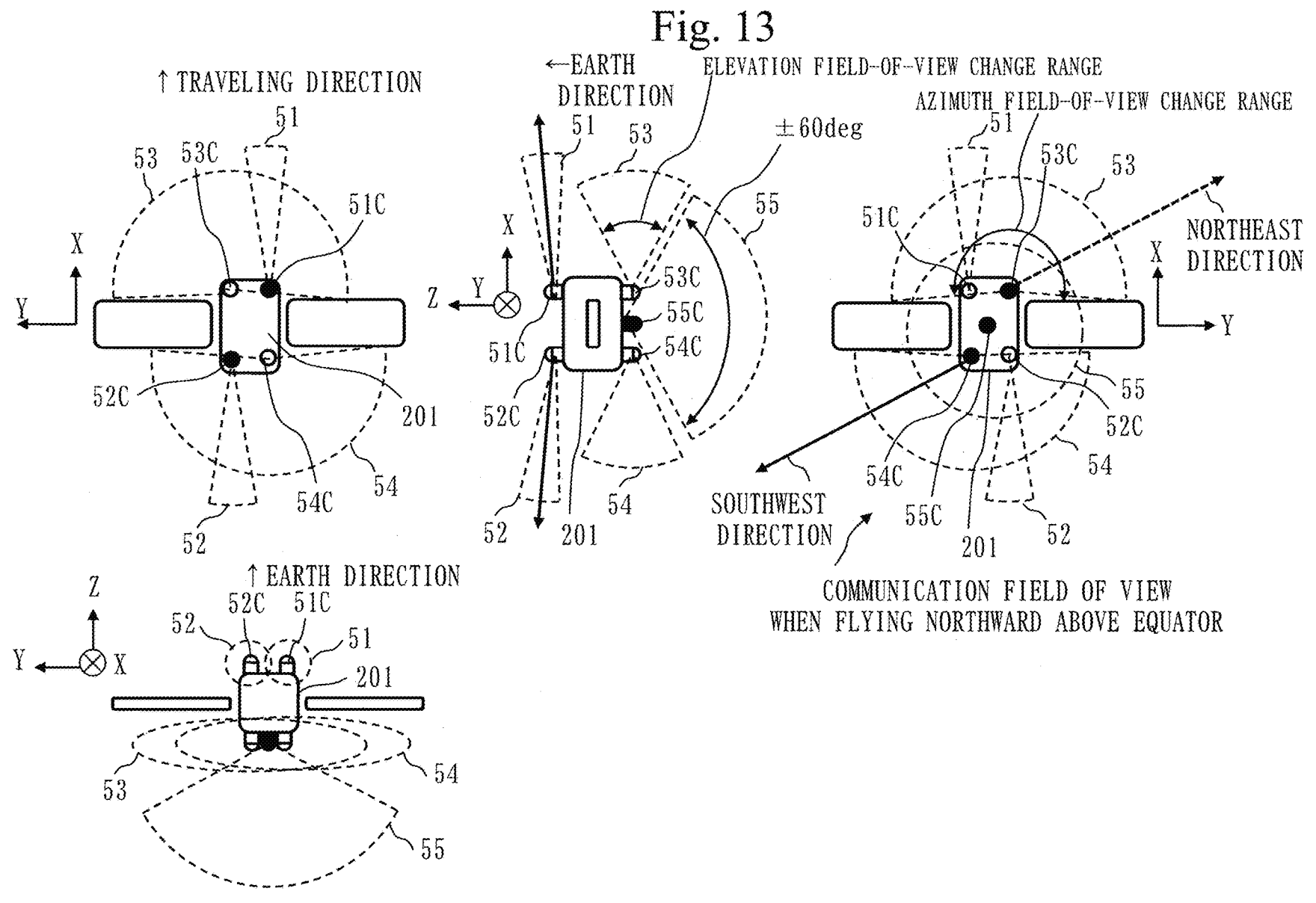

FIG. 13 is a diagram of four sides of a communication satellite 201 included in the satellite information transmission system 600.

The communication satellite 201 includes a communication device 55C that communicates with a monitoring satellite located in a direction opposite to the Earth. In two views on XY coordinates in FIG. 13, communication devices that are located on the other side and cannot actually be seen are indicated by blank circles and communication devices that are actually present are indicated by filled circles. In FIG. 13, two communication devices are placed on the side facing the Earth, and three communication devices are placed on the side opposite to the Earth.

Figure 14:
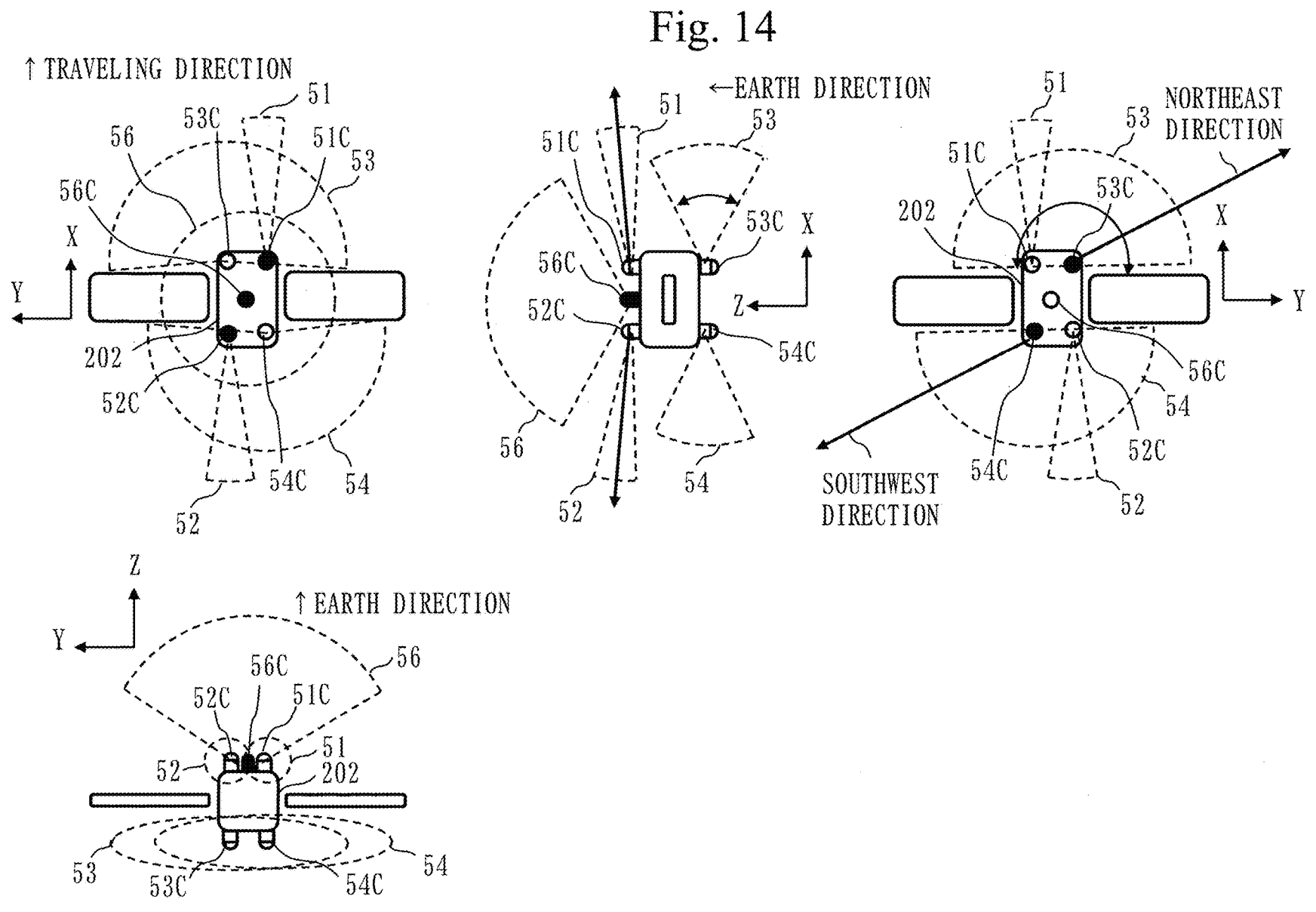

FIG. 14 is a diagram of four sides of a communication satellite 202 included in the satellite information transmission system 600.

The meanings of filled circles and blank circles in FIG. 14 are the same as in FIG. 13. In FIG. 14, a communication device 56C that communicates with the ground facility 300 is placed on the side facing the Earth.

Figure 15:
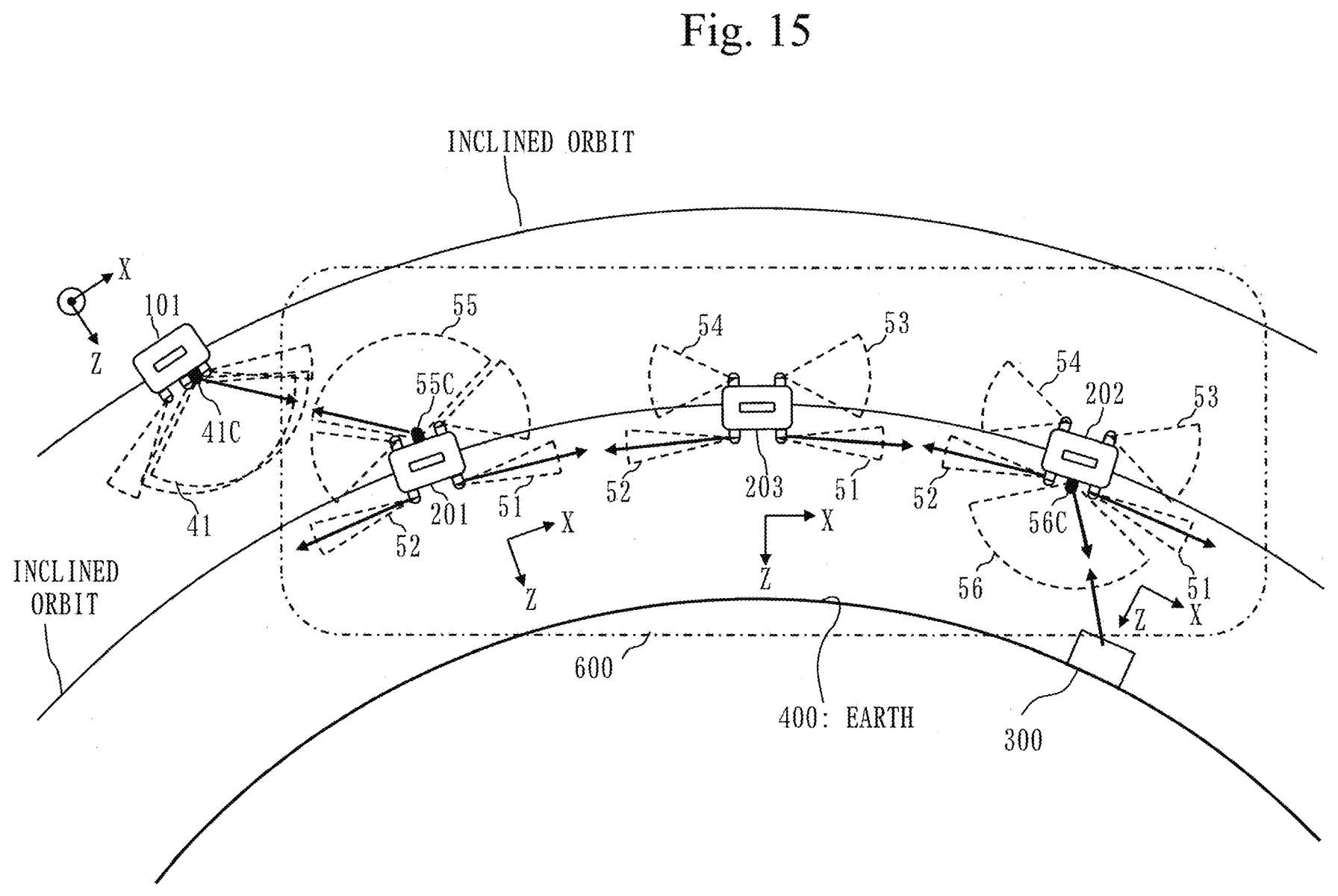

FIG. 15 illustrates that the satellite information transmission system 600 transmits satellite information of the monitoring system 501.

Figure 16:
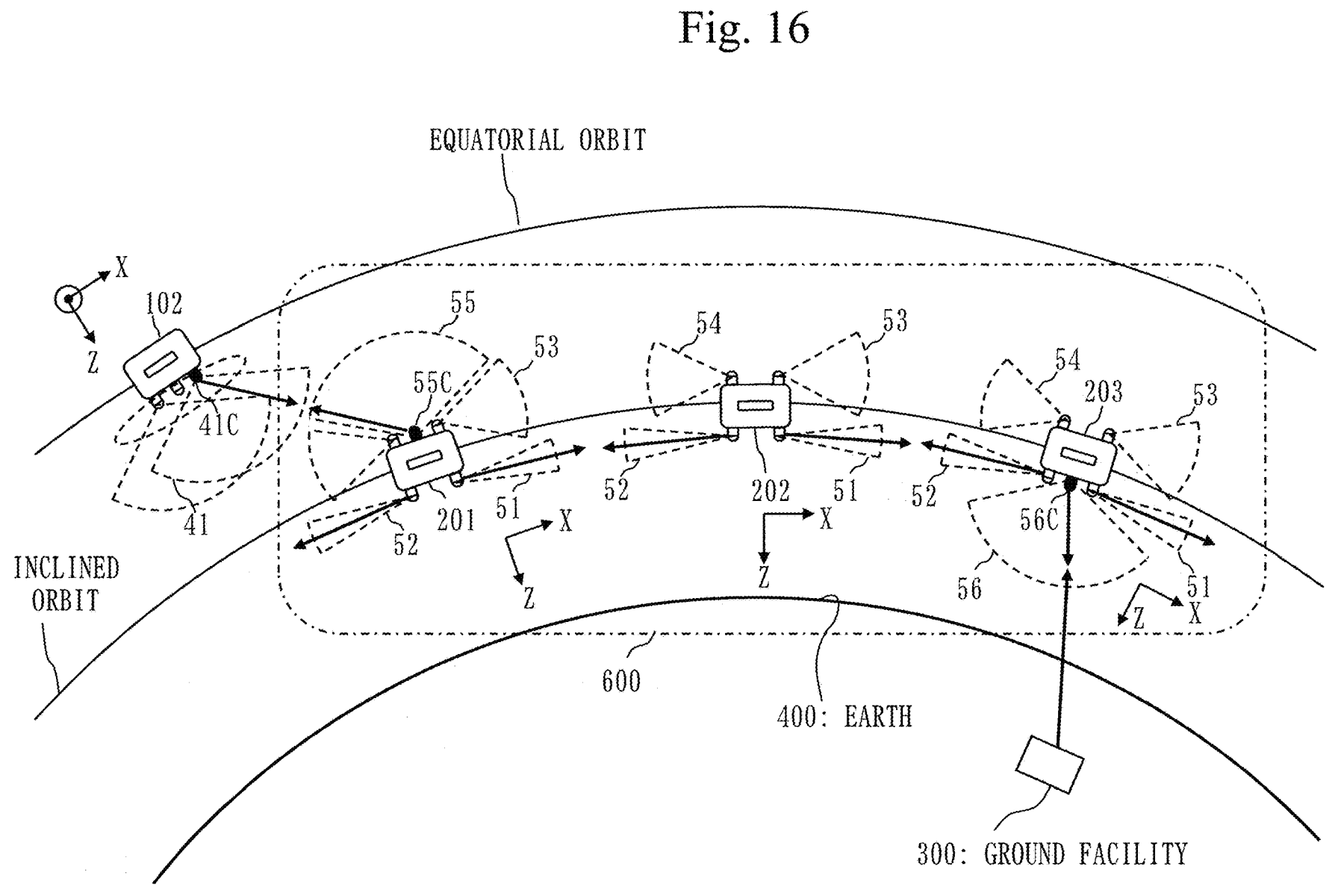

FIG. 16 illustrates that the satellite information transmission system 600 transmits satellite information of the monitoring system 502.

Figure 17:
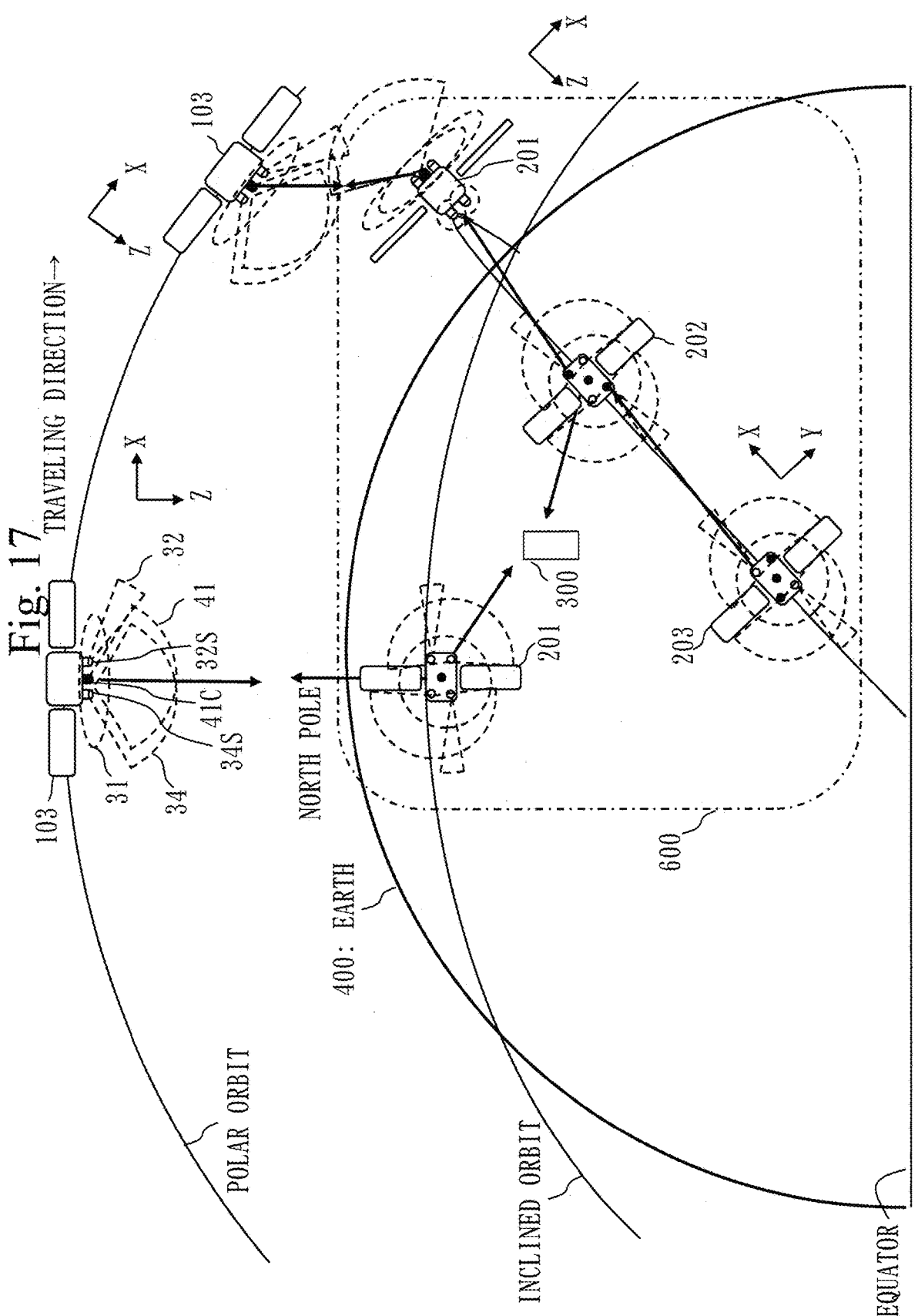
FIG. 17 is a diagram of Embodiment 1, and is a diagram illustrating transmission of satellite information of the monitoring system 503 by the satellite information transmission system 600.

FIG. 17 illustrates that the satellite information transmission system 600 transmits satellite information of the monitoring system 503.

Referring to FIG. 13, the communication satellite 201 will be described. In the satellite information transmission system 600, eight or more communication satellites, each including an inter-satellite communication device that communicates with other satellites and a ground-communicating communication device that communicates with the ground facility 300, are placed and fly in the same orbital plane. More specifically, eight or more communication satellites, each including the inter-satellite communication device and the ground-communicating communication device, fly in the same orbital plane with approximately even spacing. Then, by placing eight or more orbital planes in the longitude direction, a plurality of communication satellites form a satellite constellation. More specifically, eight or more orbital planes are placed approximately evenly in the longitude direction. Being placed approximately evenly in the longitude direction means that there are eight or more orbital planes obtained by rotating one orbital plane around a rotation axis corresponding to the virtual NS axis connecting the North Pole and the South Pole and these orbital planes are placed with approximately even spacing. The eight or more orbital planes are inclined orbits.

When the direction of the +X axis in the positive direction in the right-handed orthogonal coordinates is defined as the satellite traveling direction +X of the communication satellite 201, and the direction of the +Z axis in the positive direction in the right-handed orthogonal coordinates is defined as the geocentric direction +Z of the communication satellite 201, at least one communication satellite, which is the communication satellite 201, includes a first optical communication device 51C that performs optical communication with a satellite in front in a flight direction in the same orbital plane when passing above the equator northward, a second optical communication device 52C that performs optical communication with a satellite behind in the flight direction in the same orbital plane when passing above the equator northward, a third optical communication device 53C that performs optical communication with a satellite flying northeast of an adjacent orbit on an east side with respect to a +Y axis in a positive direction in the right-handed orthogonal coordinates when passing above the equator northward, a fourth optical communication device 54C that performs optical communication with a satellite flying southwest of an adjacent orbit on a west side with respect to the +Y axis when passing above the equator northward, and a communication device 55C that is the monitoring communication device that is directed in an opposite direction (−Z) of the direction of the +Z axis and communicates with the monitoring satellite 100 when passing above the equator northward.

An azimuth communication field of view of the third optical communication device 53C is ±90 degrees or more with respect to the direction of the +X axis.

An azimuth communication field of view of the fourth optical communication device 54C is ±90 degrees or more with respect to an opposite direction of the +X axis. A communication field of view of the communication device 55C with respect to the monitoring satellite 100 is ±60 degrees or more around the +X axis and ±60 degrees or more around the +Y axis with respect to the opposite direction of the +Z axis. In FIG. 13, the communication field of view of each communication device is indicated. The reference sign of the communication field of view is the number of the reference sign of each communication device without C of the alphabet.

<Communication Satellite 202>

The satellite information transmission system 600 includes the communication satellite 202 illustrated in FIG. 14.

The communication satellite 202 differs from the communication satellite 201 in that the communication device 56C is placed on the side facing the Earth. The communication device 56C of FIG. 14 is directed in the direction of the +X axis and communicates with the ground facility 300. In FIG. 14, the communication field of view of each communication device is indicated. The reference sign of the communication field of view is the number of the reference sign of each communication device without C of the alphabet. A communication field of view 56 of the communication device 56C with respect to the ground facility 300 is ±60 degrees or more around the +X axis with respect to the +Z axis and ±60 degrees or more around the +Y axis with respect to the +Z axis.

It has been described above that the communication satellite 201 includes the communication device 55C and the communication satellite 202 includes the communication device 56C. However, both the communication satellite 201 and the communication satellite 202 may include the communication device 55C and the communication device 56C.

<Transmission of Monitoring Information in Monitoring System 501>

FIG. 15 will be described. In the satellite information transmission system 600, the communication satellite 201, the communication satellite 202, and a communication satellite 203 are illustrated. Unlike the communication satellite 201, the communication satellite 203 does not include the communication device 55C. A situation is illustrated where monitoring information acquired by the monitoring satellite 101 is transmitted sequentially to the communication satellite 201, the communication satellite 203, the communication satellite 202, and the ground facility 300 on Earth 400.

<Transmission of Monitoring Information in Monitoring System 502>

FIG. 16 will be described. In the satellite information transmission system 600, the communication satellite 201, the communication satellite 202, and the communication satellite 203 are illustrated. A situation is illustrated where monitoring information acquired by the monitoring satellite 102 is transmitted sequentially to the communication satellite 201, the communication satellite 203, the communication satellite 202, and the ground facility 300.

<Transmission of Monitoring Information in Monitoring System 503>

FIG. 17 will be described. In the satellite information transmission system 600, the communication satellites 201, the communication satellite 202, and the communication satellite 203 are illustrated. Monitoring information acquired by the monitoring satellite 103 above the North Pole is transmitted to the communication satellite 201 located at the North Pole and then to the ground facility 300. Monitoring information acquired by the monitoring satellite 103 located to the right of the monitoring satellite 103 above the North Pole is transmitted to the communication satellite 201, then to the communication satellite 202, and then to the ground facility 300.

Effects of Embodiment 1

According to the monitoring system of Embodiment 1, it is possible to provide the monitoring system that can constantly monitor the entire globe with a small number of satellites and has high monitoring performance and high spatial resolution.

According to the satellite information transmission system of Embodiment 1, monitoring information acquired by the monitoring satellite 100 can be efficiently transmitted to the ground facility 300.

Embodiment 2

Referring to FIGS. 18 to 40, Embodiment 2 will be described. Embodiment 2 relates to a flying object response system 700. The flying object response system 700 is integration of the monitoring system and the satellite information transmission system of Embodiment 1.

Figure 18:
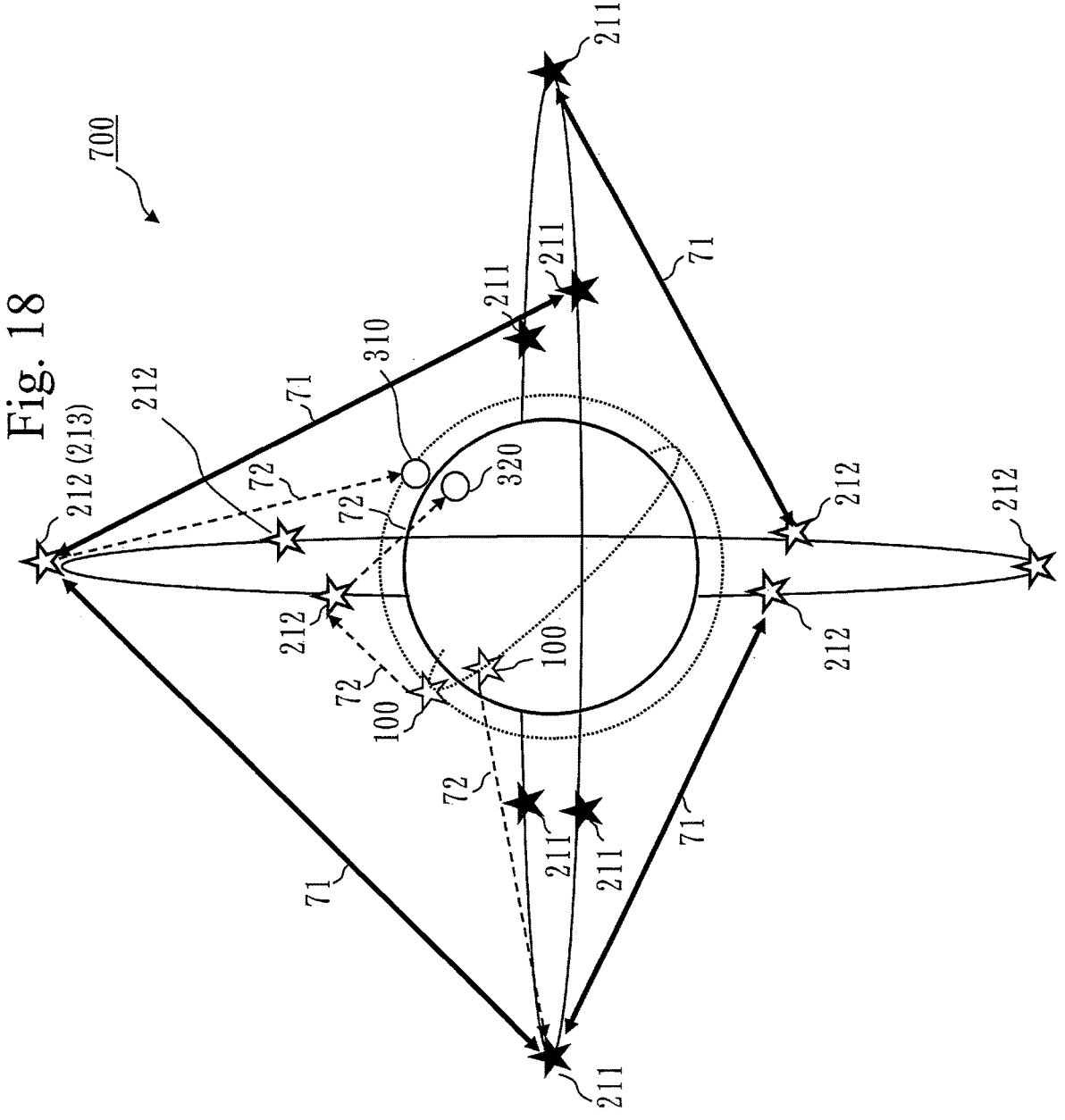
FIG. 18 is a diagram of Embodiment 2, and is a diagram illustrating a flying object response system 700.

FIG. 18 illustrates the flying object response system 700.

As illustrated in FIG. 18, the flying object response system 700 includes a first data relay satellite 211 that flies above the equator at an orbital altitude of 2000 km or higher, a second data relay satellite 212 that flies in a polar orbit at an orbital altitude of 2000 km or higher, a plurality of monitoring satellites 100 that fly at an orbital altitude of 2000 km or lower, a response device 310 that moves in airspace of the atmosphere, on ground, or at sea, and a response device 320 fixed on the ground.

A monitoring satellite group, which is the plurality of monitoring satellites 100, acquires monitoring information of a flying object 333 that is launched from the ground to fly, and transmits the monitoring information via the data relay satellite 211 or 212 to the response device 310 or 320. The response device 310 or 320 performs a response action for the flying object 333, using the transmitted monitoring information.

The flying object response system 700 includes three or more of the first data relay satellites 211 and three or more of the second data relay satellites 212. The first data relay satellites 211 and the second data relay satellites 212 are communication satellites.

In the flying object response system 700, optical communication 71 and radio communication 72 are performed. The optical communication 71 and the radio communication 72 illustrated in FIG. 18 are examples. Combinations of the optical communication 71 and the radio communication 72 are, for example, the following variations (1) to (4).

(1) The optical communication 71 is performed between at least one pair of a pair of the first data relay satellites 211, a pair of the second data relay satellites 212, and a pair of the first data relay satellite 211 and the second data relay satellite 212.

(2) The radio communication 72 is performed between the data relay satellite 211 or 212 and the monitoring satellite 100, and the radio communication 72 is performed between the data relay satellite 211 or 212 and the response device 310 or 320.

Figure 19:
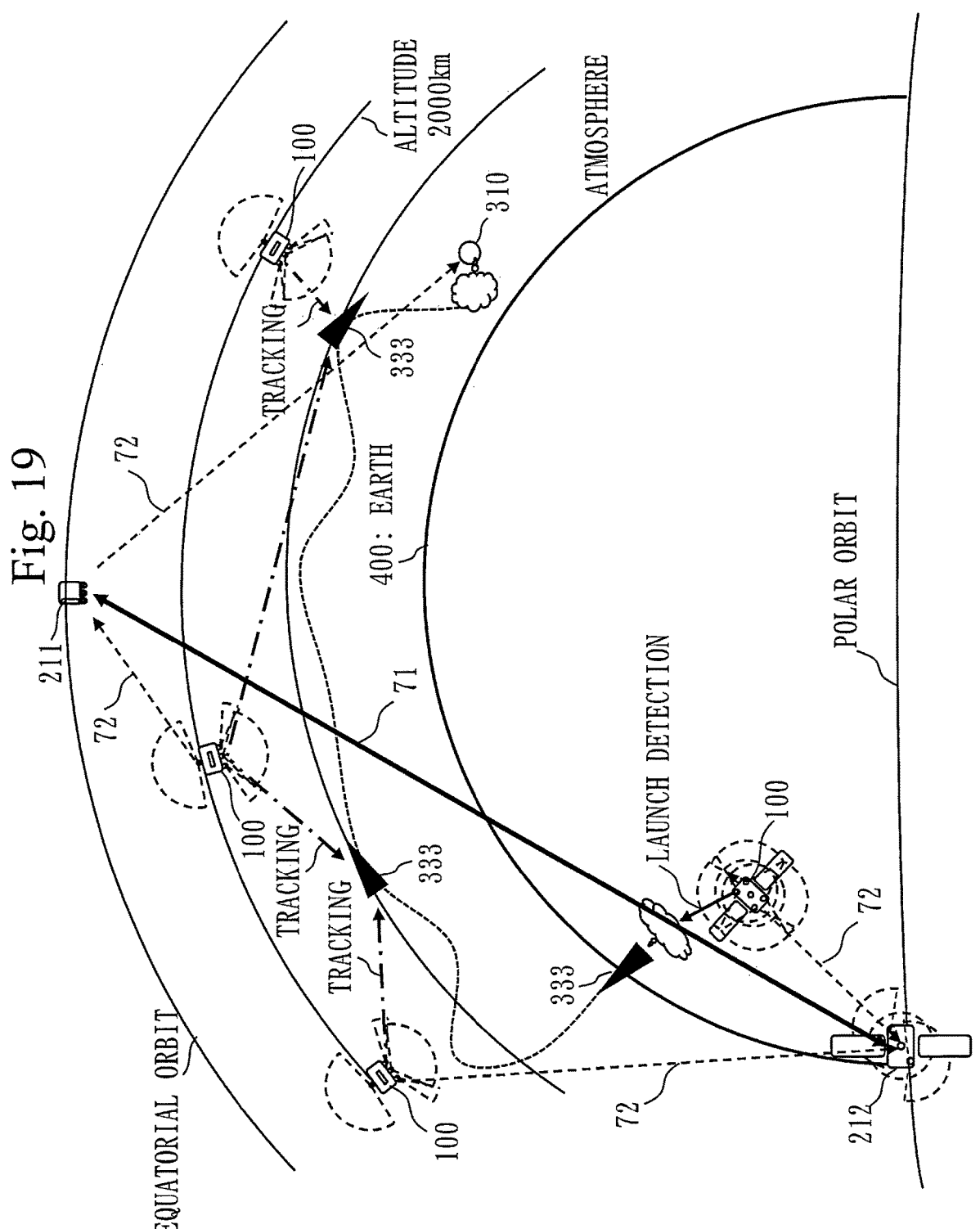
FIG. 19 is a diagram of Embodiment 2, and is a diagram illustrating a situation of radio communication 72.

FIG. 19 illustrates a situation of the radio communication 72. From the left side of the diagram, the radio communication 72 is performed between the data relay satellite 212 and one of the monitoring satellites 100, the radio communication 72 is performed between the data relay satellite 212 and another one of the monitoring satellites 100, the radio communication 72 is performed between the data relay satellite 211 and another one of the monitoring satellites 100, and the radio communication 72 is performed between the first data relay satellite 211 and the response device 310.

(3) The radio communication is performed between the data relay satellite 211 or 212 and the monitoring satellite 100, the optical communication is performed between the data relay satellite 211 or 212 and the response device 310 or 320, and monitoring information is transmitted between the response devices 310 or between the response devices 320 via a communication line 330. The communication line 330 will be described later in FIG. 20.

FIG. 20 illustrates transmission using the optical communication 71, the radio communication 72, and the communication line 330. From the left side of the diagram, the radio communication 72 is performed between the data relay satellite 212 and one of the monitoring satellites 100, the radio communication 72 is performed between the data relay satellite 212 and another one of the monitoring satellites 100, and the radio communication 72 is performed between the data relay satellite 211 and another one of the monitoring satellites 100. The first data relay satellite 211 performs the optical communication 71 with one of the response devices 320 and with the second data relay satellite 212. In FIG. 20, the response devices 320 are connected with one another through the communication line 330. Data can be exchanged between the response devices 320 through the communication line 330.

(4) The optical communication is performed between the data relay satellite 211 or 212 and the monitoring satellite 100, the optical communication is performed between the data relay satellite 211 or 212 and the response device 310 or 320, and monitoring information is transmitted between the response devices 310 or between the response devices 320 via the communication line 330.

<Change in Azimuth and Elevation>

Figure 21:
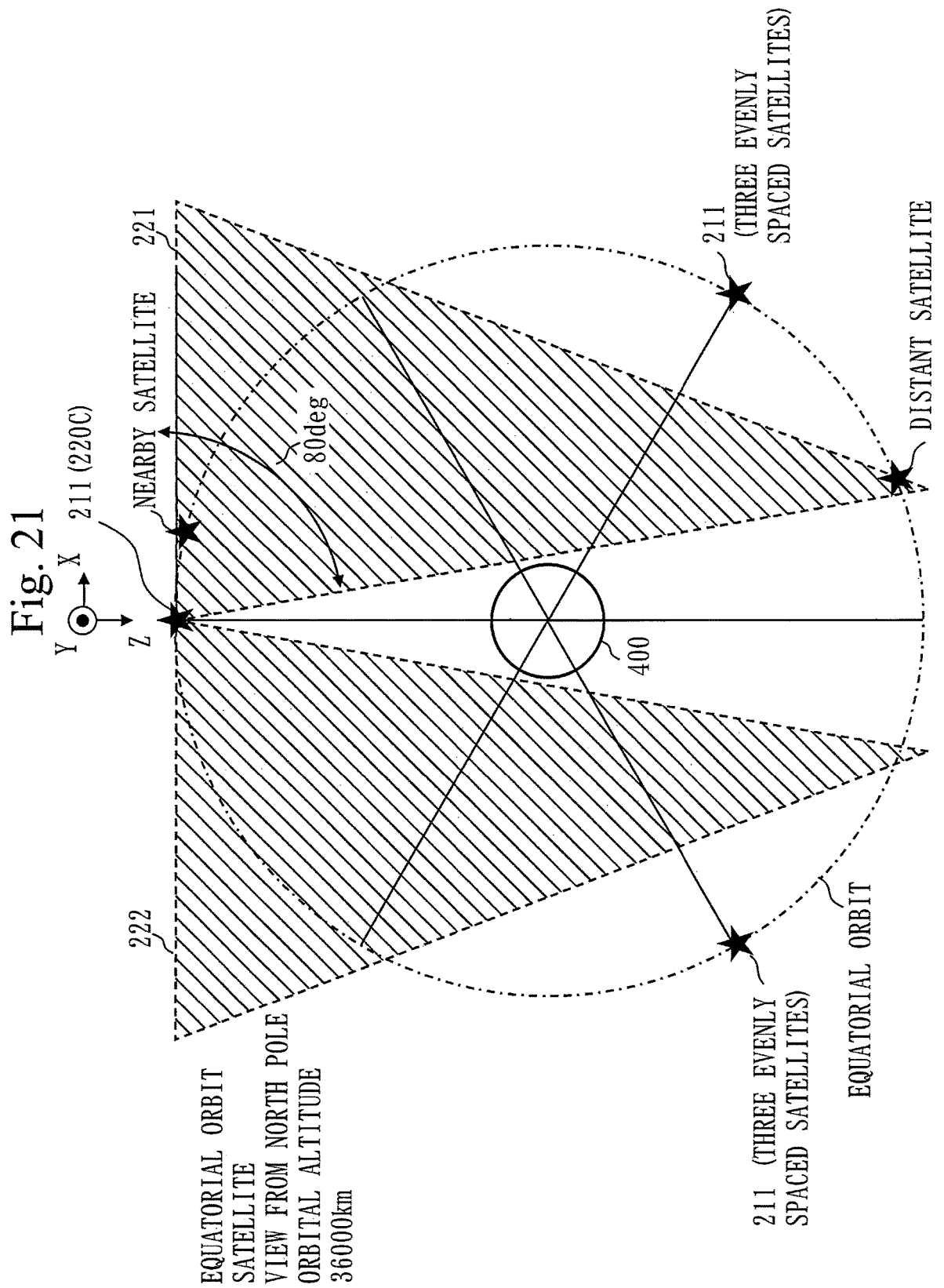
FIG. 21 is a diagram of Embodiment 2, and is a diagram illustrating change ranges in azimuth and elevation of a communication field of view of an optical communication device 220C included in a data relay satellite 211 or 212.

FIG. 21 illustrates change ranges in azimuth and elevation of a communication field of view of an optical communication device 220C included in the data relay satellite 211 or 212. At least one of the first data relay satellite 211 and the second data relay satellite 212 includes the optical communication device 220C. As illustrated in FIG. 21, when the direction of the +X axis in the positive direction in the right-handed orthogonal coordinates is defined as the satellite traveling direction +X of the data relay satellite and the direction of the +Z axis in the positive direction in the right-handed orthogonal coordinates is defined as the geocentric direction +Z of the data relay satellite, the optical communication device 220C can change the direction of the communication field of view 360 degrees in azimuth (XY plane) with respect to the direction of the +Z axis and 0 degrees to 80 degrees in elevation in the direction of the +Z axis with respect to the +X axis. FIG. 21 illustrates this change range 221. An area 222 of a triangular shape on the left is the change range 221 rotated around the +Z axis. That is, the area 222 indicates a change state in azimuth (XY plane) of the change range 221. As illustrated in FIG. 21, since changes can be made in azimuth and elevation, the data relay satellites 211 and 212 can perform optical communication with distant satellites via the Earth 400.

Figure 22:
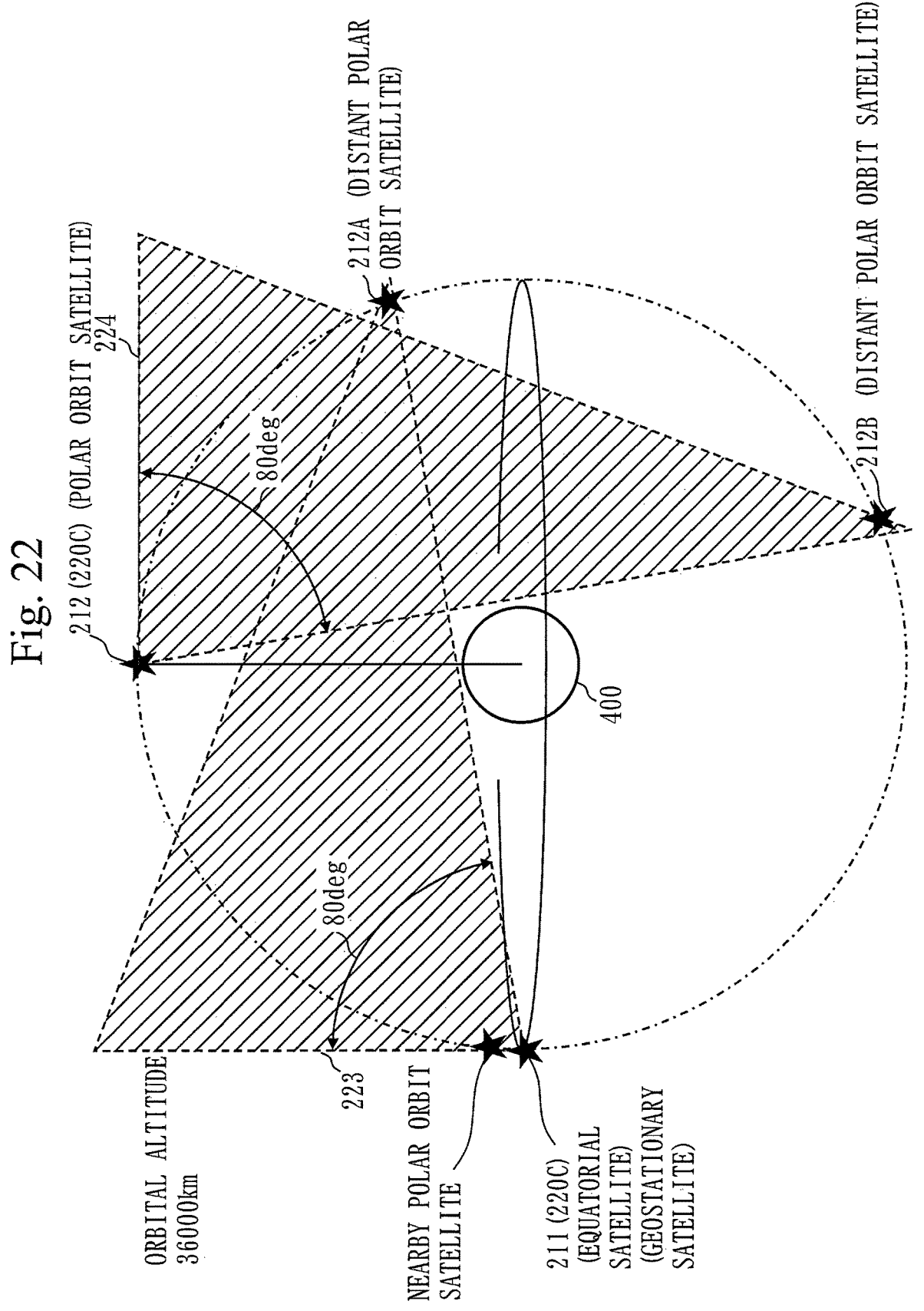
FIG. 22 is a diagram of Embodiment 2, and is a diagram illustrating an effect as a result of being able to change the communication field of view of the optical communication device 220C with respect to the first data relay satellite 211 and the second data relay satellite 212.

FIG. 22 illustrates an effect as a result of being able to change the communication field of view of the optical communication device 220C with respect to the data relay satellite 211 and the second data relay satellite 212. An area 223 indicates the area resulting from rotating the elevation change range illustrated in FIG. 21 in the azimuth direction. Changing the direction of the communication field of view allows the first data relay satellite 211 to perform optical communication with a second data relay satellite 212A at a great distance. Changing the direction of the communication field of view allows the second data relay satellite 212 to perform optical communication with a second data relay satellite 212B at a great distance.

Figure 23:
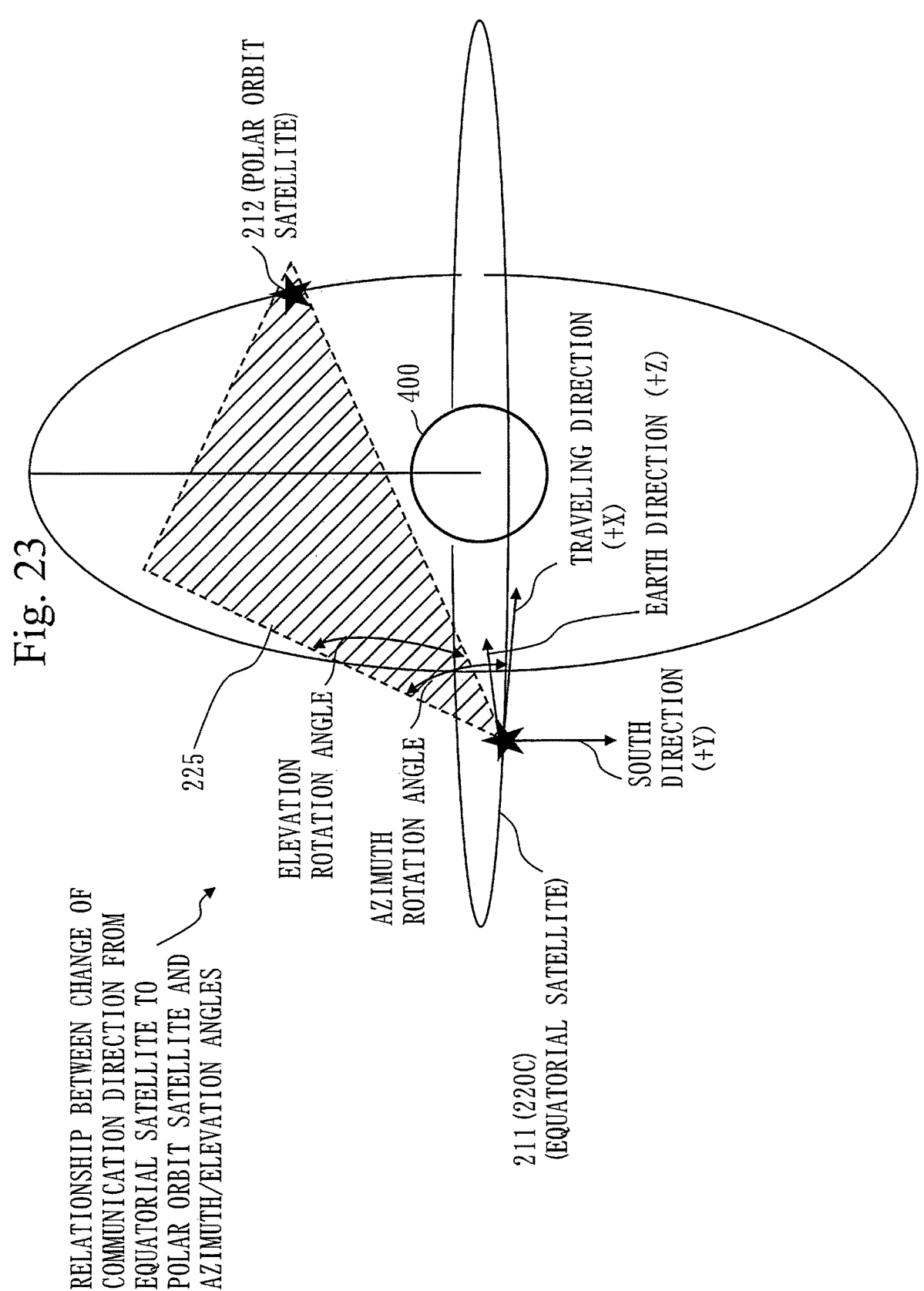
FIG. 23 is a diagram of Embodiment 2, and is a diagram illustrating a change of the communication field of view of the optical communication device 220C from the communication field of view for the first data relay satellite 211 to the communication field of view for the second data relay satellite 212.

FIG. 23 illustrates a change of the communication field of view of the optical communication device 220C from the communication field of view for the first data relay satellite 211 that is a satellite above the equator to the communication field of view for the second data relay satellite 212 that is a polar orbit satellite.

An area 225 indicating the communication field of view may be changed in elevation and then may be changed in the azimuth direction, that is, may be rotated around the +Z axis, which is the geocentric direction. FIG. 23 illustrates the effect of the communication field of view due to this change of the communication field of view.

Figure 24:
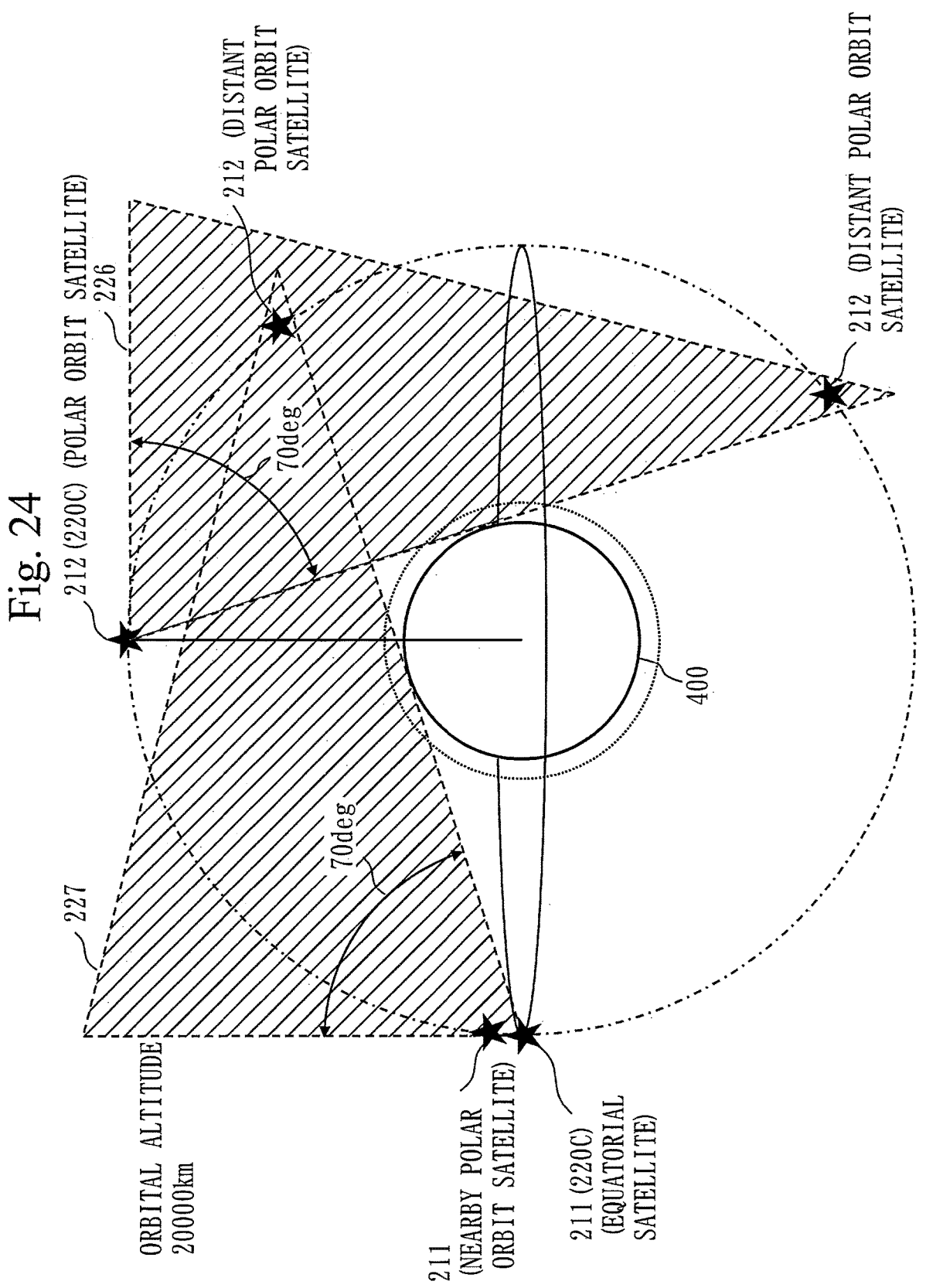
FIG. 24 is a diagram of Embodiment 2, and is a diagram illustrating that the direction of the communication field of view can be changed 360 degrees in azimuth and 0 degrees to 70 degrees in elevation.

FIG. 24 illustrates that, with respect to FIG. 22, the direction of the communication field of view can be changed 360 degrees in azimuth (XY plane) with respect to the direction of the +Z axis and 0 degrees to 70 degrees in elevation in the direction of the +Z axis with respect to the +X axis.

Figure 25:
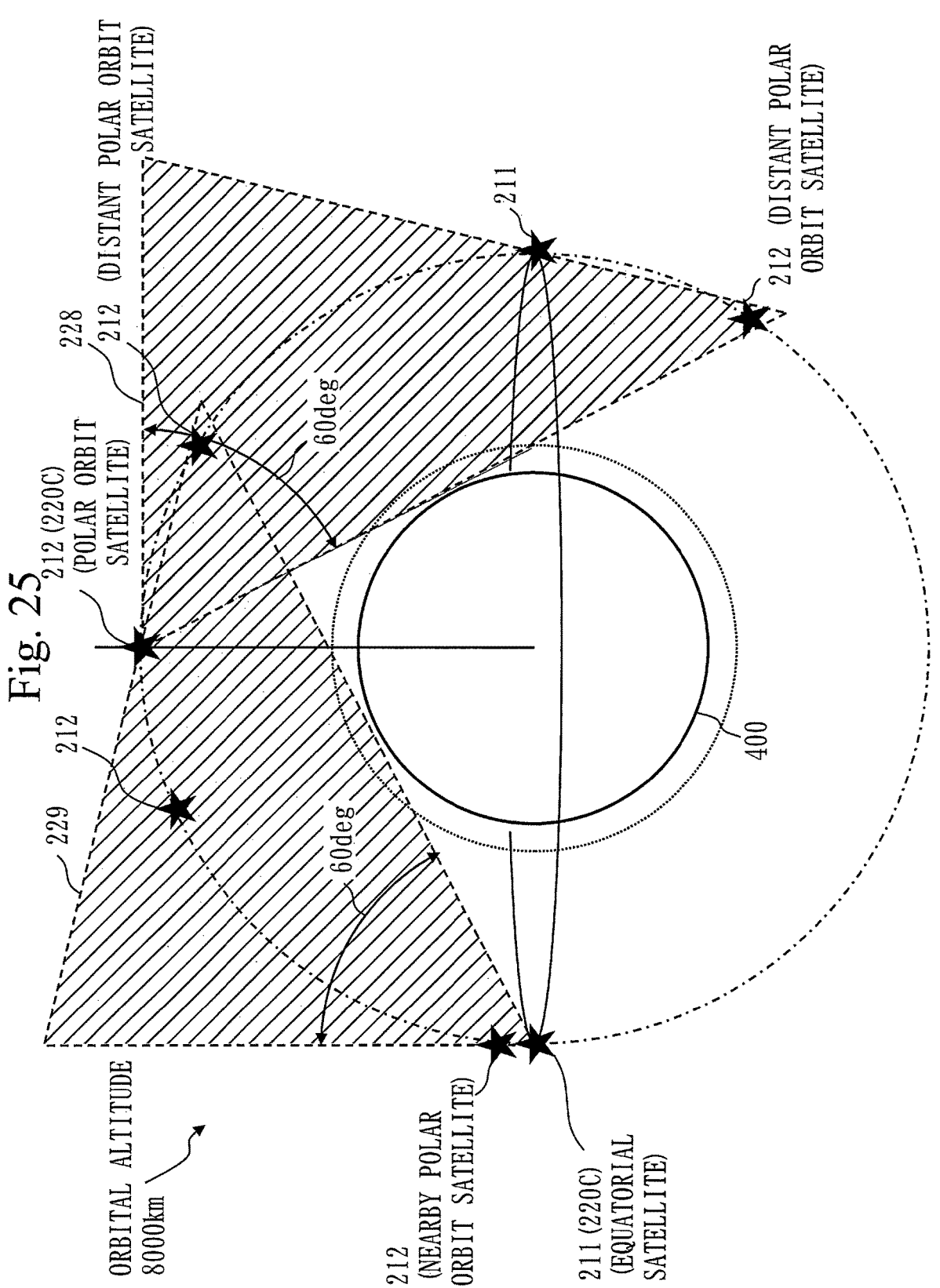
FIG. 25 is a diagram of Embodiment 2, and is a diagram illustrating that the direction of the communication field of view can be changed 360 degrees in azimuth and 0 degrees to 60 degrees in elevation.

FIG. 25 illustrates that, with respect to FIG. 22, the direction of the communication field of view can be changed 360 degrees in azimuth (XY plane) with respect to the direction of the +Z axis and 0 degrees to 60 degrees in elevation in the direction of the +Z axis with respect to the +X axis. FIGS. 24 and 25 are similar to FIG. 22, so that description will be omitted.

Figure 26:
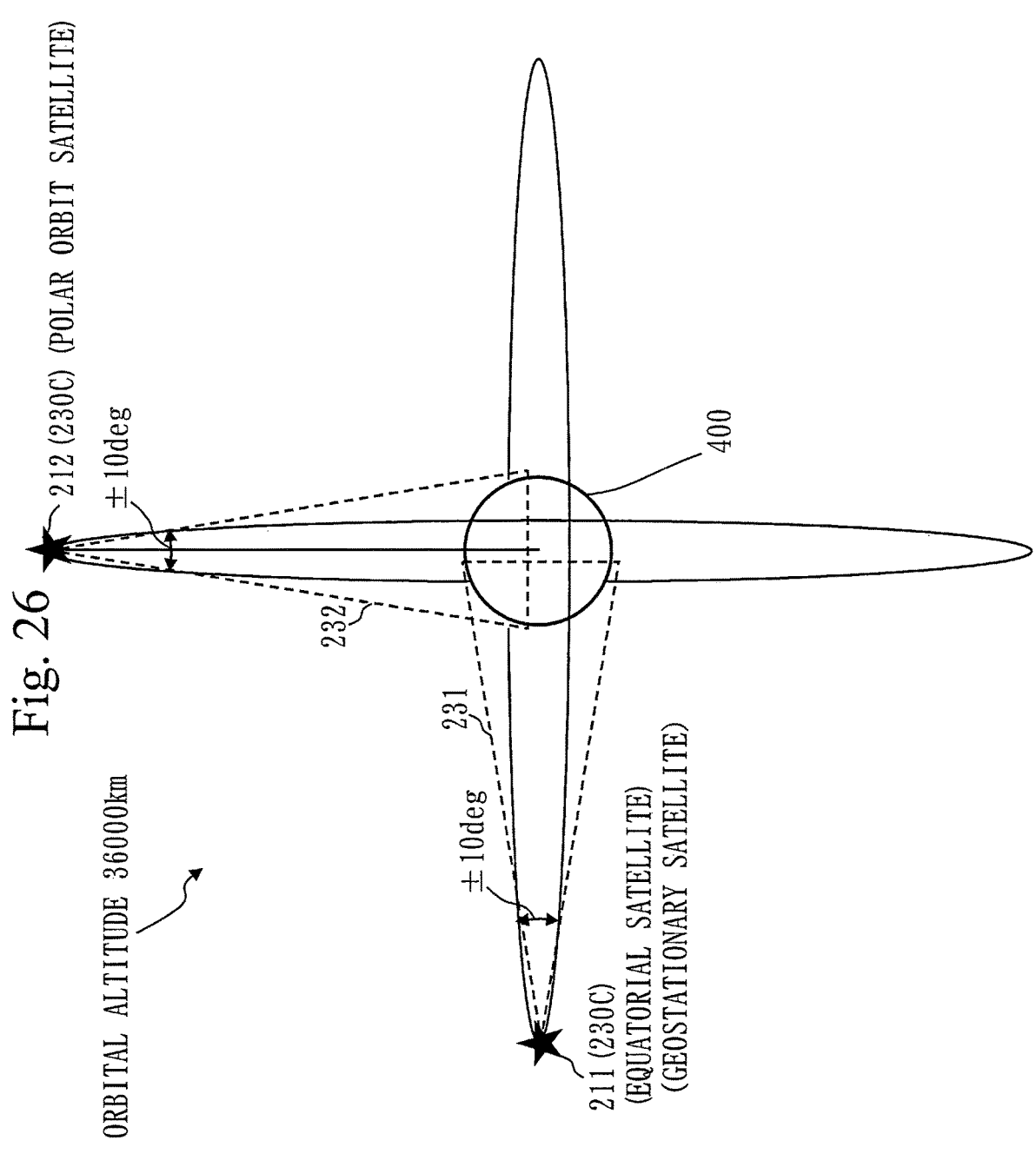
FIG. 26 is a diagram of Embodiment 2, and is a diagram relating to a communication device 230C included in the first data relay satellite 211 or the second data relay satellite 212.

FIG. 26 relates to a communication device 230C included in the first data relay satellite 211 or the second data relay satellite 212. At least one of the first data relay satellite 211 and the second data relay satellite 212 includes the communication device 230C.

When the direction of the +X axis in the positive direction in the right-handed orthogonal coordinates is defined as the satellite traveling direction +X of the data relay satellite, and the direction of the +Z axis in the positive direction in the right-handed orthogonal coordinates is defined as the geocentric direction +Z of the data relay satellite, the communication device 230C of FIG. 26 can change the direction of the field of view ±10 degrees around the +X axis with respect to the +Z axis and ±10 degrees around the +Y axis in the positive direction in the right-handed orthogonal coordinates with respect to the +Z axis. Using the communication device 230C, the flying object response system 700 communicates with the response device 310 that moves in airspace of the atmosphere, on ground, or at sea, or with the response device 320 fixed on the ground. As to ±10 degrees around the +X axis with respect to the +Z axis and ±10 degrees around the +Y axis with respect to the +Z axis, in the case of the first data relay satellite 211 of FIG. 26, ±10 degrees around the +X axis with respect to the +Z axis means that the communication field of view changes±10 degrees in the longitudinal direction of the Earth 400, and ±10 degrees around the +Y axis with respect to the +Z axis means that the communication field of view changes±10 degrees in the horizontal direction of the Earth 400. FIG. 26 illustrates communication fields of view 231 and 232 that change in the range of ±10 degrees.

Figure 27:
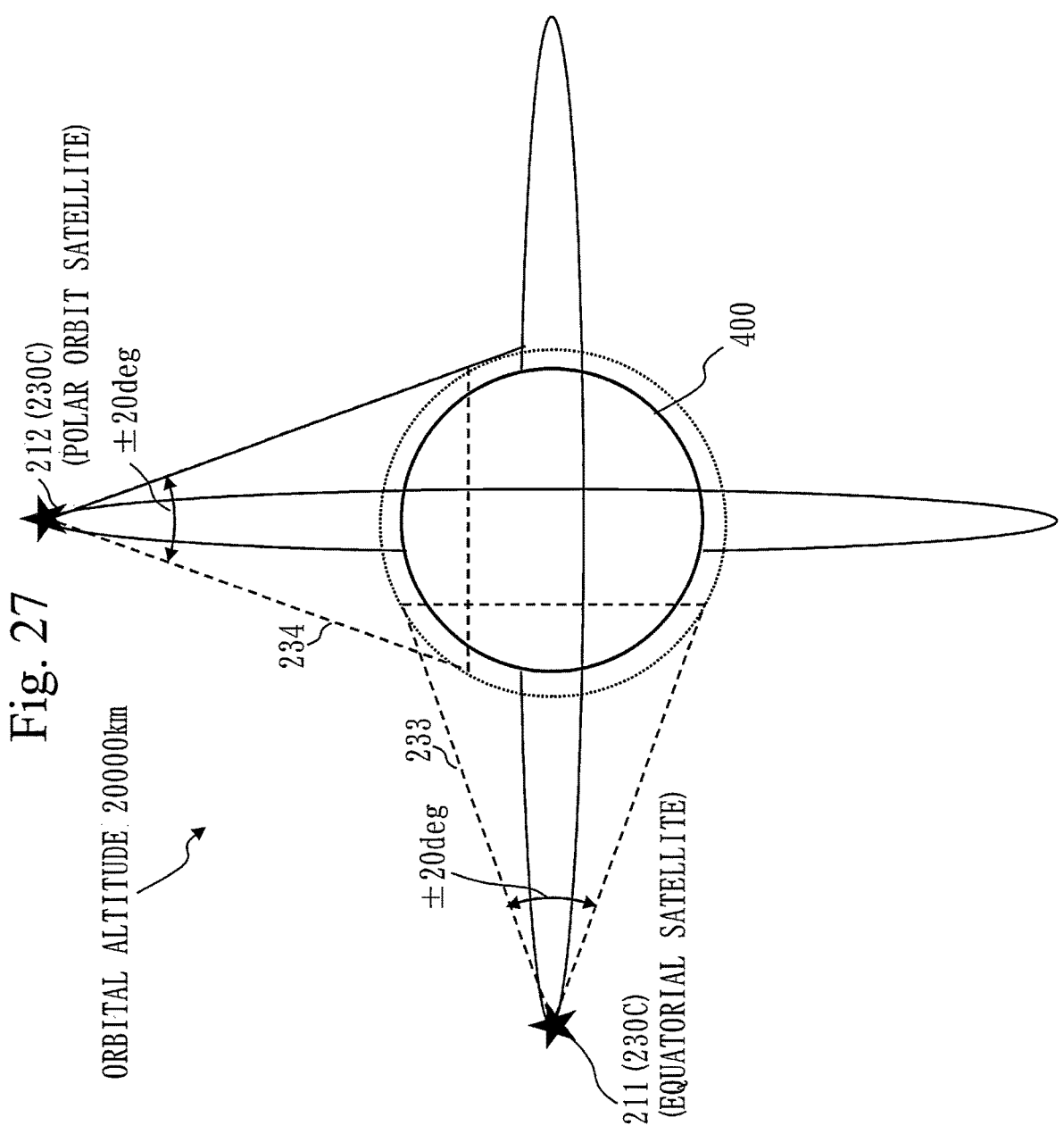
FIG. 27 is a diagram of Embodiment 2, and is a diagram illustrating that the communication field of view can be changed +20 degrees around a +X axis with respect to a +Z axis and +20 degrees around a +Y axis with respect to the +Z axis.

FIG. 27 indicates that, with respect to FIG. 26, the communication device 230C can change the communication field of view ±20 degrees around the +X axis with respect to the +Z axis and ±20 degrees around the +Y axis with respect to the +Z axis.

Figure 28:
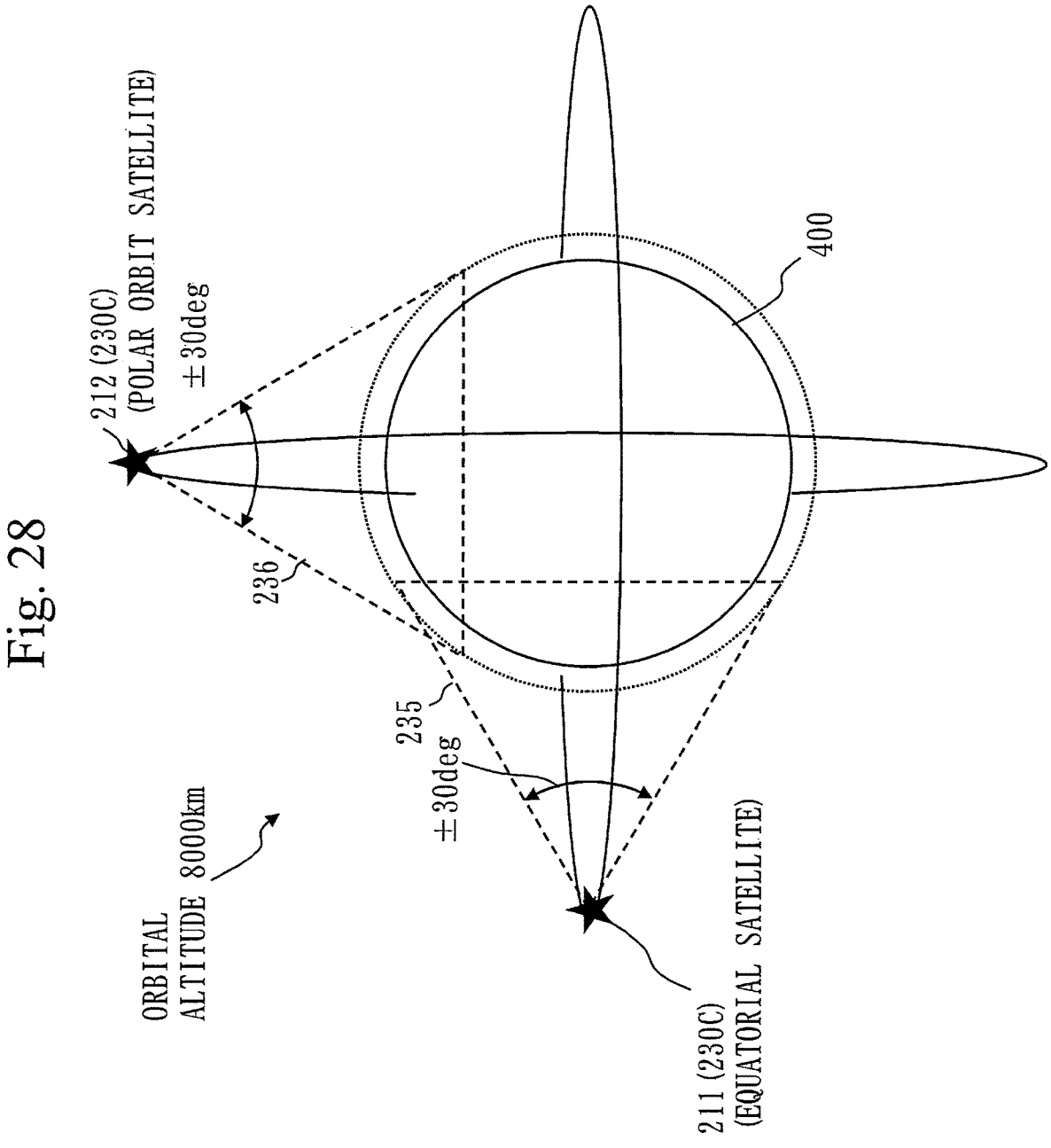
FIG. 28 is a diagram of Embodiment 2, and is a diagram illustrating that the communication field of view can be changed +30 degrees around the +X axis with respect to the +Z axis and +30 degrees around the +Y axis with respect to the +Z axis.

FIG. 28 indicates that, with respect to FIG. 26, the communication device 230C can change the communication field of view ±30 degrees around the +X axis with respect to the +Z axis and ±30 degrees around the +Y axis with respect to the +Z axis. FIGS. 27 and 28 are similar to FIG. 26, so that description will be omitted.

The flying object response system 700 described in FIG. 18 may be configured as described below. The flying object response system 700 includes a first data relay satellite 211 that flies above the equator at an orbital altitude of 2000 km or higher, a second data relay satellite 213 that is a sun-synchronous orbit satellite flying in a sun-synchronous orbit, a plurality of monitoring satellites 100 that fly at an orbital altitude of 2000 km or lower, a response device 310 that moves in airspace of the atmosphere, on ground, or at sea, and a response device 320 fixed on the ground. A monitoring satellite group, which is the plurality of monitoring satellites 100, acquires monitoring information of the flying object 333 that is launched from the ground to fly, and transmits the monitoring information to the response device 310 or 320 via the data relay satellite 211 or 213. The response device 310 or 320 performs a response action for the flying object 333, using the transmitted monitoring information.

The flying object response system 700 described in FIG. 18 may be configured as described below. In the flying object response system 700, the monitoring satellite 100 includes the first monitoring device 110 directed to the surface of the Earth and the second monitoring device 120 directed to the periphery of the Earth. Six or more of the monitoring satellites 100 form a polar orbit satellite group flying at an orbital inclination of 80 degrees or more. Twelve or more of the monitoring satellites 100 form an inclined orbit satellite group flying in an inclined orbit with an orbital inclination of 10 degrees to 80 degrees. Six or more of the monitoring satellites 100 form an equatorial orbit satellite group flying above the equator with an orbital inclination of less than 10 degrees.

The flying object response system 700 described in FIG. 18 may include a data relay satellite as described below. The flying object response system 700 may include a data relay satellite including, on the side facing the Earth, two optical communication devices whose pointing direction can be changed 60 degrees or more in an elevation rotation angle and 180 degrees or more in an azimuth rotation angle.

This data relay satellite may further include, when the direction of the +X axis in the positive direction in the right-handed orthogonal coordinates is defined as the satellite traveling direction +X of the data relay satellite, and the direction of the +Z axis in the positive direction in the right-handed orthogonal coordinates is defined as the geocentric direction +Z of the data relay satellite, an optical communication device whose pointing direction changes±40 degrees around the +X axis with respect to the +Z axis and ±40 degrees around the +Y axis, which is directed in the positive direction in the right-handed orthogonal coordinates, with respect to the +Z axis.

Effects of Embodiment 2

According to Embodiment 2, the first data relay satellites 211 and the second data relay satellites 212 are coordinated to transmit monitoring information to the response device 310 or 320, so that information can be transmitted without communication disruption with a small number of communication satellites. The communication satellites of the flying object response system 700 can change the respective communication fields of view, so that information can be transmitted without communication disruption with a small number of communication satellites. In the flying object response system 700, monitoring information is transmitted by a combination of the optical communication 71 and the radio communication 72, so that large volumes of data can be transmitted smoothly.

The effects of Embodiment 2 include the following. A response action can be performed for a flying object that changes its flight direction by intermittent boost after launch. Since data can be transmitted from a monitoring satellite to a response device by only data transmission in outer space without going through the ground facility, a real-time response action can be performed. If the landing point is far away from the launch point as a result of moving over a long distance, since data is transmitted by long-distance large-volume optical communication, a response action can be performed at the distant point. Furthermore, optical communication is used only between the data relay satellites, so that there is no risk of communication disruption.

Supplement to Embodiment 2

As mentioned in the Background Art, there is a need for an HGV response system. After launch, an HGV flies in the vicinity of the boundary between the atmosphere and space with intermittent boost, making it difficult to estimate a flight path and a landing point, so that it is necessary to monitor the flight path up to immediately before landing and transmit it to a response device almost in real time. In a conventional flying object, a high-temperature gas called a plume diffuses during boost, so that the temperature of the flying object can be detected by infrared rays even from a geostationary orbit at a long distance.

However, in the case of the HGV, the flight path after completion of boost needs to be tracked. In this tracking, the HGV whose temperature has risen is detected by infrared rays. A problem is that the temperature of the HGV whose temperature has risen is not as high as that of a plume and the area where the temperature has risen is small, so that it is difficult to detect the HGV from a long distance such as from a geostationary orbit.

As means for tracking the flight of the HGV, means of monitoring the HGV from a short distance by a low-Earth-orbit (LEO) satellite constellation is effective. By monitoring the flying object against the background of space by monitoring the periphery of the Earth, the flying object can be tracked without being obscured by background signals. In a flying object monitoring system using satellites deployed in a high orbit such as a geostationary orbit or a Molniya orbit to perform observation, monitoring, or the like over a wide range of the ground, in the case of geostationary satellites, for example, the characteristic that the geostationary satellites orbit in synchronization with the Earth is used to constantly monitor a specific area on the ground. However, in order to perform constant monitoring by the low-Earth-orbit satellite constellation, a large number of satellites need to be coordinated to realize the constant monitoring because the ranges of monitoring fields of view of the individual satellites are limited and each satellite passes above the specific area in a short time. In the low-Earth-orbit satellite constellation, the entire Earth (hereinafter referred to as the entire globe) can be constantly monitored if the number of satellites is sufficiently large, and by equipping the satellites with infrared monitoring devices that detect launches by looking directly below and infrared monitoring devices directed to the periphery of the Earth to monitor flying objects after boost against the background of space, the launch of an HGV can be detected and a flight route after boost can be tracked.

However, a problem is that monitoring the entire globe constantly by the low-Earth-orbit satellite group of a huge number of satellites will raise the total cost such as costs of preparing satellites and launching the satellites, and the amount of satellite operation and data processing will be enormous.

As means for realizing constant monitoring of the entire globe with as few satellites as possible, it is effective to coordinate an equatorial orbit satellite group, a polar orbit satellite group, and an inclined orbit satellite group. In the equatorial orbit satellite group that flies above the equator, although it depends on the orbital altitude, by placing at least six satellites approximately evenly, the vicinity of the equator can be comprehensively monitored by directly-below monitoring devices and the mid-latitude zone can be comprehensively monitored by monitoring devices that monitor the periphery of the Earth. Polar orbit satellites pass the polar regions during every orbit. Thus, in the polar orbit satellite group, by placing at least six satellites approximately evenly in one orbital plane, the vicinity of the polar regions can be comprehensively monitored by directly-below monitoring devices and the mid-latitude to high-latitude zones can be comprehensively monitored by monitoring devices that monitor the periphery of the Earth. In the inclined orbit satellite group, by optimizing the orbital altitude, the orbital inclination, and the placement of satellites, with 12 or more satellites the mid-latitude zone can be comprehensively monitored by directly-below monitoring devices and airspace above the equator, the polar regions, and the high-latitude zone can be comprehensively monitored by monitoring devices that monitor the periphery of the Earth.

After acquiring constant monitoring information of the entire globe by the monitoring satellite group of 24 or more satellites, means for transmitting data to the response device in real time is required. Therefore, in the present application, data is transmitted to the response device via data relay satellites that fly in an equatorial orbit and a polar orbit at orbital altitudes of 2000 km or higher. Satellites that fly at orbital altitudes of 2000 km to 36000 km are generally called medium-Earth-orbit (MEO) satellites, and satellites that fly at an orbital altitude of 36000 km above the equator are geostationary (GEO) satellites. Three or more geostationary satellites that are evenly placed in the longitude direction can cover the communication range from the equator to the mid-latitude zone. However, securing the communication field of view covering the polar regions is a problem. Therefore, by coordinating with polar orbit satellites, communication lines can be constantly secured over the entire globe.

For mid-latitude satellites, it is necessary to select an orbit that is not adversely affected by the Van Allen radiation belt. At least, a GPS satellite group, for example, has been operated at an orbital altitude of about 20000 km, and an equatorial communication satellite group has been operated at an orbital altitude of about 8000 km.

A higher orbital altitude has a wider communication field of view in the atmosphere, so that an advantage is that the entire globe can be covered with a small number of satellites. However, a problem is that latency, which corresponds to the wait time required for communication, is large because of a long distance. Another problem is that the amount of propellant required to reach a predetermined altitude after launch increases, so that the weight of a satellite increases and the size of the satellite equipped with a propellant tank increases, and as a result, the number of satellites that can be launched simultaneously is small.

A low orbital altitude has small latency, so that an advantage is a short time period from detecting the launch of a flying object to transmitting data to the response device.

Due to this advantage, the amount of propellant required to reach a predetermined altitude after launch is small, which facilitates reduction in the size of a satellite and increases the number of satellites that can be simultaneously launched, so that there is an effect that the total cost can be reduced even if the number of satellites is large. However, a problem is that the number of satellites for covering the entire globe increases.

In the case of data relay satellites at an orbital altitude of 8000 km, in order to constantly secure the communication field of view with low-Earth-orbit satellites at an orbital altitude of 2000 km or lower and response devices in airspace of the atmosphere, on ground, or at sea, four or more satellites each with a communication field of view of ±30 degrees on orthogonal two axes with respect to the geocentric direction may cooperate on the same orbital plane, as illustrated in FIG. 28. At an orbital altitude of 36000 km, three or more satellites each with a communication field of view of ±10 degrees around two orthogonal axes (+X axis, +Y axis) with respect to the geocentric direction (+Z axis direction) may cooperate on the same orbital plane, as illustrated in FIG. 26. In order to measure the position of a flying object by a plurality of monitoring satellites using the principle of spatial triangulation, the number of satellites to which a data relay satellite needs to transmit data simultaneously in real time is two or more. Furthermore, assuming that a plurality of flying objects may be launched almost simultaneously, it is rational that about six mid-latitude data relay satellites are deployed on the same orbital plane and the respective communication fields of view with respect to the monitoring satellite group and response devices are overlapping.

Figure 29:
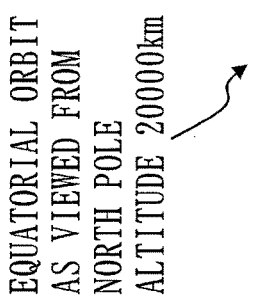
FIG. 29 is a diagram of Embodiment 2, and is a diagram illustrating that when six data relay satellites are deployed, the polar region becomes a communication-disabled area indicated by a hexagon.

FIG. 29 illustrates that when six data relay satellites are deployed above the equator at an orbital altitude of 20000 km, the polar region becomes a communication-disabled area indicated by a hexagon. Therefore, as illustrated in FIG. 27, if six data relay satellites are similarly deployed on one orbital plane of a polar orbit, communication lines can be constantly secured over the entire globe.

If a flying object flies over a long distance, a case may occur where it is rational to use a plurality of data relay satellites to transmit data from the location where a monitoring satellite has detected the launch to a response device near the area where the flying object is expected to land. In long-distance communication between data relay satellites, it is rational to perform large-volume communication by optical communication. In optical communication between two first data relay satellites or two second data relay satellites, since the two satellites fly synchronously at the same altitude in the same orbital plane, the relative positional relationship between the satellites does not change over time. Therefore, if optical communication is established by changing the pointing direction in the same orbital plane, then stabilizing the pointing direction enables large-volume communication without communication disruption.

In contrast to this, in optical communication between the first data relay satellite and the second data relay satellite, since equatorial satellites orbit in the longitude direction and polar satellites orbit in the latitude direction, there are various variations of the relative positions of two satellites.

Therefore, in the present application, as illustrated in FIGS. 21 to 25, the line-of-sight direction can be changed in various ways by setting, within the same orbital plane, the range in which the field of view can be changed in elevation to allow optical communication between satellites in the same orbital plane and by rotating the line of sight in azimuth around the geocentric axis. As for the elevation angle, in the case of geostationary satellites, the maximum range is that the direction of the field of view can be changed about 80 degrees from the satellite traveling direction toward the Earth, except for the range in the shadow of the Earth in the same orbital plane. Communication can be performed with a nearby satellite in the geostationary orbit at an elevation angle of about 0 degrees, and communication can be performed with a distant satellite in the shadow of the Earth at about 80 degrees. If the first data relay satellite and the second data relay satellite each having this field-of-view change range happen to line up in the same orbital plane, communication between two satellites can be performed in substantially the same positional relationship.

As to the elevation angle, the maximum range is that the direction of the field of view can be changed about 72 degrees from the satellite traveling direction toward the Earth at an orbital altitude of 20000 km, and that the direction of the field of view can be changed about 63 degrees from the satellite traveling direction toward the Earth at an orbital altitude of 8000 km.

For communication between two satellites that are not in the same orbital plane, optical communication can be performed in various relative positional relationships by rotating the line of sight in azimuth around the Earth direction (+Z axis) and setting an appropriate elevation angle. Even while the relative satellites are moving, optical communication can be continued without communication disruption by appropriately controlling the two-axis pointing direction. In inter-satellite optical communication, the optical axes of satellites on both sides need to be aligned precisely, so that high pointing accuracy and stability are required. With existing technology, although one-to-one optical communication has been realized, there is no example where one satellite continues optical communication simultaneously with many satellites, so that in a flying object response system that assumes simultaneous optical communication with a plurality of satellites, there remains a risk of communication disruption. In a flying object response system for the purpose of security, the impact of communication disruption will be enormous. Thus, in order to form a reliable system, it is safe to basically limit the number of cross-links that carry out optical communication simultaneously to one.

Communication between data relay satellites is long-distance large-volume communication, so that it is rational to adopt optical communication. However, in order for one delay relay satellite to simultaneously communicate from many monitoring devices, it is rational to adopt radio communication. In radio communication, by setting a wide beam divergence angle, it is possible to improve the resistance to communication disruption due to movement of satellites, and it is also possible for the data relay satellite to simultaneously operate a plurality of radio-wave communication devices. It is also possible to identify and use signals from a plurality of monitoring satellites transmitted or received through the same antenna, as has been done in positioning satellites of the GPS or the like. The same also applies to a case where data is transmitted from one data relay satellite to many response devices. Even if one satellite simultaneously communicates with many monitoring satellites and many response devices, radio communication enables real-time communication without communication disruption. This is as illustrated in FIG. 19.

As for response devices, it may be rational to arrange that a group of response devices are connected through a dedicated communication link and are under the command and control of a response device that serves as a control device. For example, in a case in the United States, a communication line called Link 16 has been formed and there is, for example, an idea to collectively transmit data of monitoring satellites to an Aegis ship and command and control response actions of a plurality of assets via Link 16. In this case, it is rational to adopt optical communication for communication from the data relay satellites to the response devices. If monitoring information is passed to a response device after it has been received from another data relay satellite, a response action can be performed even if the optical cross-link between the data relay satellites is disrupted. This is as illustrated in FIG. 20.

If satellite attitude control technology with pointing accuracy and stability that maintain a cross-link of optical communication simultaneously with a plurality of targets is established, a plurality of optical communication devices can be used to communicate with a monitoring satellite or communicate with a response device. In an equatorial satellite, the sun incidence direction rotates once around the north-south axis during one orbit around the Earth in the longitude direction, so that it is rational to be equipped with solar array wings with a rotation function around the north-south axis (Y axis). In contrast to this, in a polar orbit satellite, the sun incidence direction rotates once around the elevation direction and the normal vector of the orbital plane also rotates in the azimuth direction during one orbit around the Earth in the longitude direction, so that a problem is solar cell operation efficiency is lower than that of the equatorial satellite. In the case of fixed or one-axis rotating solar array wings, the size of the solar array wings is large, and in order to improve the solar cell operation efficiency, it is necessary to have a two-axis rotation function. As means for solving this problem, a sun-synchronous orbit can be adopted and an orbit called a dawn-dusk orbit, in which the normal vector of the orbital plane is always directed toward the Earth, can be adopted so as to always direct the fixed solar array wings toward the sun. Sun-synchronous conditions include a correlation between orbital altitudes and orbital inclinations, and the lower the orbit, the closer the orbital inclination is to 90 degrees, so that this results in a polar orbit for a low-Earth-orbit (LEO) satellite. Sun-synchronous orbits can be set up only by the law of nature at orbital altitudes of up to about 5000 km, but the further the orbital inclination is from 90 degrees, the greater the restrictions on constant monitoring of the polar regions. Although the variety of orbital altitudes and orbital inclinations that maintain sun-synchronous conditions can be increased by artificially operating propulsion devices, this requires propellant and thus the optimal conditions need to be determined depending on the system design policy.

Figure 30:
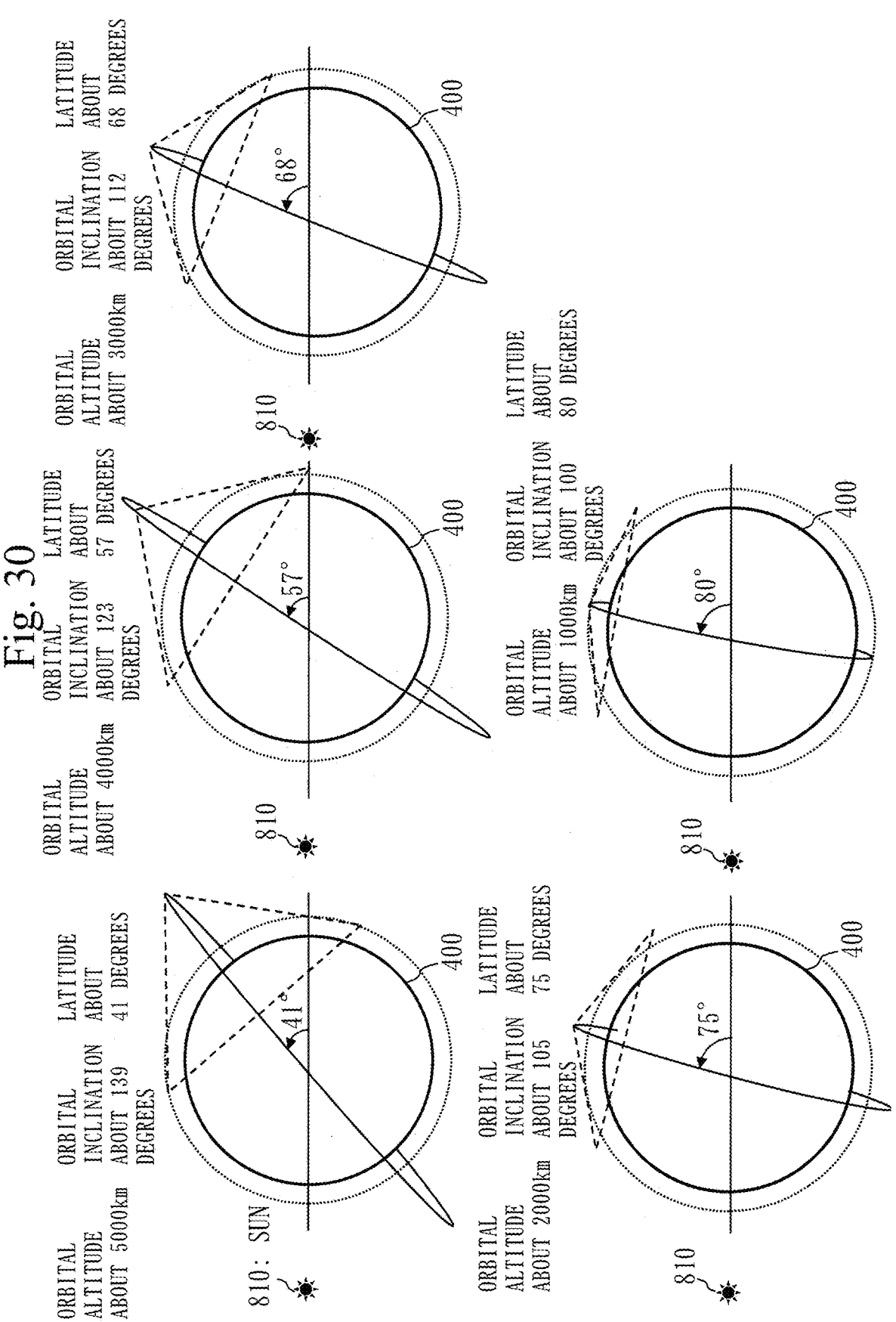
FIG. 30 is a diagram of Embodiment 2, and is a diagram illustrating orbital altitudes and orbital inclinations that maintain sun-synchronous conditions.

FIG. 30 indicates orbital altitudes and orbital inclinations that maintain the sun-synchronous conditions. In FIG. 30, sun 810 is indicated. In FIG. 30, the following five combinations (1) and (5) are indicated.

(1) orbital altitude about 5000 km, orbital inclination about 139 degrees, latitude about 41 degrees, (2) orbital altitude about 4000 km, orbital inclination about 123 degrees, latitude about 57 degrees, (3) orbital altitude about 3000 km, orbital inclination about 112 degrees, latitude about 68 degrees, (4) orbital altitude about 2000 km, orbital inclination about 105 degrees, latitude about 75 degrees, and (5) orbital altitude about 1000 km, orbital inclination about 100 degrees, latitude about 80 degrees.

Embodiment 3

Embodiment 3 relates to a system of a total of 24 or more satellites including six or more polar orbit satellites, six or more equatorial orbit satellites, and 12 or more inclined orbit satellites.

Embodiment 3 relates to a monitoring system 3000 composed of a plurality of monitoring satellites, each including a first monitoring device directed to the surface of the Earth and a second monitoring device directed to the periphery of the Earth, and a ground facility. The monitoring system 3000 forms a satellite constellation with a polar orbit satellite group of six or more of the monitoring satellites flying at an orbital inclination of 80 degrees or more, an inclined orbit satellite group of 12 or more of the monitoring satellites flying in an inclined orbit with an orbital inclination of 10 degrees to 80 degrees, and an equatorial orbit satellite group of six or more of the monitoring satellites flying above the equator at an orbital inclination of less than 10 degrees.

The monitoring system 3000 will be described. Coverage of the entire globe by the first monitoring devices directed in the geocentric direction will be described. Since the polar orbit satellite group passes the polar regions during every orbit, the polar regions can be constantly monitored by the first monitoring devices by arranging that six or more satellites fly over the polar regions in turn in one orbital plane. However, coverage of middle to low latitudes cannot be secured. In the equatorial orbit satellite group, the vicinity of the equator can be constantly monitored by the first monitoring devices by arranging that six or more satellites fly above the vicinity of the equator in turn in one orbital plane. However, middle to high latitudes cannot be monitored. In the inclined orbit satellite group, although there is a huge variety depending on the combination of an orbital altitude, an orbital inclination, setting of the field of view of the first monitoring device, and the number of satellites, it is known that observation coverage of middle latitudes can be secured by the first monitoring devices using a satellite group of two or more satellites. However, the polar regions cannot be monitored, and airspace above the equator cannot be constantly monitored and coverage may not be complete. With the monitoring system 3000, there is an effect that coverage of the entire globe can be secured with a small number of satellites by arranging that the polar orbit satellite group, the equatorial orbit satellite group, and the inclined orbit satellite group complement one another.

Coverage of airspace over the entire globe by the second monitoring devices directed to the periphery of the Earth will be now described. The HGV is known to fly at a low altitude of about 100 km or lower from ground after being launched, so that the altitude range over the entire globe may be limited to the maximum altitude after launch until the altitude is lowered. The field-of-view range of the second monitoring devices of the polar orbit satellite group can cover the high-latitude zones at 60 degrees north latitude and higher and 60 degrees south latitude and higher when passing the vicinity of the polar regions. The field-of-view range of the second monitoring devices of the equatorial orbit satellite group spans the mid-latitude zones in the Northern Hemisphere and the Southern Hemisphere, and the latitude range to be monitored can be set by selecting an orbital altitude and an orbital inclination. The inclined orbit satellite group can secure a wide monitoring area including airspace above the polar regions and airspace above the equator. The effects of the monitoring system 3000 include the following. By arranging that the polar orbit satellite group, the equatorial orbit satellite group, and the inclined orbit satellite group complement one another, coverage of the entire globe can be secured by the second monitoring devices with a small number of satellites. The launch of a flying object can be detected and the flying object during flight can be tracked with a minimum of 24 satellites. By monitoring simultaneously with a plurality of satellites so as to perform spatial triangulation measurement, the location coordinates of the flying object can be calculated.

Figure 31:
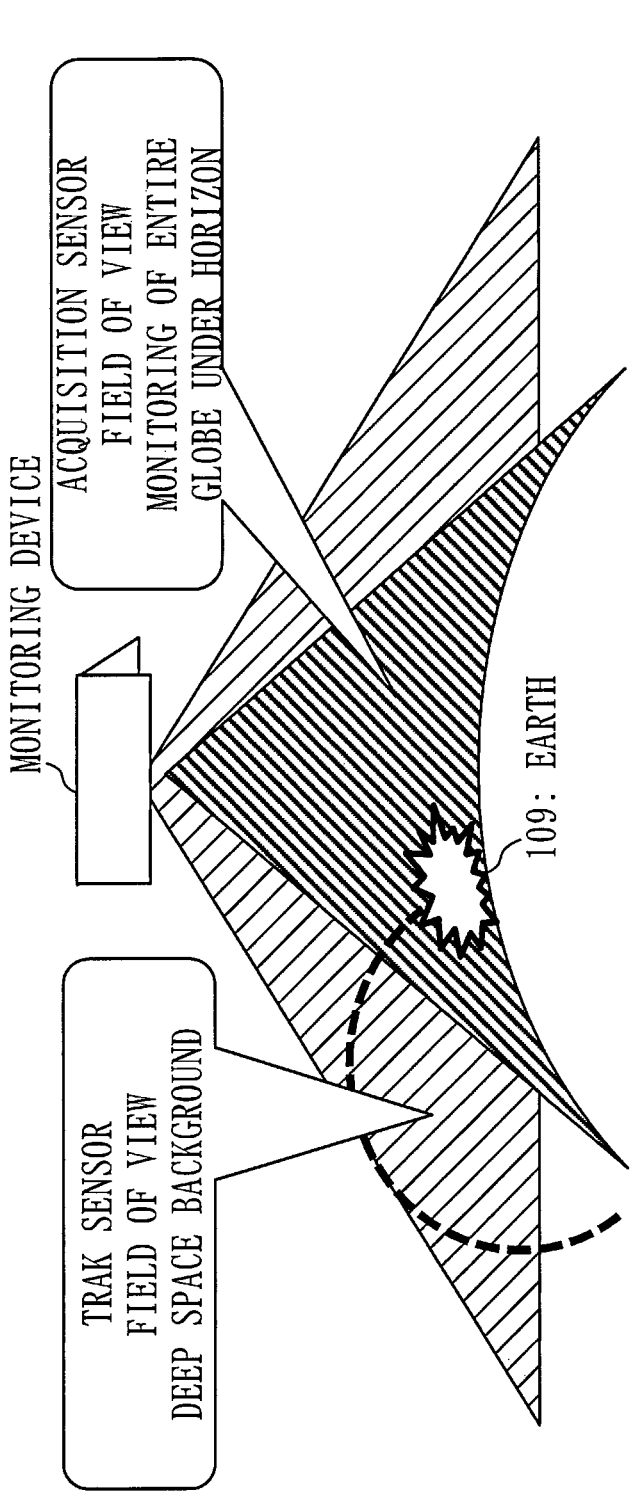
FIG. 31 is a diagram of Embodiment 3, and is a diagram conceptually illustrating monitoring by a second monitoring device.

When infrared sensors are adopted as the first monitoring device and the second monitoring device, the first monitoring device can detect a high-temperature plume ejected from a flying object at launch by being directed in the geocentric direction to secure the field-of-view range up to the tangent line to the Earth. If the second monitoring device is directed to the periphery of the Earth and has a field-of-view range of 360 degrees around the azimuth axis with respect to the geocentric direction, like a fisheye camera, the instant field-of-view range is circular and a wide area can be covered as the satellite moves. By monitoring the periphery of the Earth, a flying object flying over the Earth can be monitored against the background of space, so that the temperature of the flying object after completion of jetting, which is not as high as a high-temperature plume, can be detected. Therefore, the flight path after completion of jetting can be tracked. The HGV is known to change the flight direction by re-activating the propulsion device during flight, and the second monitoring device can detect jetting during flight and track the changed flight direction. FIG. 31 conceptually illustrates monitoring by the second monitoring device.

<Description of Coverage by First Monitoring Devices>

Figure 32:
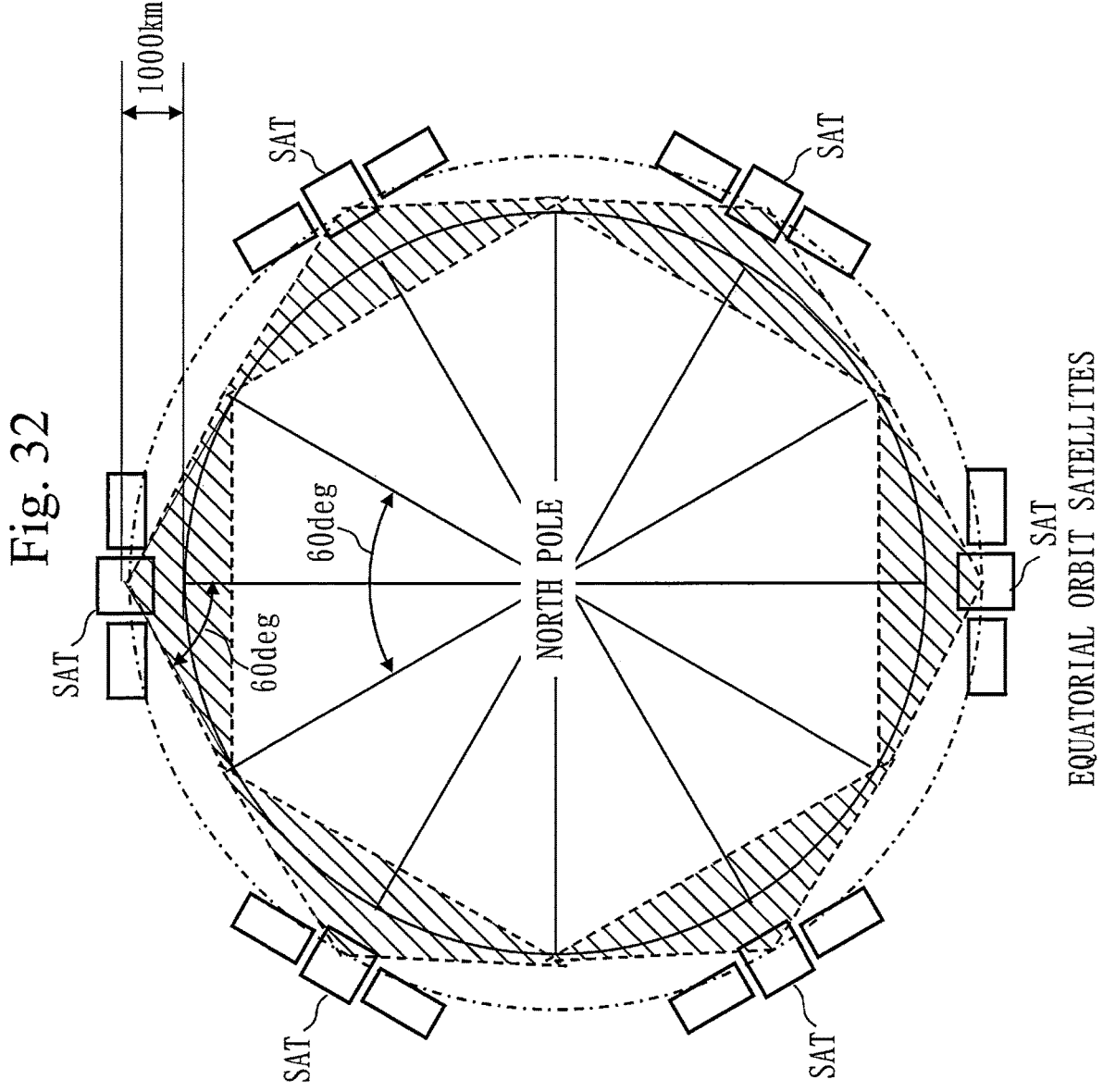
FIG. 32 is a diagram of Embodiment 3, and is a diagram illustrating coverage by first monitoring devices.
Figure 33:
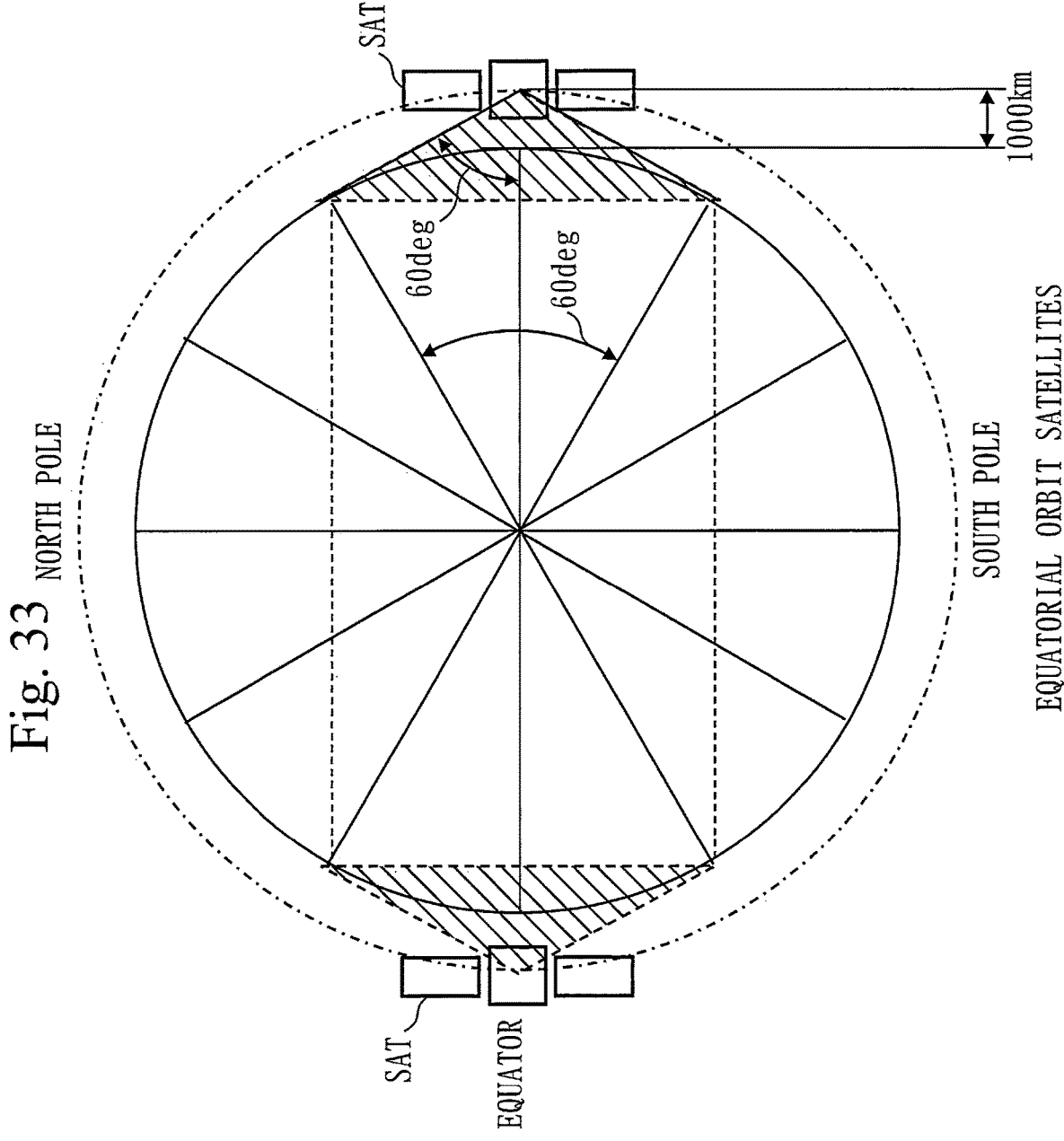
FIG. 33 is a diagram of Embodiment 3, and is another diagram illustrating coverage by the first monitoring devices.

FIGS. 32 and 33 illustrate coverage by the first monitoring devices. When six satellites are deployed evenly in an equatorial orbit for the purpose of comprehensively monitoring the ground in the vicinity of the equator, if the first monitoring device of each of the satellites covers a monitoring range of 60 degrees of longitude, the ground in the vicinity of the equator can be constantly monitored. When the orbital altitude is 1000 km, the first monitoring device with the field-of-view range of ±60 degrees in the longitude direction with respect to the geocentric direction may be provided. If specific monitoring points can be limited within 60 degrees of longitude, a field-of-view direction change function that allows a change range of ±60 degrees in the line-of-sight direction may be provided. If the entire area of 60 degrees of latitude needs to be constantly monitored, a plurality of monitoring devices may be installed in one satellite, or instead of limiting the number of satellites to six, the number of satellites in the same orbital plane may be increased depending on the field-of-view range of each monitoring device. In order to realize constant and comprehensive monitoring of the surface of the Earth in the vicinity of the equator, the monitoring areas of satellites flying ahead and behind in the same orbit need to overlap, so that deploying eight or more satellites will facilitate system construction. By setting the orbital altitude to a high altitude, it is possible to find a solution in which the field-of-view range of each monitoring device is narrowed.

Figure 34:
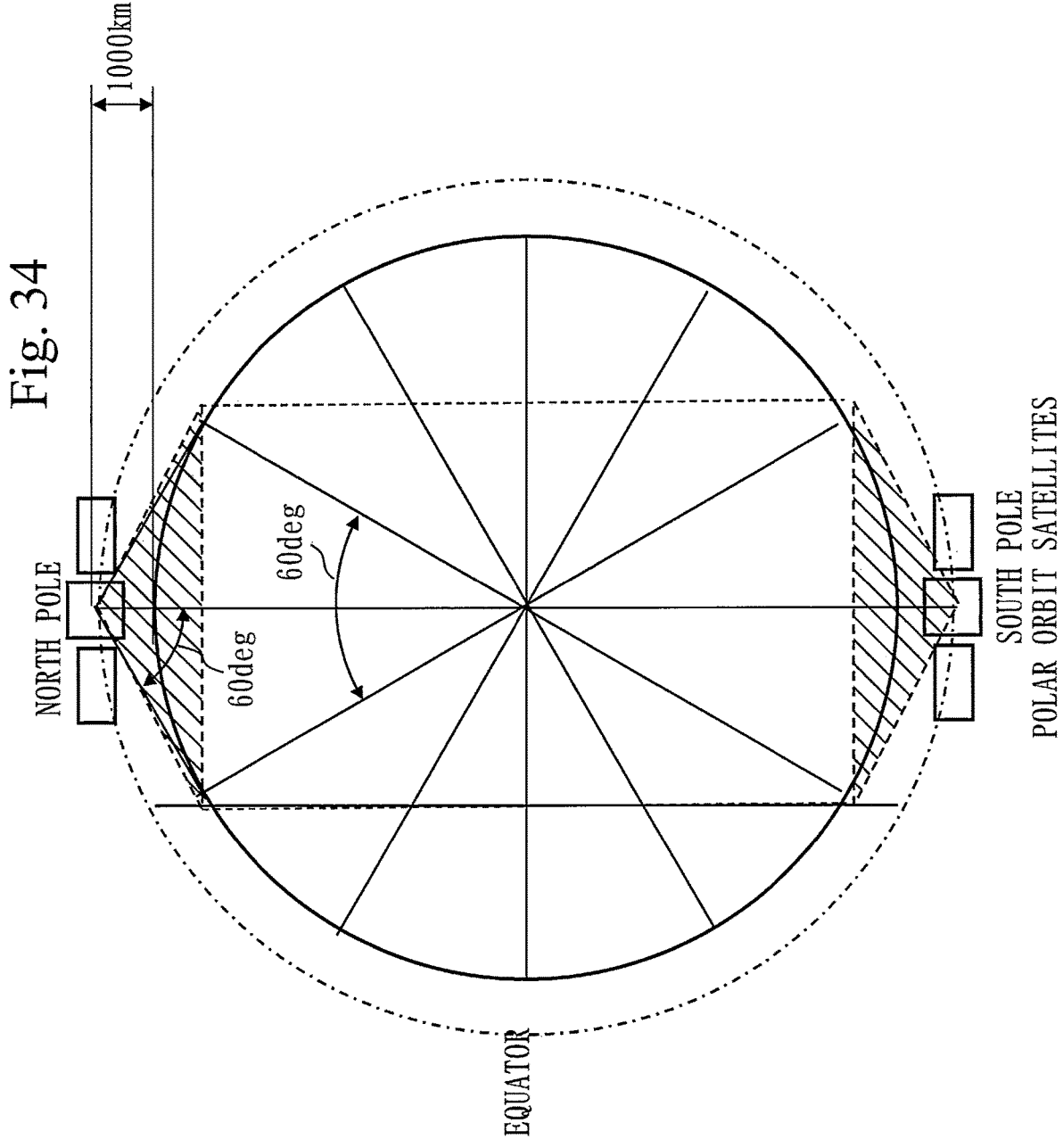
FIG. 34 is a diagram of Embodiment 3, and is a schematic diagram of a monitoring range of polar orbit satellites.

FIG. 34 illustrates a schematic diagram of the monitoring range of polar orbit satellites. Based on substantially the same idea, if six or more satellites are made to fly with even spacing in the same orbital plane in a polar orbit with an orbital inclination of 80 degrees or more, and the field-of-view range of ±60 degrees from the geocentric direction toward the traveling direction is secured by the first monitoring devices from an orbital altitude of 1000 km, it is possible to constantly monitor the ground circumferentially below this orbital plane. Since polar orbit satellites pass the polar regions during every orbit, if there is one orbital plane in which six satellites are evenly deployed, the movement of the orbital plane with respect to the ground due to the rotation of the Earth allows the polar regions to be constantly monitored.

Figure 35:
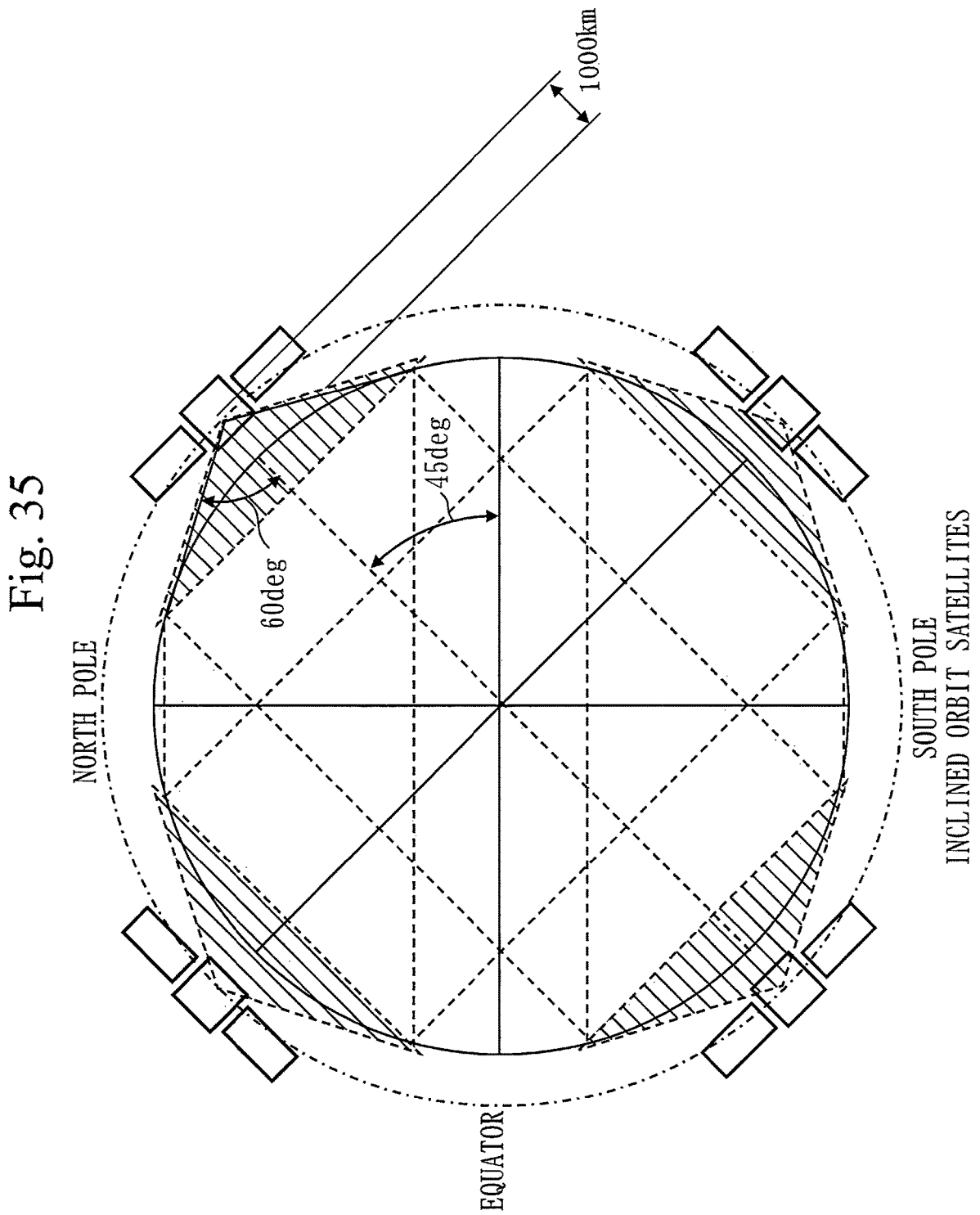
FIG. 35 is a diagram of Embodiment 3, and is a schematic diagram of a monitoring range of polar orbit satellites.

FIG. 35 illustrates a schematic diagram of the monitoring range of polar orbit satellites. A satellite constellation is known that can comprehensively monitor the mid-latitude zone with 12 or more satellites flying at an altitude of about 2000 km in an inclined orbit in which the orbital inclination is set to about 45 degrees. If the number of satellites increases, the mid-latitude zone can be comprehensively monitored even from an orbital altitude of 1000 km.

Figure 36:
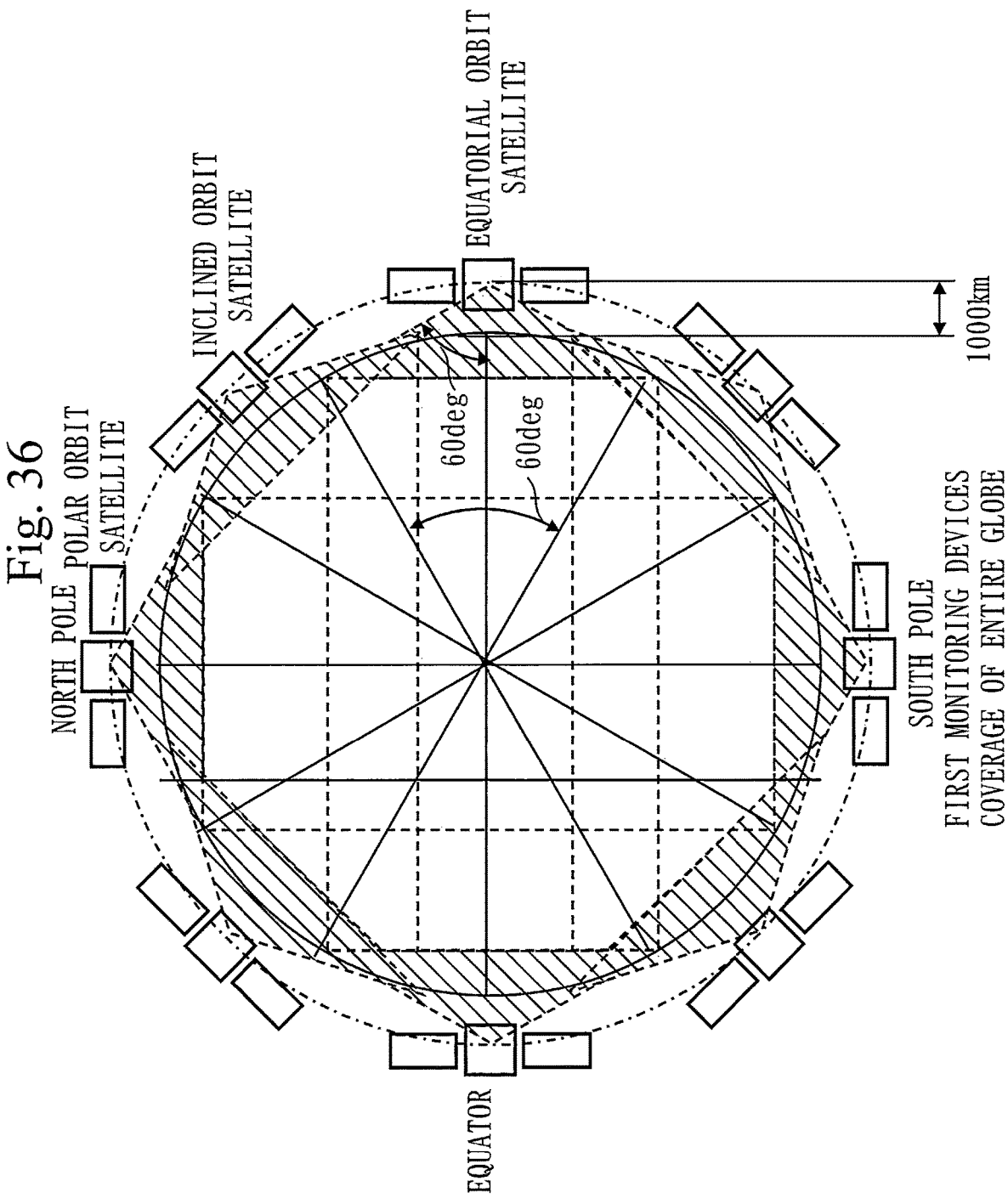
FIG. 36 is a diagram of Embodiment 3, and is a diagram illustrating coverage by the first monitoring devices.

FIG. 36 illustrates coverage by the first monitoring devices. Although none of the equatorial orbit satellite group, the polar orbit satellite group, and the inclined orbit satellite group can independently cover the entire globe, combining the three satellite groups has the effect of enabling constant comprehensive monitoring of the entire globe by the first monitoring devices. The entire globe can be covered by a minimum of 24 satellites, so that there is an effect that system maintenance costs can be reduced. As a result, the launch of a flying object can be detected by a first infrared sensor. The flight can be tracked by a second infrared sensor by detecting the temperature of the flying object in the flight stage after completion of jetting. In an area that can be simultaneously monitored by a plurality of satellites, the location coordinates of the flying object can be derived using the principle of spatial triangulation.

<Description of Coverage by Second Monitoring Devices>

Figure 37:
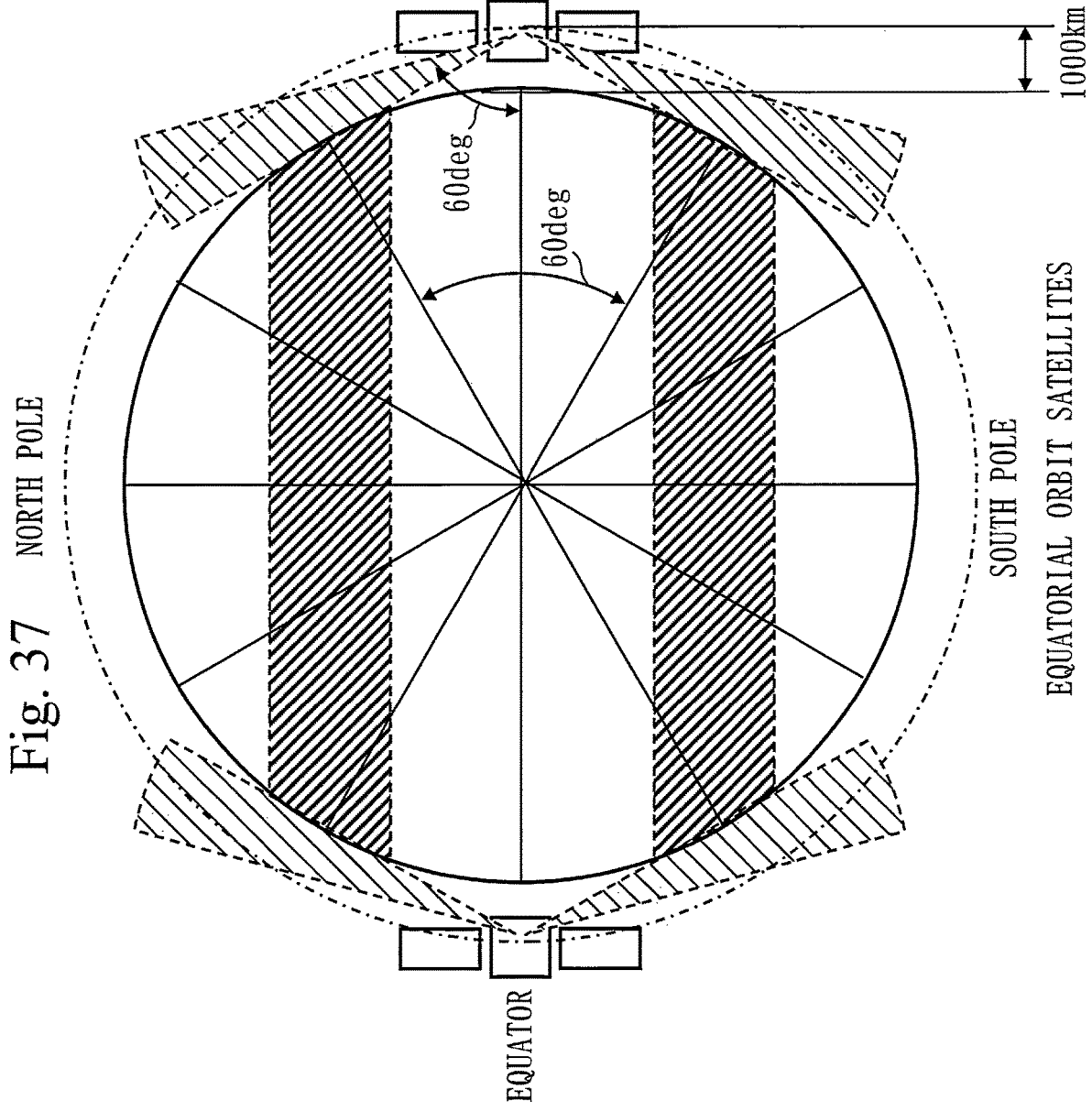
FIG. 37 is a diagram of Embodiment 3, and is a diagram describing coverage by the second monitoring devices.
Figure 38:
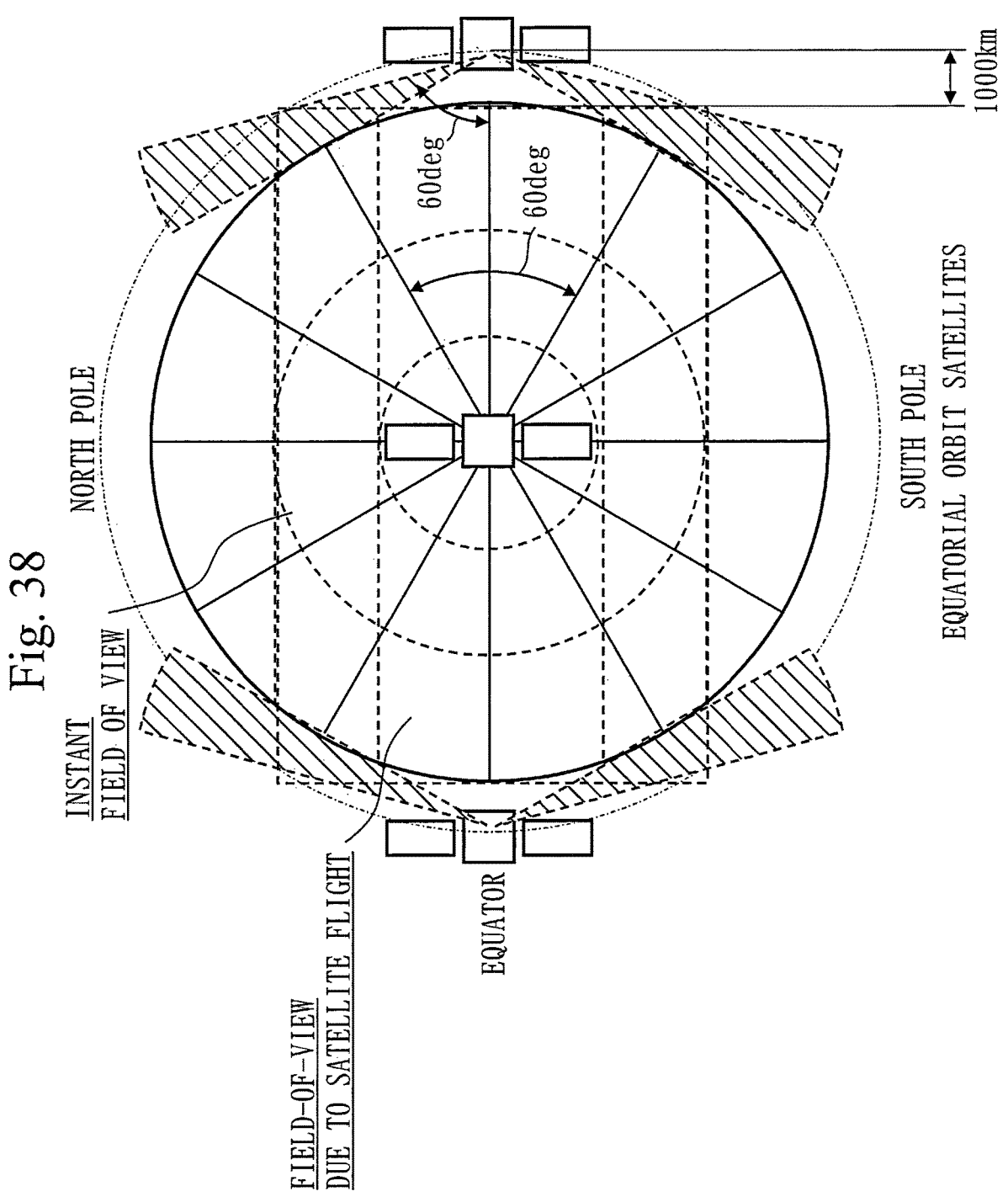
FIG. 38 is a diagram of Embodiment 3, and is another diagram describing coverage by the second monitoring devices.

FIGS. 37 and 38 are diagrams describing coverage by the second monitoring devices. Coverage of the field-of-view range of the second monitoring devices directed to the periphery of the Earth will now be indicated. In equatorial satellites, the field-of-view range is the mid-latitude zone of the Northern Hemisphere and the mid-latitude zone of the Southern Hemisphere, and by orbiting above the equator, the mid-latitude [team] zone is covered circularly as a monitoring area.

Figure 39:
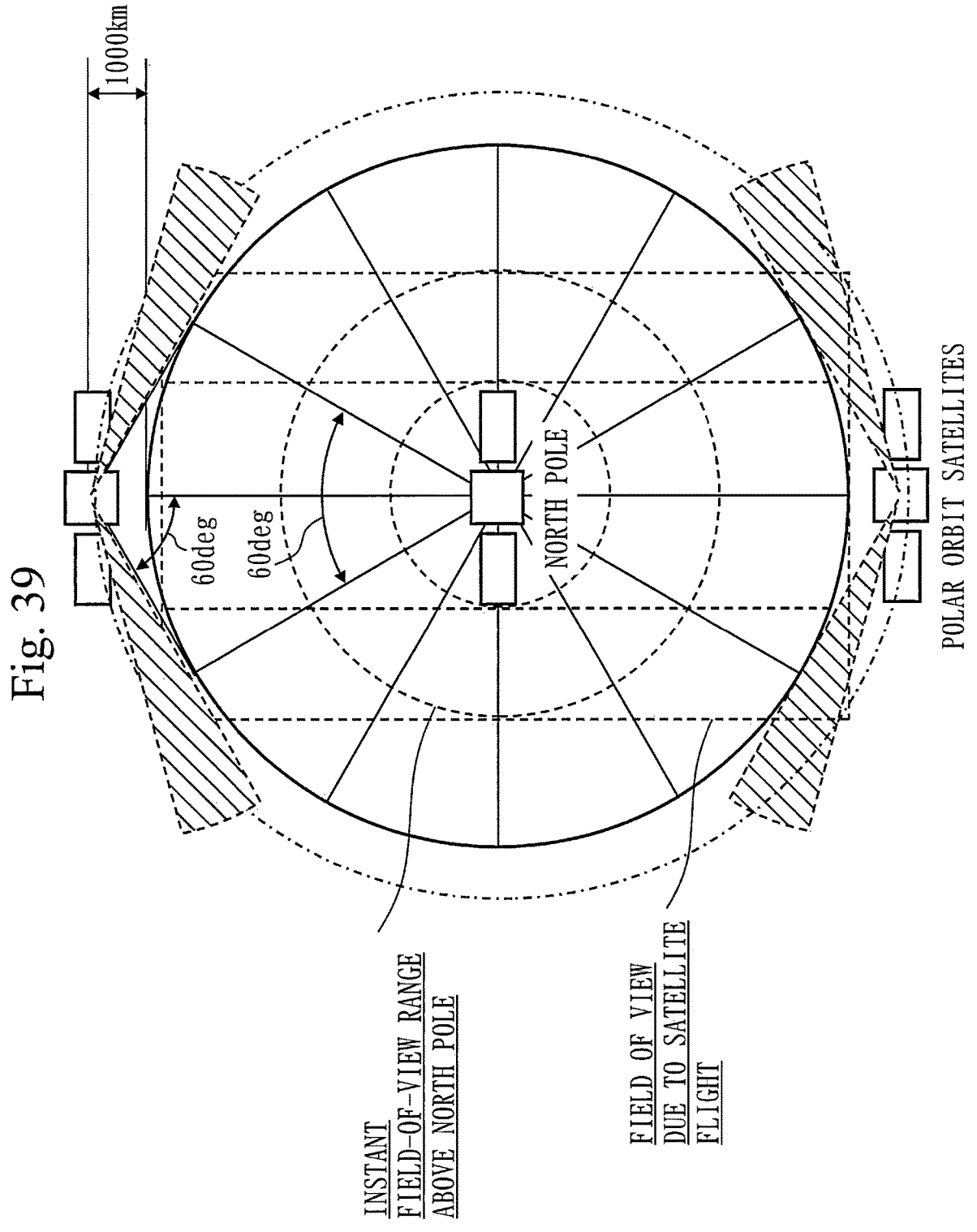
FIG. 39 is a diagram of Embodiment 3, and is a diagram illustrating polar orbit satellites.
Figure 40:
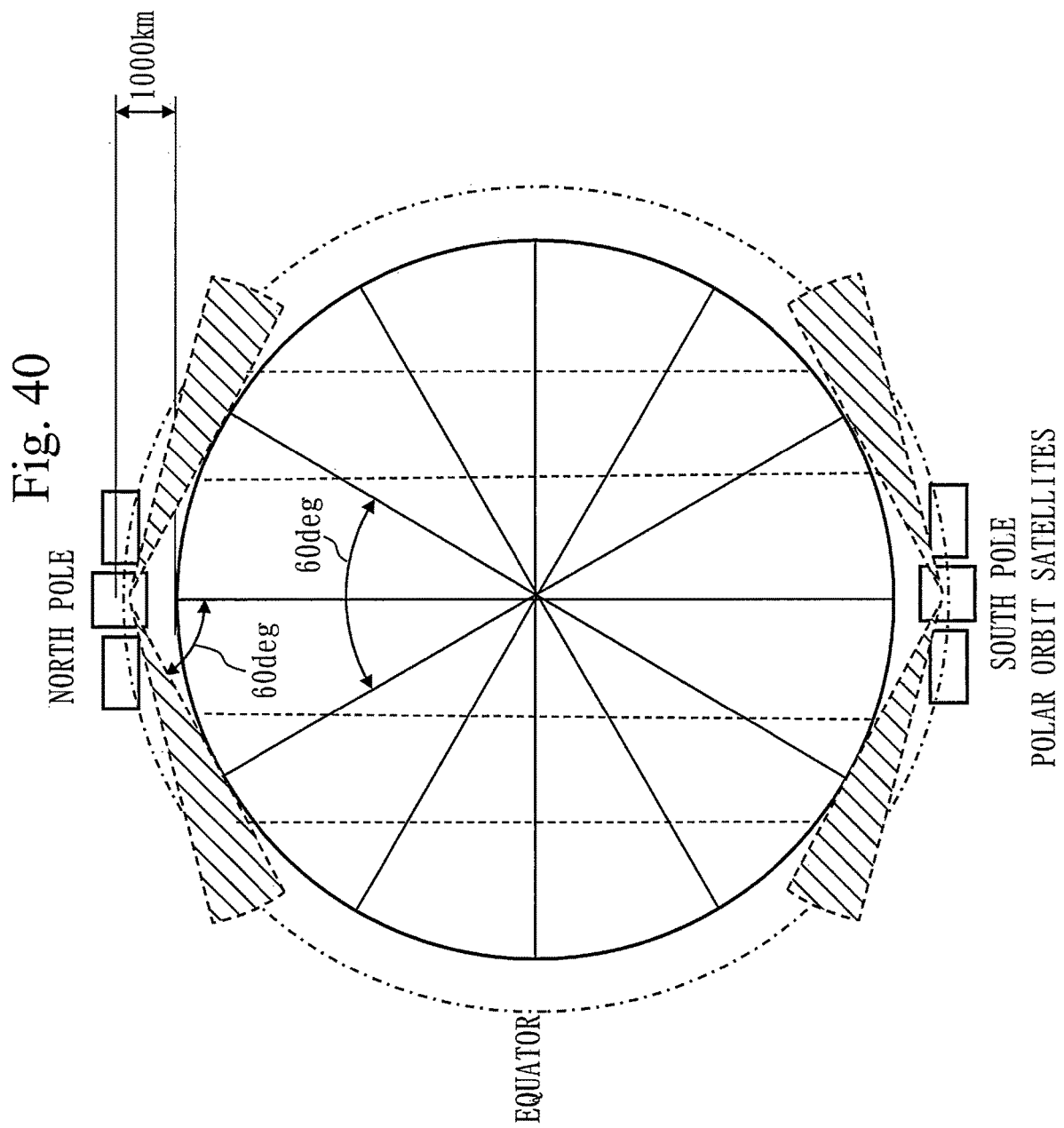
FIG. 40 is a diagram of Embodiment 3, and is another diagram illustrating the polar orbit satellites.

FIGS. 39 and 40 illustrate polar orbit satellites. In the polar orbit satellites, the field-of-view range is the vicinity of 60 degrees north latitude when passing the vicinity of the North Pole and the vicinity of 60 degrees south latitude when passing the vicinity of the South Pole, and by flying in the north-south direction, a circular field-of-view area is formed when viewed from the equator. Even with one orbital plane, the monitoring area moves over time due to the effect of the rotation of the Earth. If the second monitoring device has the field-of-view range of 360 degrees around the azimuth axis with respect to the geocentric direction, like a fisheye camera, then one satellite circularly covers an area from the North Pole to the vicinity of 60 degrees north latitude. Since the polar orbit satellites pass the polar regions during every orbit, even with one orbital plane the vicinity of 60 degrees north latitude and the vicinity of 60 degrees south latitude are constantly covered by six or more satellites flying over these areas in turn. The high-latitude zones of 60 degrees or higher are constantly covered by forward and backward vision before and after passing the polar regions.

Figure 41:
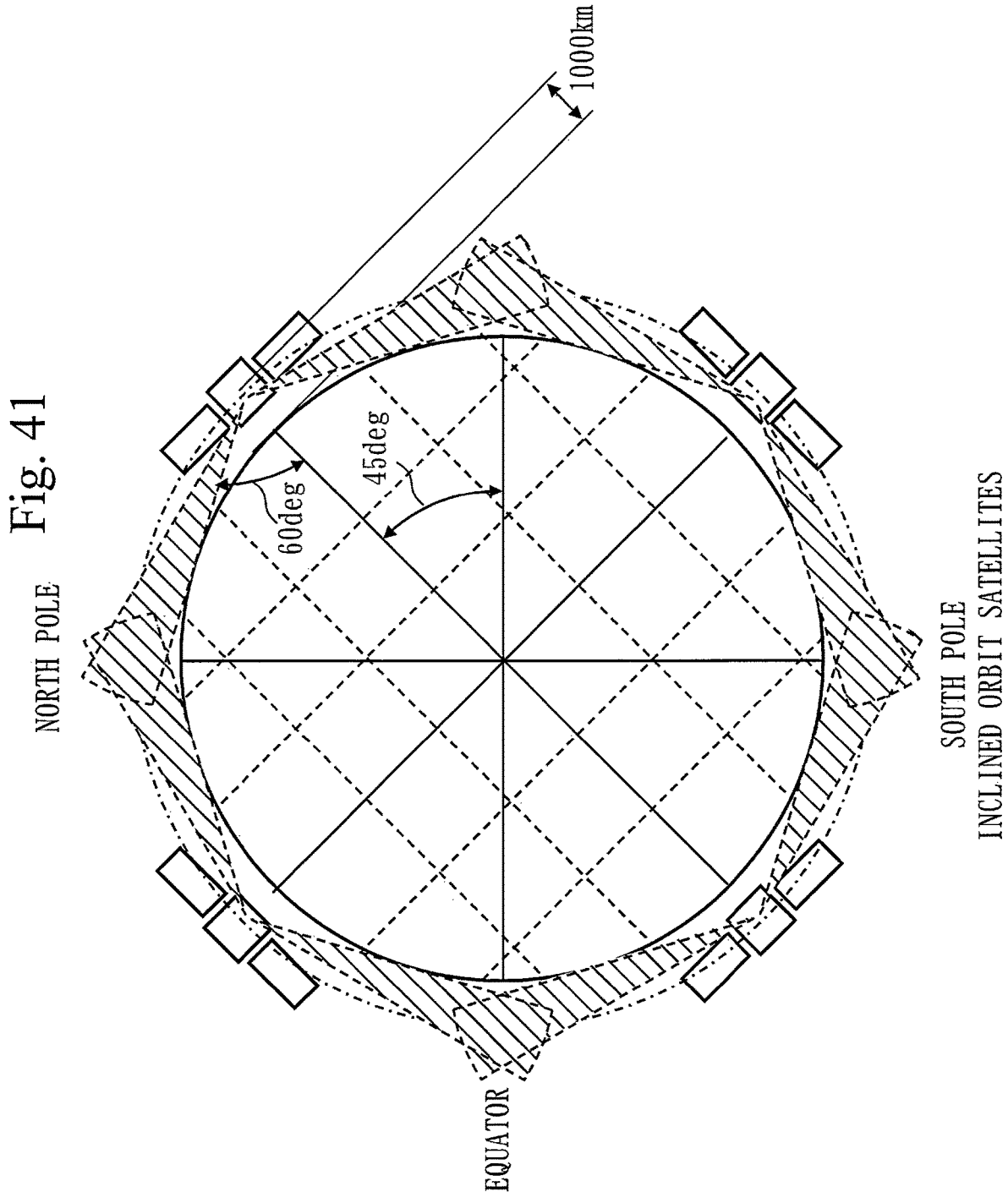
FIG. 41 is a diagram of Embodiment 3, and is a diagram illustrating fields of view of the second monitoring devices in inclined orbit satellites.
Figure 42:
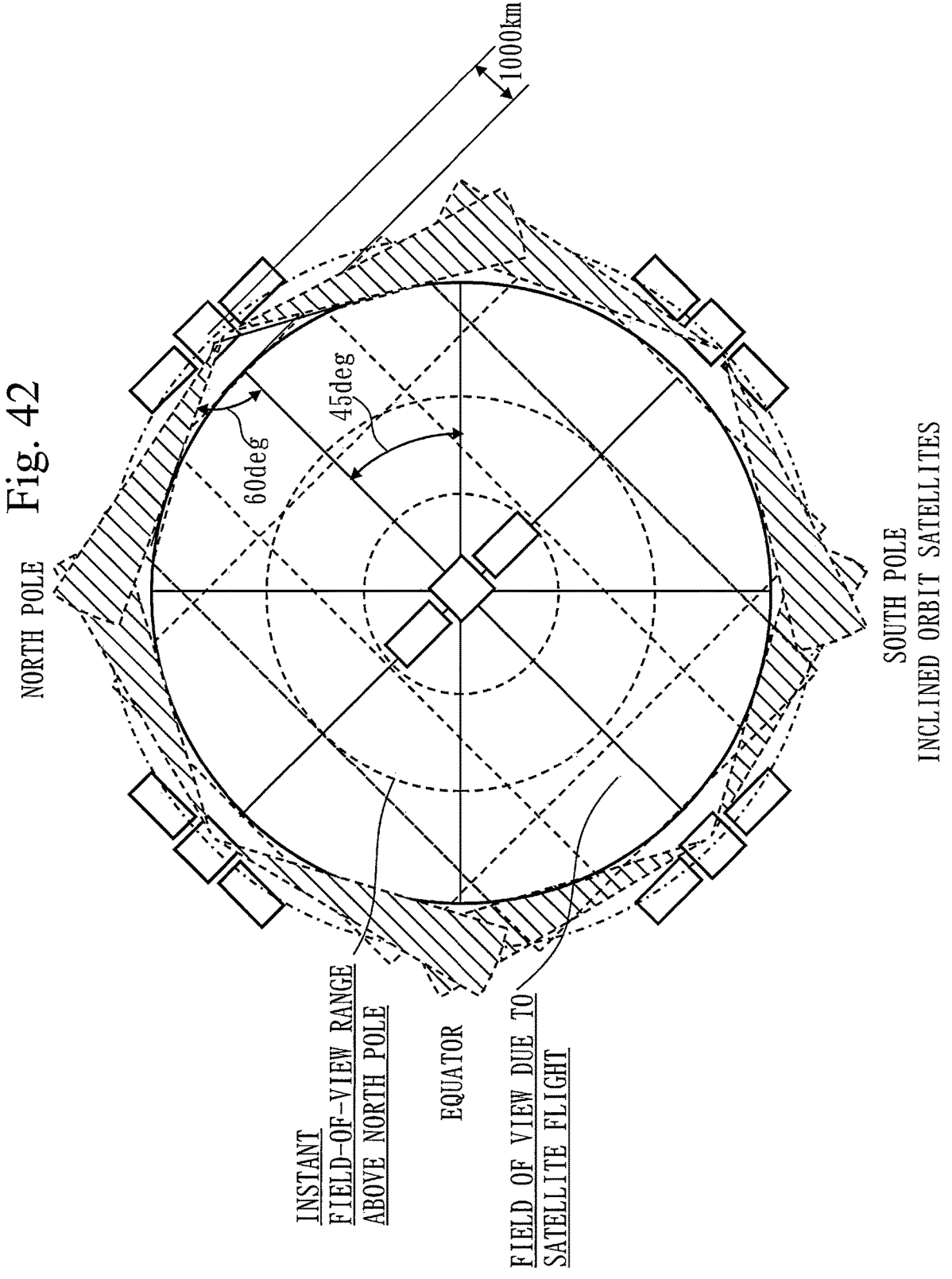
FIG. 42 is a diagram of Embodiment 3, and is another diagram illustrating the fields of view of the second monitoring devices in the inclined orbit satellites.

FIGS. 41 and 42 illustrate the field of view of the second monitoring devices in inclined orbit satellites. The field of view of the second monitoring device in an inclined orbit satellite forms a crossed ring, including airspace above the polar regions and airspace above the vicinity of the equator. Furthermore, since the inclined orbit satellite group is formed evenly in the longitude direction, the field-of-view range formed by the inclined orbit satellite group covers almost the entire globe.

Figure 43:
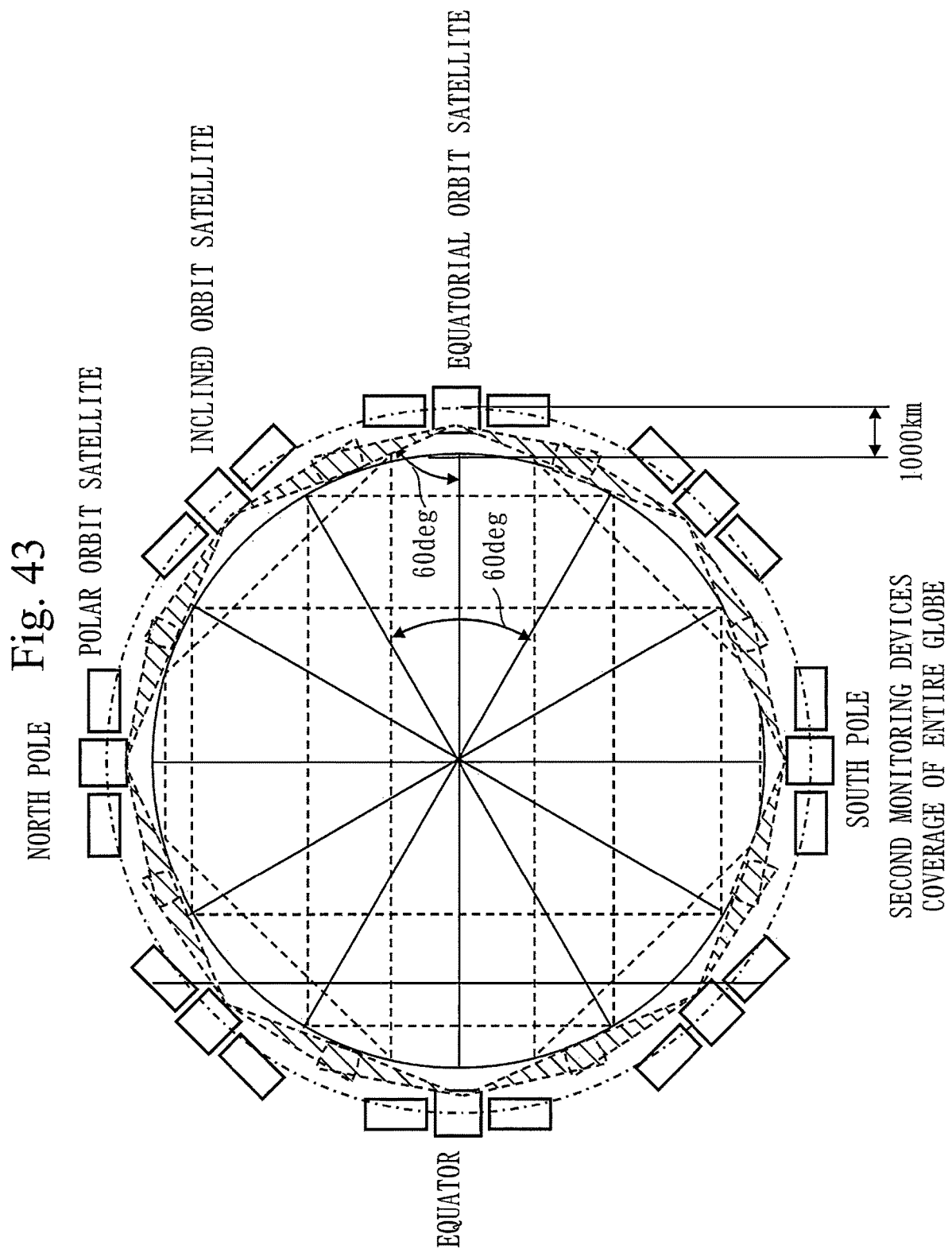
FIG. 43 is a diagram of Embodiment 3, and is a diagram illustrating coverage of the entire globe by the second monitoring devices.

FIG. 43 illustrates coverage of the entire globe by the second monitoring devices. In FIG. 43, the monitoring field of view is indicated only for the satellites with angles indicated for the second monitoring devices. In practice, as illustrated in FIG. 37, band-shaped areas where the monitoring field of view can monitor the surface of the Earth are formed on the surface of the Earth. By combining the field-of-view ranges of the second monitoring devices of the equatorial orbit satellite group, the polar orbit satellite group, and the inclined orbit satellite group, the coverage of the entire globe is secured. Furthermore, the fields of view of a plurality of satellites overlap simultaneously, so that stereoscopic vision by spatial triangulation is possible and flight location coordinates can be calculated.

The monitoring system 3000 of Embodiment 3 is as described below.

The monitoring system 3000 includes a plurality of monitoring satellites, each including a first monitoring device directed to the surface of the Earth and a second monitoring device directed to the periphery of the Earth, and a ground facility. Six or more of the monitoring satellites form a satellite constellation as an equatorial orbit satellite group flying above the equator at an orbital inclination of less than 10 degrees. In this monitoring system 3000, the orbit is an elliptical orbit, and the monitoring range of the second monitoring device expands to a high-latitude side in the vicinity of the apogee and expands to a low-latitude side in the vicinity of the perigee.

Figure 44:
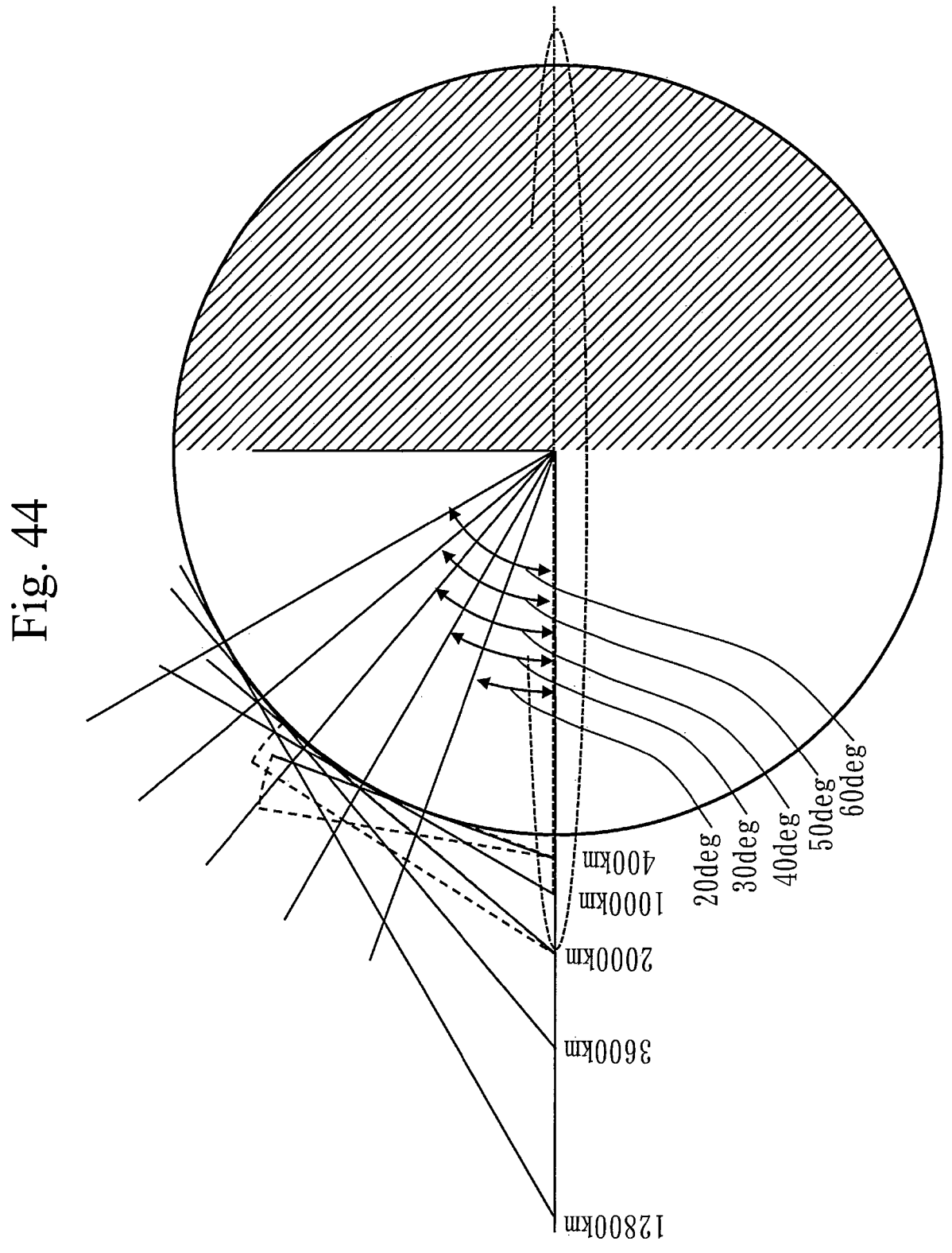
FIG. 44 is a diagram of Embodiment 3, and is a diagram illustrating a relationship between orbital latitudes and tangents to the Earth.
Figure 45:
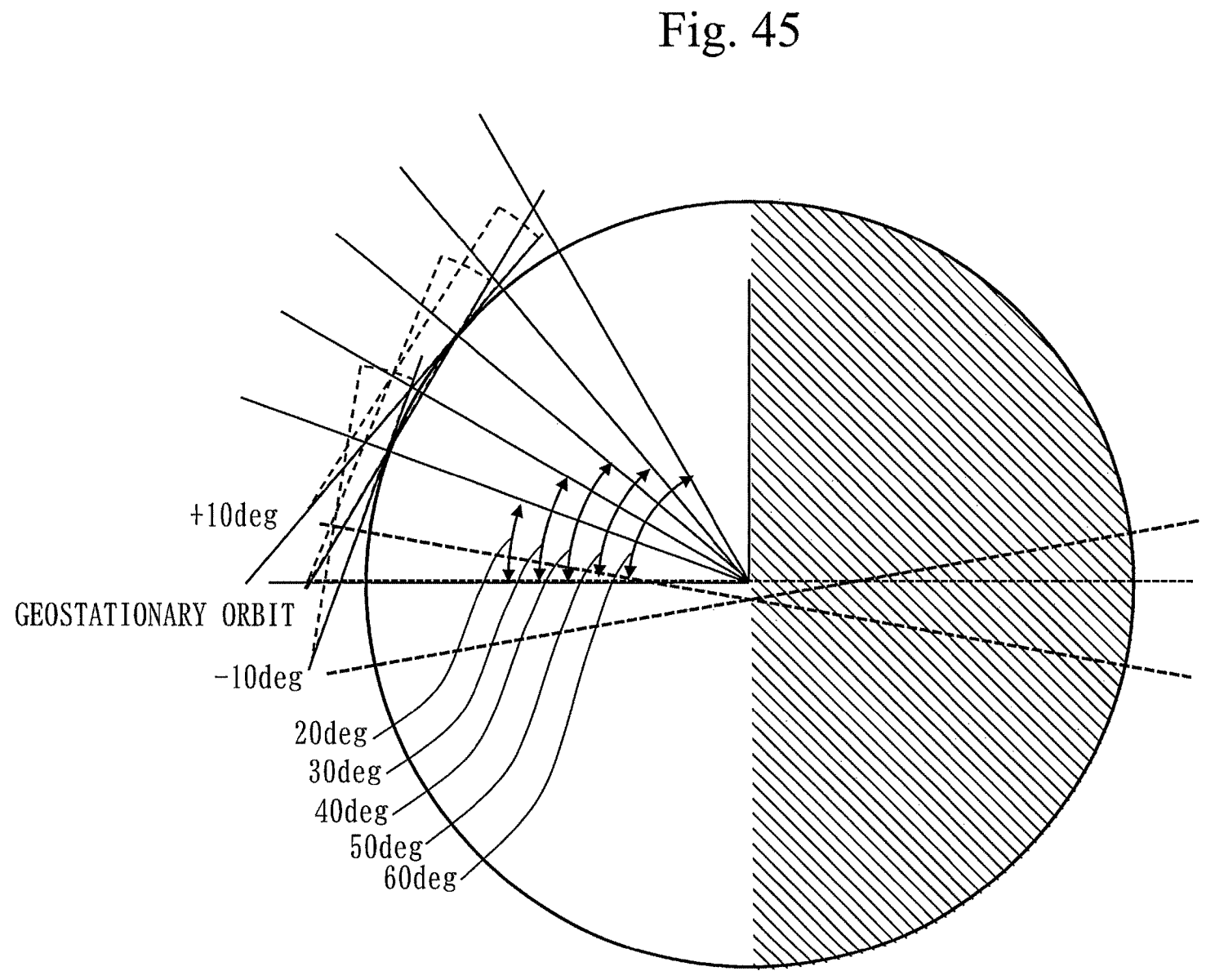

FIGS. 44 and 45 illustrate a relationship between orbital latitudes and tangents to the Earth.

With this monitoring system 3000, the following can be monitored against the background of space:

a tangent direction to 20 degrees north latitude from an orbital altitude of about 400 km,
   a tangent direction to 30 degrees north latitude from an orbital altitude of about 1000 km,
   a tangent direction to 40 degrees north latitude from an orbital altitude of about 2000 km,
   a tangent direction to 50 degrees north latitude from an orbital altitude of about 3600 km, and
   a tangent direction to 60 degrees north latitude from an orbital altitude of about 12800 km.

Therefore, by adopting an elliptical orbit above the equator and setting that monitoring is to be performed with the apogee as the upper limit of high latitude and the perigee as the lower limit of low latitude, a desired monitoring range can be covered. The observation range can be rationally expanded by setting orbital planes alternately so that an odd-numbered satellite is at the apogee and an even-numbered satellite is at the perigee when the satellites in the equatorial orbit satellite group are sequentially numbered. Since the major axis of the elliptical orbit rotates within the orbital plane, in order to monitor a specific monitoring area at a specific local sun time (LST), the monitoring range can be maintained by placing the major axis at an appropriate location at this LST and setting the orbit as a frozen orbit. Achieving a frozen orbit using only natural phenomena has large restrictions on orbit parameters, but operating a propulsion system allows the parameters to be set with a high degree of freedom.

In the monitoring system 3000 of Embodiment 3, the orbit may be a frozen orbit.

The configuration of the monitoring system 3000 of Embodiment 3 may be as follows. The monitoring system 3000 includes a plurality of monitoring satellites, each including a first monitoring device directed to the surface of the Earth and a second monitoring device directed to the periphery of the Earth, and a ground facility. In the monitoring system 3000, six or more of the monitoring satellites form a satellite constellation as an equatorial orbit satellite group flying above the equator at an orbital inclination of less than 10 degrees. In the monitoring system 3000, the orbit is an elliptical orbit, and the monitoring range of the second monitoring device expands to a high-latitude side of the Northern Hemisphere and a low-latitude side of the Southern Hemisphere at the northernmost point of the orbit, and expands to a high-latitude side of the Southern Hemisphere and a low-latitude side of the Northern Hemisphere at the southernmost point of the orbit.

In the monitoring system 3000, the normal vector of the orbital plane may be synchronized with the rotation of the Earth.

Each of the satellites presented in Embodiment 1 to Embodiment 3 is controlled by a control device or an air traffic control device located on the Earth.

Embodiment 1 to Embodiment 3 have been described above. Two or more of these embodiments may be implemented in combination. Alternatively, one of these embodiments may be partially implemented. Alternatively, two or more of these embodiments may be partially implemented in combination.

REFERENCE SIGNS LIST

100, 101, 102, 103: monitoring satellite; 110: first monitoring device; 120: second monitoring device; 11S: +X+Y sensor; 12S: +X−Y sensor; 13S: −X+Y sensor; 14S:−X−Y sensor; 15S: directly-below monitoring sensor; 21S: +Y sensor; 22S: −Y sensor; 31S: +X sensor; 32S: +Y sensor; 33S: −Y sensor; 34S: directly-below monitoring sensor; 41C: communication device; 51C, 52C, 53C, 54C, 55C, 56C: communication device; 71: optical communication; 72: radio communication; 201, 202: communication satellite; 211: first data relay satellite; 212: second data relay satellite; 213: second data relay satellite; 220C: optical communication device; 230C: communication device; 300: ground facility; 310, 320: response device; 330: communication line; 333: flying object; 400: Earth; 501, 502, 503: monitoring system; 600: satellite information transmission system; 700: flying object response system; 3000: monitoring system.

The invention claimed is:

1. A monitoring system comprising:
   a plurality of monitoring satellites, each including a first monitoring device directed to a surface of the Earth and a second monitoring device directed to a periphery of the Earth; and
   a ground facility,
   wherein 12 or more of the monitoring satellites form a satellite constellation as an inclined orbit satellite group flying in an inclined orbit with an orbital inclination of 10 degrees to 80 degrees,
   wherein when a direction of a +X axis in a positive direction in right-handed orthogonal coordinates is defined as a satellite traveling direction +X of the monitoring satellite and a direction of a +Z axis in a positive direction in the right-handed orthogonal coordinates is defined as a geocentric direction +Z of the monitoring satellite, the second monitoring device includes
   a +X+Y sensor directed at +45 degrees,
   a +X−Y sensor directed at −45 degrees,
   a −X+Y sensor directed at +135 degrees, and
   a −X−Y sensor directed at −135 degrees,
each being directed around the +Z axis with respect to the +X axis, and wherein when flying northeastward, the second monitoring device monitors airspace above high latitudes in the Northern Hemisphere with the +X−Y sensor, and monitors airspace above high latitudes in the Southern Hemisphere with the −X+Y sensor, and when flying southeastward, monitors airspace above high latitudes in the Northern Hemisphere with the −X−Y sensor, and monitors airspace above high latitudes in the Southern Hemisphere with the +X+Y sensor.

2. The monitoring system according to claim 1, wherein each of the monitoring satellites further includes a communication device, and wherein the communication device has a communication field of view of ±60 degrees or more around the +X axis with respect to the +Z axis and +60 degrees or more around a +Y axis with respect to the +Z axis, the +Y axis being directed in a positive direction in the right-handed orthogonal coordinates, and wherein monitoring information acquired by each of the monitoring satellites is transmitted directly to the ground facility, or transmitted to the ground facility via a communication satellite that relays satellite information.

3. The monitoring system according to claim 1, wherein the satellite constellation is formed at an orbital altitude of 1000 km or higher, and wherein the monitoring satellites forming the satellite constellation transmit acquired monitoring information to the ground facility via a satellite information transmission system that is a transmission system formed at an orbital altitude of 800 km or lower to relay and transmit satellite information between the monitoring satellites and the ground facility.

4. The monitoring system according to claim 2, wherein the satellite constellation is formed at an orbital altitude of 1000 km or higher, and wherein the monitoring satellites forming the satellite constellation transmit acquired monitoring information to the ground facility via a satellite information transmission system that is a transmission system formed at an orbital altitude of 800 km or lower to relay and transmit satellite information between the monitoring satellites and the ground facility.

5. The monitoring system according to claim 1, wherein the satellite constellation is formed at an orbital altitude of 1200 km or higher, and wherein the monitoring satellites forming the satellite constellation transmit acquired monitoring information to the ground facility via a satellite information transmission system that is a transmission system formed at an orbital altitude of 1000 km or lower to relay and transmit satellite information between the monitoring satellites and the ground facility.

6. The monitoring system according to claim 1, wherein monitoring information is transmitted via a satellite information transmission system.

7. A monitoring satellite that flies in an inclined orbit of the monitoring system according to claim 1.

8. A communication satellite that is used in the monitoring system according to claim 2.

* * * * *